(12) United States Patent
Uehara et al.

(10) Patent No.: US 7,973,749 B2
(45) Date of Patent: Jul. 5, 2011

(54) DISPLAY DEVICE, TERMINAL DEVICE, AND DISPLAY PANEL

(75) Inventors: Shin-ichi Uehara, Tokyo (JP); Ken Sumiyoshi, Tokyo (JP); Fujio Okumura, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 1069 days.

(21) Appl. No.: 11/669,857

(22) Filed: Jan. 31, 2007

(65) Prior Publication Data
US 2007/0176887 A1 Aug. 2, 2007

(30) Foreign Application Priority Data
Jan. 31, 2006 (JP) ................................ 2006-023448

(51) Int. Cl.
*G09G 3/36* (2006.01)
(52) U.S. Cl. .............. 345/87; 345/90; 345/98; 345/102; 349/62; 349/64
(58) Field of Classification Search .............. 345/76–84, 345/87–90, 102, 36, 45; 315/169.3; 349/61–69
See application file for complete search history.

(56) References Cited

U.S. PATENT DOCUMENTS

| | | | | |
|---|---|---|---|---|
| 4,021,945 A | * | 5/1977 | Sussman | 40/448 |
| 5,103,328 A | | 4/1992 | Numao | 359/53 |
| 5,451,980 A | * | 9/1995 | Simon et al. | 345/88 |
| 5,831,698 A | * | 11/1998 | Depp et al. | 349/64 |
| 6,028,649 A | * | 2/2000 | Faris et al. | 349/10 |
| 6,437,900 B1 | * | 8/2002 | Cornelissen et al. | 359/246 |
| 6,448,951 B1 | * | 9/2002 | Sakaguchi et al. | 345/88 |
| 6,917,391 B1 | * | 7/2005 | Faris | 349/12 |
| 7,349,043 B2 | * | 3/2008 | Sumiyoshi et al. | 349/64 |
| 7,630,026 B2 | * | 12/2009 | Sumiyoshi et al. | 349/66 |
| 2002/0036608 A1 | * | 3/2002 | Hirakata et al. | 345/87 |
| 2003/0132901 A1 | * | 7/2003 | Shimada | 345/87 |
| 2005/0259193 A1 | | 11/2005 | Sumiyoshi et al. | 349/62 |
| 2006/0256244 A1 | * | 11/2006 | Jak et al. | 349/33 |
| 2006/0262057 A1 | * | 11/2006 | Sumiyoshi | 345/87 |

FOREIGN PATENT DOCUMENTS
JP 5-72529 3/1993
JP 9-244018 9/1997

* cited by examiner

*Primary Examiner* — Alexander Eisen
*Assistant Examiner* — Jason M Mandeville
(74) *Attorney, Agent, or Firm* — Hayes Soloway P.C.

(57) ABSTRACT

A display device is composed of a light source device and a transmissive liquid crystal display panel, and the light source device is provided with a transparent/scattering switching element capable of switching between states in which incident light is transmitted or scattered. Pixels for displaying are disposed in the form of a matrix in the transmissive liquid crystal display panel, and the need for another power supply and signals for the transparent/scattering switching element is eliminated by driving the transparent/scattering switching element using the signals and power supply for driving the pixels. The drive power source of the transparent/scattering switching element for controlling scattering can be made smaller and less costly in a display device that is capable of switching the range of viewing angles.

15 Claims, 36 Drawing Sheets

DISPLAY DEVICE, TERMINAL DEVICE, AND DISPLAY PANEL

BACKGROUND OF THE INVENTION

1. Field of the Invention

The present invention relates to a display device in which the viewing angle can be switched, a terminal device in which the display device is mounted, and a display panel incorporated in the display device.

2. Description of the Related Art

In recent years, because of their thin profile, light weight, small size, low power consumption, and other advantages, display devices that use liquid crystal have been widely mounted and used in monitors, televisions (TV), and other large terminal devices; notebook computers, cash dispensers, automatic vending machines, and other midsized terminal devices; and personal TVs, PDAs (Personal Digital Assistants, mobile phones, portable game machines, and other small terminal devices. These liquid crystal display (LCD) devices can be classified into transmissive-types, reflective-types, and semitransmissive-types in which transmitted and reflected light are used in combination, in accordance with the type of light source that is used. A reflective-type device can reduce energy consumption because the device can make use of external light for display purposes, but since the contrast and other display properties are inferior in comparison with transmissive-type devices, transmissive-type and semitransmissive-type devices are currently the mainstream devices. In transmissive and semitransmissive LCD devices, a light source device is disposed on the back surface of the liquid crystal panel, and the display processes are implemented using the light emitted by the light source. Specifically, a light source device is currently required in addition to the liquid crystal panel in a mainstream LCD device.

A liquid crystal panel, which is a main constituent element of a LCD device, uses an electric field to control the orientation of liquid crystal molecules and to display information. Many modes have been proposed by combining the type of liquid crystal molecules, the initial orientation, the direction of the electric field, and other features of the device. The most often used among these modes in conventional terminal device are the STN (Super Twisted Nematic) mode in a passive matrix structure, and the TN (Twisted Nematic) mode in an active matrix structure, but liquid crystal panels that use these modes have a narrow range of angles in which a grayscale to be correctly viewed, and the grayscale is inverted when the viewer is not situated in the optimal viewing position.

The issue of an inverted grayscale was not a major problem in mobile phones and other terminal devices when the display content was telephone numbers and other character-based content. Due to recent advances in technology, however, terminal devices now display a large amount of character information as well as image information. Therefore, image viewability is dramatically reduced due to an inverted grayscale. For this reason, liquid crystal panels having a wide viewing angle mode that allows a grayscale to be correctly viewed without a grayscale inversion are gradually being mounted in greater numbers in terminal devices. Liquid crystal panels having such a mode are generally referred to as liquid crystal panels having a wide viewing angle, and these panels employ multi-domain vertical orientation modes and horizontal electrical field modes such as IPS (In-Plane Switching). Since a correct grayscale can be viewed in a wide range of viewing angles by using these liquid crystal panels having a wide viewing angle, applications are being developed and panels are increasingly being mounted in such applications in order to share information with others and simultaneously view images with more than one person, even though small and midsized terminal devices are essentially personal tools.

On the other hand, small and midsized terminal devices are also used in public places as well as in rooms having strict security. In such cases, security is required that does not allow private and confidential information to be viewed by a third party. Recently in particular, the opportunities for displaying private and confidential information have increased together with the advancement in terminal devices, and the need for a technique that prevents unwanted viewing has increased. In view of this situation, there is a need for a technique that allows viewing by only the user, but prevents unwanted viewing by narrowing the viewable angle range, i.e., the range of viewing angles of the display.

As described above, there is a need for a display that has a wide range of viewing angles to allow simultaneous viewing by more than one person, and that has a narrow range of viewing angles to allow viewing only by the user. There is also a need for a terminal device that can switch between these two types of displays. To satisfy such a need, display devices have been proposed in which the light source device, which is an essential part of a LCD device, has been modified to allow the range of viewing angles to be varied.

FIG. 1 is a cross-sectional diagram schematically showing a first conventional viewing-angle-controllable LCD device described in Japanese Laid-open Patent Application No. 5-72529 (hereinafter referred as "Patent Document 1"). As shown in FIG. 1, the first conventional viewing-angle-controllable LCD device 1001 comprises a liquid crystal element 1170 that can control scattering, and a liquid crystal element 1180 that can control optical rotation and birefringence. The liquid crystal element 1170 that can control scattering has substrates 1110 and 1111 that are optically transparent in the visible range, transparent electrodes 1120 and 1121, a scattering liquid crystal 1130, a power supply 1100, and a switch 1190. The liquid crystal element 1180 which can control optical rotation and birefringence has substrates 1111 and 1112 that are optically transparent in the visible range, transparent electrodes 1122 and 1123, polarizers 1140 and 1141, orientation films 1150 and 1151, a liquid crystal layer 1160 that has optical-rotation and birefringent characteristics, a power supply 1101, and a switch 1191. A polymer dispersion liquid crystal is used as the scattering liquid crystal 1130, and TN liquid crystals are used as the liquid crystal element 1180 that can control the optical rotation and birefringence. The polarizers 1140 and 1141 are disposed in a crossed-Nicol configuration.

In the first conventional viewing-angle-controllable LCD device configured in the manner described in Patent Document 1, the optical rotation and birefringence of the liquid crystal layer 1160 is varied by applying a voltage between the transparent electrodes 1122 and 1123, and this variation can be used to control the transmissivity of the light. In a display mode that uses such optical-rotation and birefringent characteristics, a phenomenon occurs in which the brightness and hue are reduced or inverted depending on the viewing angle, because the optical rotation and birefringence applied to the incident light are substantially different depending on the viewing angle.

In view of the above situation, the liquid crystal element 1170 that can control scattering is disposed above the liquid crystal element 1180, which has such viewing-angle dependency, and the viewing angle dependency is decreased. In other words, the liquid crystal molecules are arranged at random when an electric field is not applied to the liquid crystal 1130 of the liquid crystal element 1170 that can control scattering. Therefore, light is substantially isotropically scattered across the entire viewing angle, and a display with a low viewing-angle dependency can be obtained. On the other hand, when the electric field is applied to the liquid crystal 1130, the light emitted from the liquid crystal element 1180 is emitted unchanged without being scattered by the liquid crystal molecules because the liquid crystal molecules are aligned substantially parallel to the applied electric field. In this case, the viewing angle characteristics are not improved and are similar to the viewing angle characteristics of a conventional TN liquid crystal. However, only the user positioned in front of the screen can correctly view the image. Therefore, when only one user located in front of the screen needs to be able to correctly view the screen, the electric field is not applied to the liquid crystal 1130, whereby unwanted viewing by others can be prevented.

FIG. 2 is a cross-sectional diagram schematically showing a second conventional viewing-angle-controllable LCD device described in Japanese Laid-open Patent Application No. 9-244018 (hereinafter referred to as "Patent Document 2"), and FIG. 3 is a perspective view schematically showing the illumination device used in a conventional viewing-angle-controllable LCD device. The second conventional viewing-angle-controllable LCD device 2101 comprises a LCD element 2102, a scattering control element (scattering control means) 2103, and an illumination device (backlight) 2104, as shown in FIG. 2. The scattering control element 2103 is disposed between the LCD element 2102 and the illumination device 2104. The illumination device 2104 is disposed below the scattering control element 2103, and comprises a sheet (translucent sheet body) 2120 having light-blocking slits, and an irradiation portion 2121, as shown in FIG. 3. Fluorescent tubes or other light sources 2122 are disposed in the irradiation portion 2121, and a light-excident surface 2123 is formed for emitting light from the light sources 2122 and directing the light to the sheet 2120 having light-blocking slits. A reflection sheet 2124 for reflecting the light emitted from the light source 2122 is disposed on the surface facing the light-excident surface 2123 in irradiation portion 2121. The sheet 2120 having light-blocking slits has a large number of linear light-blocking materials that are disposed parallel to each other on one surface of a transparent sheet. The direction in which the light-blocking material extends is aligned with the vertical direction of the display screen.

In the second conventional viewing-angle-controllable LCD device configured in the manner described in Patent Document 2, the light emitted from the light source 2122 is emitted from the light-excident surface 2123 of the irradiation portion 2121 and is irradiated toward the scattering-control element 2103 by way of the sheet 2120 having light-blocking slits. When the light emitted from the light-excident surface 2123 passes through the sheet 2120 having light-blocking slits, the sheet 2120 having light-blocking slits blocks the light that enters from the direction that is considerably inclined toward the light-incident surface of the sheet 2120 having light-blocking slits. Transmitted light can thereby be obtained that is highly parallel in the vertical direction with the surface of the sheet 2120 having light-blocking slits. The light emitted from the illumination device 2104 enters the scattering-control element 2103. The scattering-control element 2103 controls the scattering of light beams that have entered in accordance with the presence of applied voltage. When the scattering-control element 2103 is in a scattering state, the light emitted from the illumination device 2104 is scattered by the scattering-control element 2103, and when the scattering-control element 2103 is in a transparent state, the light emitted from the illumination device 2104 is not scattered.

In the second conventional viewing-angle-controllable LCD device 2101, when the scattering-control element 2103 is in a scattering state, highly parallel light emitted from the illumination device 2104 is scattered by the scattering-control element 2103 and received by the LCD element 2102. As a result, light that has passed through the LCD element 2102 passes through all viewing angle directions of the display unit, and the display content can be viewed from positions other than the position directly in front of the display unit. Conversely, when the scattering-control element 2103 is in a transparent state, highly parallel light emitted from the illumination device 2104 is not scattered by the scattering-control element 2103, and highly parallel light enters the liquid display element 2102 unchanged. As a result, light is not transmitted, the display unit is dark, and the display content cannot be viewed from a position at a diagonal from the right and left in the horizontal direction. In other words, only the user positioned directly in front of the display unit can view the display content.

As described above, the second conventional viewing-angle-controllable LCD device 2101 can use the scattering-control element 2103 to control the scattering of light, and can therefore control the viewing angle characteristics of the display content. Also, since highly parallel light can be emitted by the illumination device 2104 toward the LCD element 2102, viewing angle characteristics can be reliably obtained in which the display content can be viewed only by the user positioned directly in front of the display screen when the scattering-control element 2103 is set to a transparent state. Therefore, the display characteristics have low viewing angle dependency, and a LCD device can be obtained that can arbitrarily switch between a state in which the display content can be viewed from only directly in front of the display, and a state in which the display characteristics are uniformly maintained across all viewing angle directions.

Nevertheless, the conventional viewing-angle-controllable LCD devices described above have the following problems. In the conventional viewing-angle-controllable LCD devices described above, another drive power source is required to drive the scattering-controlling liquid crystal element, and it is difficult to reduce size and costs. In particular, the scattering-controlling liquid crystal element must be driven using an AC power source because burn-in occurs when a DC power source is used. Accordingly, the drive power source becomes complex, and it is difficult to reduce the size and costs.

SUMMARY OF THE INVENTION

An object of the present invention is to provide a display device in which the drive power source of a transparent/scattering switching element for controlling scattering can be reduced in size and cost in a viewing-angle-controllable LCD device, to provide a terminal device in which the display device is mounted, and to provide a display panel incorporated in the terminal device.

The display device according to the present invention comprises a light source, a transparent/scattering switching element capable of switching between states in which light that has entered from the light source is transmitted or scattered, and a display panel for receiving light transmitted through the transparent/scattering switching element and displaying images, wherein the display panel has a display area composed of pixels that are arranged in the form of a matrix, and a power supply and signals for driving the pixels of the display area are also used for driving the transparent/scattering switching element.

In the present invention, another signal and power source does not need to be provided for the transparent/scattering switching element, and the display device can be made smaller and more inexpensive.

The display device according the present invention may further comprise a transparent/scattering switching element drive circuit to which at least a power supply and a signal for driving the pixels of the display area are inputted, and which outputs signals for driving the transparent/scattering switching element. Since it is possible to dispense with the need for a transparent/scattering switching element drive circuit to be provided to locations other than the display panel, the size of the device can be reduced.

The display device according the present invention may be configured so that a control signal is inputted to the transparent/scattering switching element drive circuit, and the output of the transparent/scattering switching element drive circuit is switched on or off in accordance with the state of the control signal. Since the transparent/scattering switching element can thereby be controlled by merely inputting a single control signal, reducing the size of the device is facilitated.

The display device according the present invention may be configured so that the display panel is an active matrix display panel and has a gate-line drive circuit for selecting the pixels of the. display area in row units, and a start signal of the gate-line drive circuit is inputted to the transparent/scattering switching element drive circuit. It is therefore possible to easily synchronize the timing for rewriting a frame of a display panel, and the timing for reversing the polarity of the voltage for driving the transparent/scattering switching element.

The power source of the gate-line drive circuit may be inputted to the transparent/scattering switching element drive circuit. A strong electric field can thereby be applied to the transparent/scattering switching element. When the electric field is too weak, the transparent/scattering switching element is not sufficiently driven at low temperatures, and a transparent state cannot be achieved. Therefore, unwanted viewing cannot be prevented. However, sufficient voltage can be applied and characteristics at low temperatures can be maintained by using the power source of the gate-line drive circuit.

The display panel may have a terminal portion for connecting the power supply and signals to the exterior, and the transparent/scattering switching element drive circuit may be formed between the terminal portion and the gate-line drive circuit. The start signal and power source of the gate-line drive circuit can therefore easily be used as the signal for driving the transparent/scattering switching element, and the connection with the transparent/scattering switching element can be made as short as possible. As a result, the size of the display device can be further reduced.

A polarity inversion of an output voltage of the transparent/scattering switching element drive circuit may be synchronized with the start signal of the gate-line drive circuit. The timing for rewriting a frame of the display panel and the timing for reversing the polarity of the voltage for driving the transparent/scattering switching element can therefore be perfectly synchronized, and flickering produced by offset timing can be reduced.

The transparent/scattering switching element drive circuit may have a counter circuit, and the counter circuit may be a 1-bit counter circuit. A rectangular wave suitable for driving the transparent/scattering switching element can thereby be generated, and the burn in of the transparent/scattering switching element can be prevented.

The counter circuit may be a counter circuit having two or more bits. The drive frequency of the transparent/scattering switching element can thereby be reduced. As a result, the power consumption of the transparent/scattering switching element can be reduced.

The transparent/scattering switching element drive circuit may have a transmission gate for the output of the counter circuit, and the output of the counter circuit may be controlled by the transmission gate.

The transparent/scattering switching element circuit may comprise thin-film transistors formed on the display panel, and the transparent/scattering switching element circuit may be formed by IC chips mounted on the display panel.

The light source is preferably a light-emitting diode. Since a light-emitting diode is thinner than a cold-cathode tube, the display device can be made thinner.

The display panel may be a liquid crystal panel. In this case the liquid crystal panel is preferably a liquid crystal panel having a horizontal electric field mode, a multi-domain vertical orientation mode, or a film-compensated TN mode. Grayscale inversion of the display can thereby be reduced and viewability improved when the transparent/scattering switching element is in a scattering state.

The display device may further comprise a light-ray restriction element for restricting the direction of light beams emitted from the light source and emitting the light beams toward the transparent/scattering switching element. The directivity of the light emitted from the light source can thereby be increased.

The terminal device according to the present invention comprises the above-described display device. The terminal device may be a mobile phone, personal digital assistant, game machine, digital camera, video camera, video player, notebook computer, cash dispenser, or automatic vending machine.

The display panel according to the present invention comprises a display area composed of pixels that are arranged in the form of a matrix, as well as a transparent/scattering switching element drive circuit to which at least a power supply and a signal for driving the pixels of the display area are inputted, and which outputs signals for driving the transparent/scattering switching element capable of switching between states in which light that has entered from the light source is transmitted or scattered.

The display panel is an active matrix display panel comprising a gate-line drive circuit for selecting pixels in row units, and a circuit into which a start signal of the gate-line drive circuit is inputted and from which a power supply voltage of the gate-line drive circuit is alternately outputted in synchronization with the start signal.

In accordance with the present invention, the drive power source of the transparent/scattering switching element for controlling scattering can be made smaller and less costly in a display device that is capable of switching the range of viewing angles.

The display device according to the present invention has a light source, a transparent/scattering switching element capable of switching between states in which light that has entered from the light source is transmitted or scattered, and a display panel for receiving light transmitted through the transparent/scattering switching element and displaying images, wherein the display panel has a display area composed of pixels that are arranged in the form of a matrix, and the transparent/scattering switching element is driven using at least one element selected from the power supply and the signal for driving the pixels of this display area.

In the present invention, another signal and power source does not need to be provided for the transparent/scattering switching element, and the display device can be made smaller and more inexpensive.

The display device may have a transparent/scattering switching element drive circuit to which at least a power supply and a signal for driving the pixels of this display area are inputted, and which outputs signals for driving the transparent/scattering switching element, and this transparent/scattering switching element drive circuit being formed on the display panel. This obviates the need to provide a transparent/scattering switching element drive circuit except to the display panel, making smaller size possible.

A control signal may be input to the transparent/scattering switching element drive circuit, with the output of the transparent/scattering switching element drive circuit turned on or off in accordance with the state of this control signal. It is possible thereby to control the transparent/scattering switching element through input of a single control signal only, facilitating reduction in size.

The transparent/scattering switching element drive circuit may have a circuit for reversing the polarity of the voltage for driving the transparent/scattering switching element, and this inversion operation may be accomplished using the signal for driving the pixels of the display panel. By so doing, the timing for rewriting a frame of a display panel, and the timing for reversing the polarity of the voltage for driving the transparent/scattering switching element can be set to optimal conditions, making possible improved picture quality.

Moreover, the display panel may be an active matrix display panel, and have a gate-line drive circuit for selecting the pixels of the display area in row units, with the start signal of the gate-line drive circuit being inputted to the transparent/scattering switching element drive circuit. Since the transparent/scattering switching element can thus be driven using the start signal of the gate-line drive circuit, it is possible to accurately set timing with the display panel in the reversing operation, making possible appreciable improvement in picture quality.

A plurality of series of gate-line drive circuits may be provided, and the polarity reversal operation of the transparent/scattering switching element may be accomplished using the start signal of the plurality of series of gate-line drive circuits. The frequency of reversing the polarity of the transparent/scattering switching element can be increased thereby, making possible high picture quality.

The frequency of reversing the polarity of the transparent/scattering switching element may be frequency modulated. It is possible thereby to attain high picture quality, while reducing power consumption by the transparent/scattering switching element.

A power supply for the gate-line drive circuit may be inputted to the transparent/scattering switching element drive circuit. By so doing, a strong electrical field can be applied to the transparent/scattering switching element. When electrical field is not sufficiently strong, the transparent/scattering switching element will not be driven sufficiently at low temperature and will fail to assume the transparent state, so that unwanted viewing can no longer be prevented; however, by using the power supply of the gate-line drive circuit, sufficient voltage can be applied, and good characteristics at low temperature can be maintained.

In preferred practice, the transparent/scattering switching element drive circuit will have at least one component selected from a counter circuit, a shift register circuit, a frequency divider circuit, and a delay circuit. By so doing, particularly in the case in which a counter circuit is used, the on/off operations or the polarity reversal operation of the transparent/scattering switching element can be accomplished with a simple design, making possible lower cost and improved reliability. Improved frequency of the polarity reversal operation can be attained as well, making possible improved picture quality. Where a frequency divider circuit is used, improved frequency of the polarity reversal operation can be attained as well. Where a delay circuit is used, the timing of the reversal operation can be optimized, making possible high picture quality. It is possible to optimize the timing of on/off operations as well. The delay circuit preferably incorporates a shift register circuit.

The transparent/scattering switching element may be divided into a plurality of electrically independent regions. Combined display of a transparent region and a scattering region on the same screen is possible thereby, making it possible to maintain privacy of important information only. Moreover, by executing reversal operations on a region-by-region basis, high picture quality is possible as well. Even higher picture quality can be achieved through driving in such a way that reversed polarity differs among adjacent blocks.

Temperature sensing unit may be formed on the display panel, and the transparent/scattering switching element driving circuit may drive the transparent/scattering switching element using the results of the temperature sensing unit. Driving conditions of the transparent/scattering switching element can thus be optimized according to ambient temperature conditions, making possible improved display capability and lower power consumption.

The transparent/scattering switching element driving circuit may have a circuit for controlling the light source, and the light source is controlled by this circuit. Control of the transparent/scattering switching element and the light source is facilitated thereby, and it is possible to optimize the timing of switching. As a result, the phenomenon of abnormal flare during switching can be suppressed and higher picture quality attained; and luminance of the display during switching can be reduced, explicitly indicating when the display is switched between narrow viewing angle display and wide viewing angle display.

The display panel may have a terminal for connecting the power supply and signal with the outside, and the transparent/scattering switching element drive circuit may be formed between this terminal and the gate-line drive circuit. This makes it easy to divert the power supply and the start signal from the gate-line drive circuit, as well as to provide the shortest possible connection to the transparent/scattering switching element. Further reductions in the size of the display device are possible as a result.

Wiring for connecting the display panel with the outside, and wiring for connecting the transparent/scattering switching element with the display panel may also be integrally formed. It is possible thereby to reduce the number of wiring, as well as to reduce the number of wiring attached to the display panel, thus reducing cost.

The transparent/scattering switching element drive circuit may be configured using a thin-film transistor formed on the display panel, or the transparent/scattering switching element drive circuit may be formed on an IC chip mounted on the display panel.

The display device may have a light beam direction restricting element for restricting the direction of a light beam emitted from the light source and emitting the light beam toward the transparent/scattering switching element. The direction of light emitted from the light source can be increased thereby.

The terminal device in accordance with the present invention has the aforementioned display device. This terminal device may be a mobile phone, personal digital assistant, game machine, digital camera, video camera, video player, notebook computer, cash dispenser, or automatic vending machine.

DESCRIPTION OF THE PREFERRED EMBODIMENTS

Figure 4:
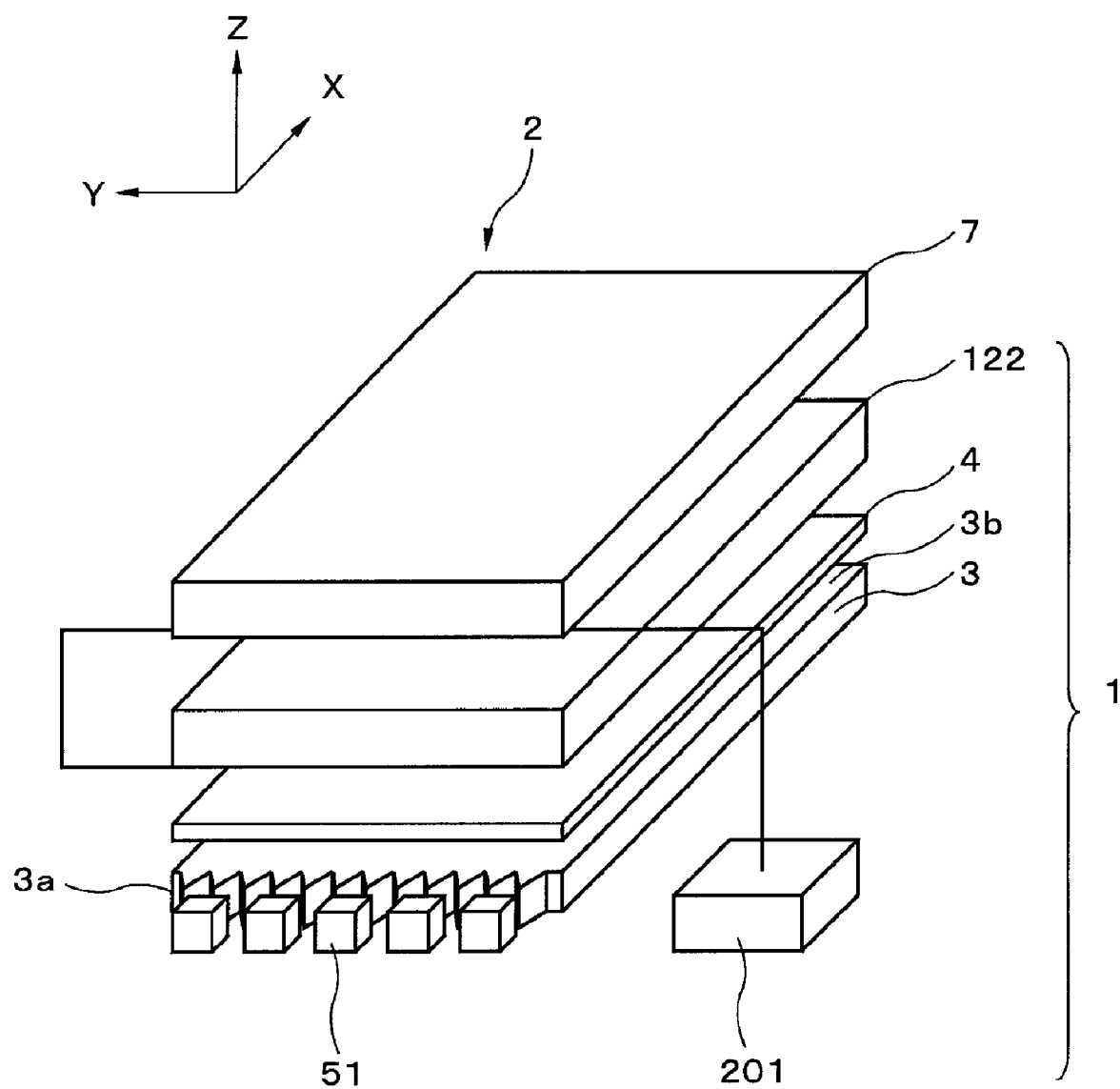
FIG. 4 is a perspective view showing the display device according to a first embodiment of the present invention.
Figure 5:
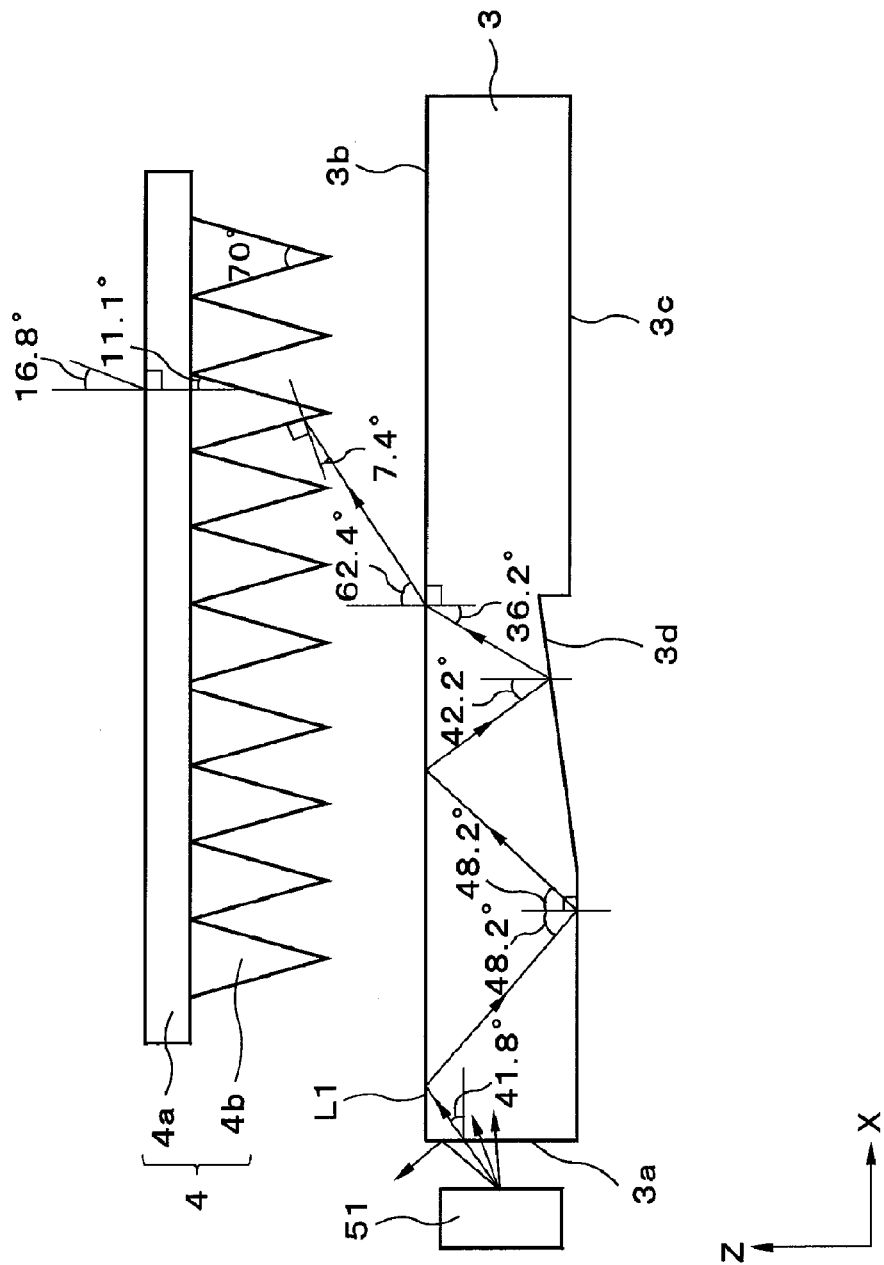
FIG. 5 is a cross-sectional diagram showing a light source, light guide plate, and optical film, which are constituent elements of the display device.
Figure 6:
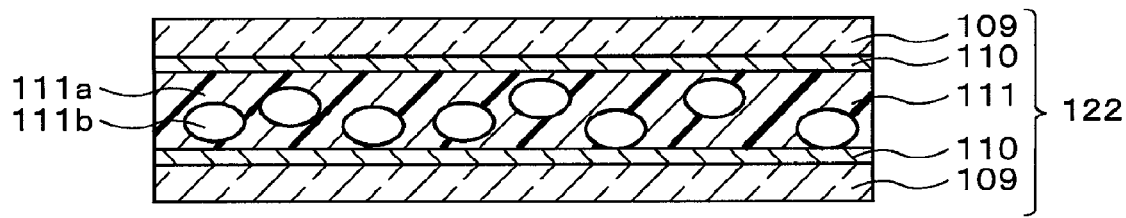
FIG. 6 is a cross-sectional diagram showing a transparent/scattering switching element, which is a constituent element of the display device.
Figure 7:
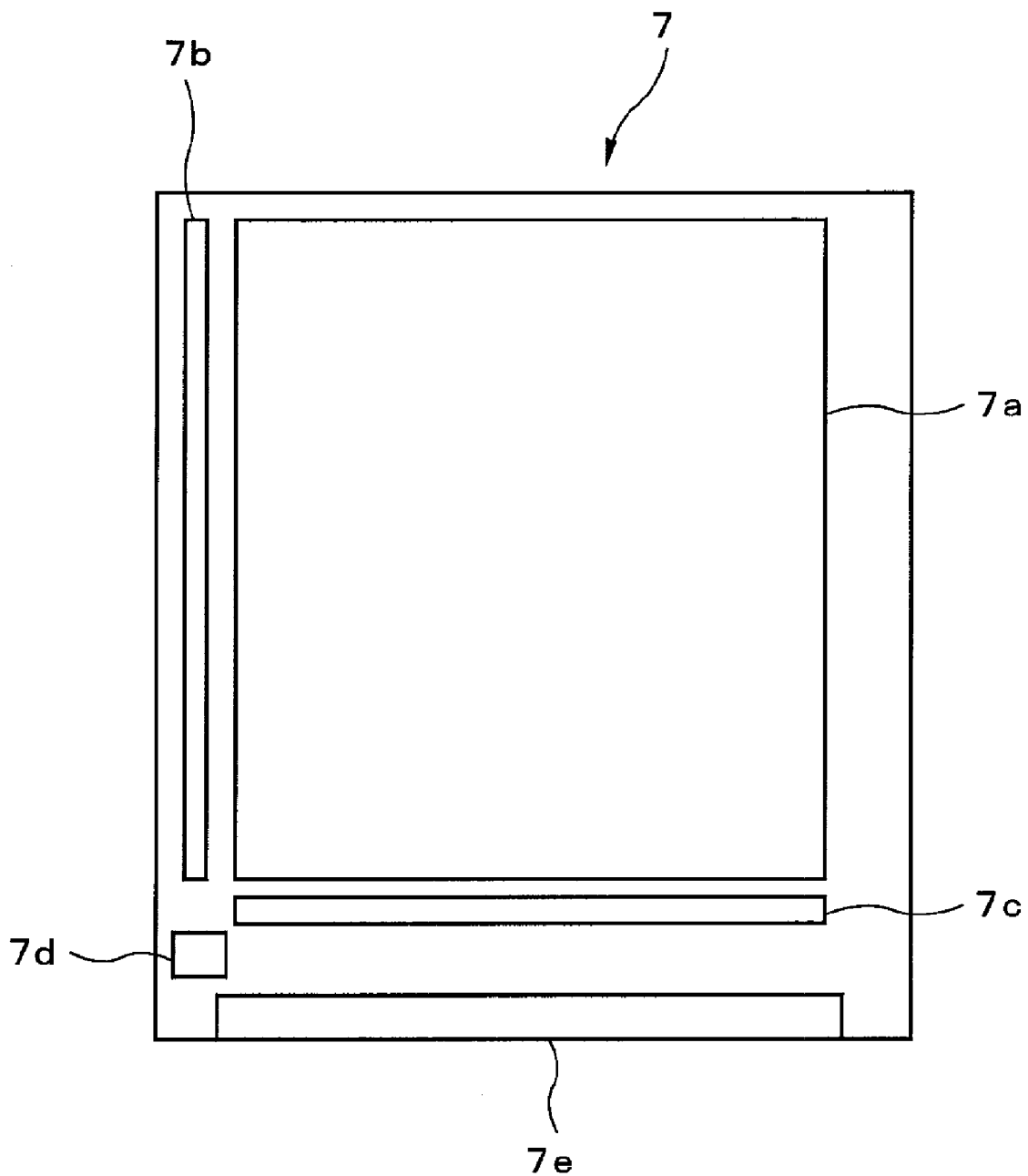
FIG. 7 is a top view showing the configuration of a transmissive LCD panel, which is a constituent element of the display device.
Figure 8:
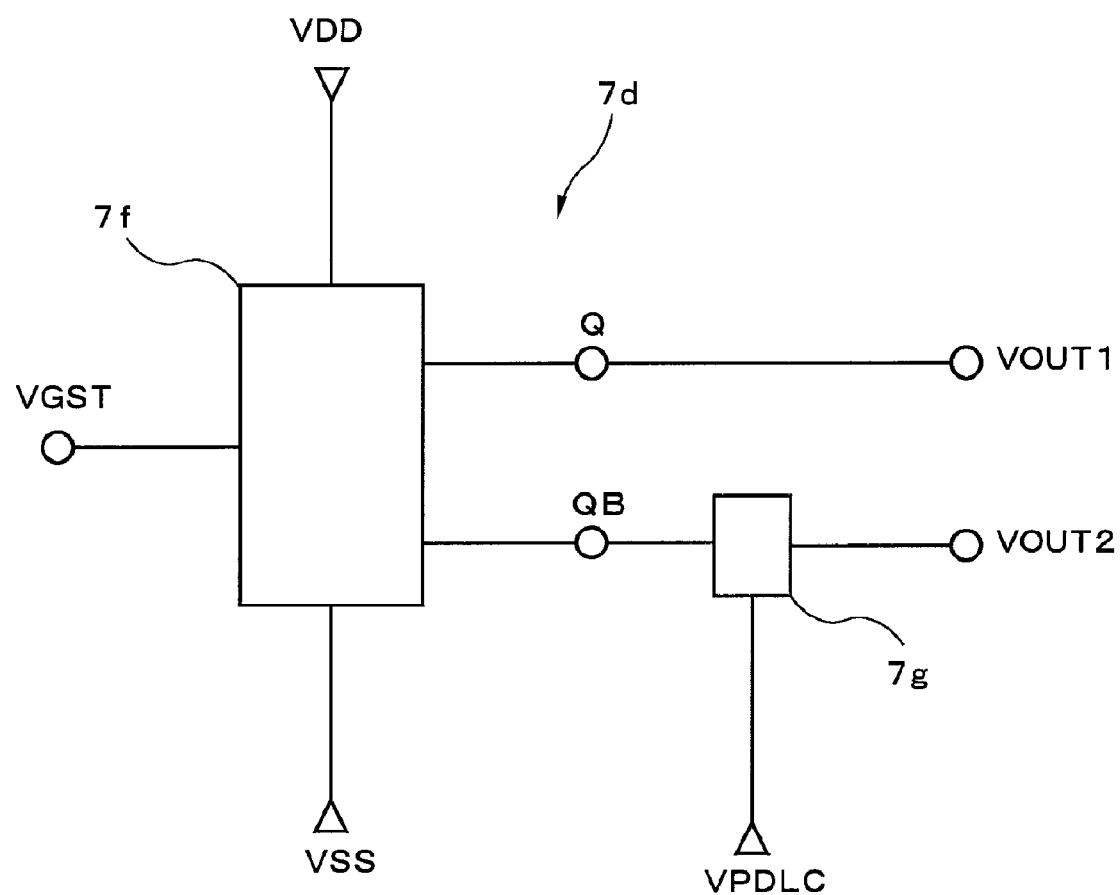
FIG. 8 is a circuit diagram of the transparent/scattering switching element drive circuit used for driving the transparent/scattering switching element.
Figure 9:
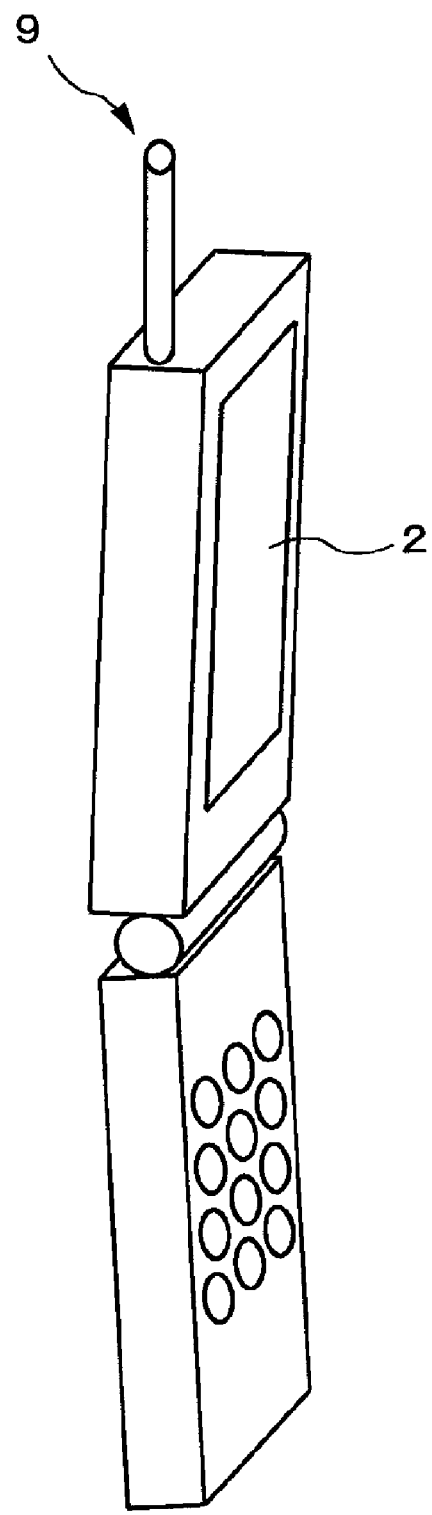
FIG. 9 is a perspective view showing the terminal device according to the present embodiment.

The display device, terminal device, and display panel according to embodiments of the present invention are described in detail below with reference to the attached diagrams. The display device, terminal device, and display panel according to a first embodiment of the present invention will first be described. FIG. 4 is a perspective view showing the display device according to the first embodiment of the present invention. FIG. 5 is a cross-sectional diagram showing a light source, light guide plate, and optical film, which are constituent elements of the display device. FIG. 6 is a cross-sectional diagram showing a transparent/scattering switching element, which is a constituent element of the display device. FIG. 7 is a top view showing the configuration of a transmissive LCD panel, which is a constituent element of the display device. FIG. 8 is a circuit diagram of the transparent/scattering switching element drive circuit used for driving the transparent/scattering switching element. FIG. 9 is a perspective view showing the terminal device according to the present embodiment.

A display device 2 according to the first embodiment is composed of a light source device 1 and a transmissive LCD panel 7, as shown in FIG. 4. A light-guide plate 3 comprising a transparent material is disposed in the light source device 1, and the shape of the light-guide plate 3 is that of a rectangular plate. A light source is disposed in a position facing one side surface (light-incident surface 3a) of the light-guide plate 3. The light source is a white LED (Light Emitting Diode) 51, for example. A plurality of white LEDs 51 is disposed along the light-incident surface 3a of the light-guide plate 3, and the number of LEDs is five, for example. In the light-guide plate 3, light inputted from the light-incident surface 3a is uniformly emitted from the main surface (light-excident surface 3b).

An optical film 4 is disposed on the light-excident surface 3b side of the light-guide plate 3. The optical film 4 is used for deflecting light emitted from the light-guide plate 3 toward the normal direction of the light-excident surface of the light-guide plate 3. A transparent/scattering switching element 122 is disposed on the light-excident surface side of the optical film 4. When light that has entered from the optical film 4 is emitted to the opposite side thereof, the transparent/scattering switching element 122 switches between a light-scattering state and a state in which light is allowed to directly pass without being scattered. The transmissive LCD panel 7 described above is disposed on the light-excident surface side of the transparent/scattering switching element 122, and an image is added to this light by allowing the light to pass. A control circuit 201 for controlling the transmissive LCD panel 7 is also provided.

For the sake of convenience in the present specification, an XYZ rectangular coordinate system is defined in the following manner. The +X direction is defined to be the direction facing from the white LED 51 toward the inside of the light-guide plate 3, and the −X direction is defined to be the direction opposite thereto. The +X direction and −X direction will be generically referred to as the X-axis direction. Of the directions parallel to the light-excident surface 3b of the light-guide plate 3, the direction orthogonal to the X-axis direction is defined as the Y-axis direction. The Z-axis direction is defined to be the direction orthogonal to the X- and Y-axis directions. Of the Z-axis directions, the +Z direction is defined to be the direction facing from inside the light-guide plate 3 toward the light-excident surface 3b, and the −Z direction is defined to be the direction opposite thereto. The +z direction is the forward direction, i.e., the direction facing the user. The +Y direction is defined to be the direction in which a right-hand coordinate system is established. Specifically, when the human right-hand thumb is pointed in the +X direction and the index finger is pointed in the +Y direction, the middle finder is pointed in the +Z direction.

When the XYZ rectangular coordinate system is established in the manner described above, the light-excident surface 3b of the light-guide plate 3 is set in the XY plane, the white LED 51 is disposed in the −X direction as viewed from the light-guide plate 3, and the optical film 4 is disposed in the +Z direction. The transparent/scattering switching element 122 is disposed in the +Z direction as viewed from the optical film 4.

FIG. 5 is a cross-sectional diagram of the optical film 4 and light-guide plate 3 along the X axis shown in FIG. 4. FIG. 5 shows an example of the trajectory of the light beams. The example will be described in detail below. A diffusion pattern is formed on the light-incident surface 3a in order to reduce in-plane brightness nonuniformity in the light-excident surface 3b due to the location of the LED, as shown in FIGS. 4 and 5. A sloped surface 3d is formed on a light-diffusion surface 3c, as shown in FIG. 5. The sloped surface 3d is sloped in the direction of irradiation of light that has been emitted by the white LED 51, which is a light source, and that has passed through the interior of the light-guide plate 3 in the +X direction. The slope angle with respect to the X-axis direction of the sloped surface 3d is 6 degrees, for example. A plurality of the sloped surfaces 3d is arrayed in the X-axis direction, and the sloped surfaces extend across the entire length of the light-guide plate 3 along the Y-axis direction. An anisotropic hologram pattern (not shown) is formed on the light-excident surface 3b of a light-guide plate in the XY plane. The directivity of the light propagated through the light-guide plate 3 and emitted from the light-excident surface 3b is increased in the Y-axis direction by the hologram pattern.

The optical film 4 is composed of a flat plate portion 4a, and a plurality of one-dimensional prism bodies 4b formed on the surface facing the light-guide plate 3 of the flat plate portion 4a. The ridge line of the one-dimensional prism bodies 4b extends in the Y-axis direction, the prism bodies protrude in the −Z direction, and the one-dimensional prism bodies 4b are arrayed along the X-axis direction. The vertices of the one-dimensional prism bodies 4b is set to be 70 degrees, for example. The protruding direction of the one-dimensional prism bodies 4b, i.e., the direction that is parallel to the surface which bisects the side surface of the one-dimensional prism bodies 4b and that is orthogonal to the Y-axis direction, is congruent with the Z-axis direction. With the optical film 4 on which the one-dimensional prism bodies 4b are formed, light emitted from the light-guide plate 3 is deflected in the +Z direction in the XZ plane, and the light having high directivity is emitted in the +Z direction.

As described above, the hologram pattern formed on the light-excident surface 3b of the light-guide plate functions to increase directivity in the Y-axis direction. Therefore, the light emitted from the optical film 4 is light having high directivity in the +Z direction in relation to the X- and Y-axis directions. From the standpoint of ease of processing, a transparent resin is advantageously used as the material of the light-guide plate 3 and optical film 4. However, polymethylmethacrylate (PMMA), which has an index of refraction of 1.5, is used in the present embodiment.

FIG. 6 is a cross-sectional diagram of the transparent/scattering switching element 122 disposed on the light-excident surface side of the optical film 4. Two mutually parallel transparent substrates 109 are disposed in the transparent/scattering switching element 122, and electrodes 110 are disposed on the opposing surfaces of the pair of the transparent substrates 109 so as to cover the surface of the transparent substrates 109. A PDLC (Polymer Dispersed Liquid Crystal) layer 111 is held between the transparent substrates 109, i.e., between the electrodes 110. Liquid crystal molecules 111b are dispersed in a polymer matrix 111a in the PDLC layer 111. The PDLC layer 111 is formed by exposing to light a mixture of a photocurable resin and a liquid crystal material, and curing the mixture.

The orientation of the liquid crystal molecules 111b in the PDLC layer 111 is varied by applying voltage to the PDLC layer 111 by way of the pair of electrodes 110 in the transparent/scattering switching element 122. When an electric field is not applied to the PDLC layer, for example, the incident light is scattered and emitted in a scattered state because a scattering state is created in which the apparent indices of refraction of the liquid crystal molecules and the polymer matrix are different. Conversely, when an electric field is applied to the PDLC layer, the apparent indices of refraction of the liquid crystal molecules and the polymer matrix are substantially the same, creating a transparent state in which the incident light is emitted without being scattered. Thus, the transparent/scattering switching element 122 scatters or transmits the incident light and emits the light toward the transmissive LCD panel 7. An AC current having a rectangular wave or another shape must be applied to the transparent/scattering switching element in order to prevent burn-in.

FIG. 7 is a top view showing the configuration of the transmissive LCD panel 7. The transmissive LCD panel 7 is an active matrix LCD panel provided with a pixel area 7a used for displaying images, a gate-line drive circuit 7b and a data-line drive circuit 7c for driving the pixels that are present in the pixel area 7a, a transparent/scattering switching element drive circuit 7d for driving the transparent/scattering switching element 122, and a terminal portion 7e for connecting the transmissive LCD panel 7 and the control circuit 201 used to control the transmissive LCD panel 7. Thin-film transistors for switching the pixels are disposed on the active matrix LCD panel, and the gate-line drive circuit 7b is a circuit for switching the gates of the thin-film transistors. The gate-line drive circuit 7b is composed of a shift register, to which are connected power sources VDD and VSS for a transistor comprising a shift register circuit, as well as a start signal VGST and a clock signal VCLK for gate scanning. In the present embodiment, a gate-line drive circuit 7b is formed using the thin-film transistor described above. The transparent/scattering switching element drive circuit 7d is disposed between the gate-line drive circuit 7b and the terminal portion 7e.

FIG. 8 is a circuit diagram of the transmissive LCD panel 7 used for driving the transparent/scattering switching element. As described above, the transparent/scattering switching element drive circuit 7d is disposed between the gate-line drive circuit 7b and the terminal portion 7e. The transparent/scattering switching element drive circuit 7d is formed using thin-film transistors in the same manner as the gate-line drive circuit 7b, and is configured as a CMOS (Complementary Metal Oxide Semiconductor). The power sources VDD and VSS of the gate-line drive circuit 7b are connected as circuit power sources, a start signal VGST is inputted as a signal, and a control signal VPDLC is inputted in order to control the state of the circuit. Two outputs VOUT1 and VOUT2 are provided to the transparent/scattering switching element drive circuit 7d, and the two outputs are connected to the pair of electrodes 110 of the transparent/scattering switching element 122 by way of the terminal portion 7e. The transparent/scattering switching element drive circuit 7d has a 1-bit counter circuit 7f and a transmission gate circuit 7g. Power sources VDD and VSS and a start signal VGST of the gate-line drive circuit are connected to the 1-bit counter circuit 7f, and the control signal VPDLC and one of the outputs of the 1-bit counter circuit 7f are connected to the transmission gate circuit 7g. Among the outputs of the 1-bit counter circuit 7f, the output that is not connected to the transmission gate circuit 7g is assigned the reference symbol Q, and the output that is connected to the transmission gate circuit is assigned the reference symbol QB. The output Q is connected to the output terminal VOUT1, and the other output QB is connected to the output terminal VOUT2 by way of the transmission gate circuit 7g. An example of the transmissive LCD panel 7 is a toggle flip-flop circuit, and QB is the inverted output of Q. The transmission gate circuit 7g is a circuit for controlling the output to the VOUT2. When the control signal VPDLC is at a high level, QB is outputted unchanged to the VOUT2. When the control signal VPDLC is at a low level, the output terminal VOUT2 is opened.

The display device 2 is mounted, for example, in the display unit of a mobile phone 9, as shown in FIG. 9. Specifically, the mobile phone 9 as the terminal device according to the present embodiment is provided with the above-described display device 2.

Figure 10:
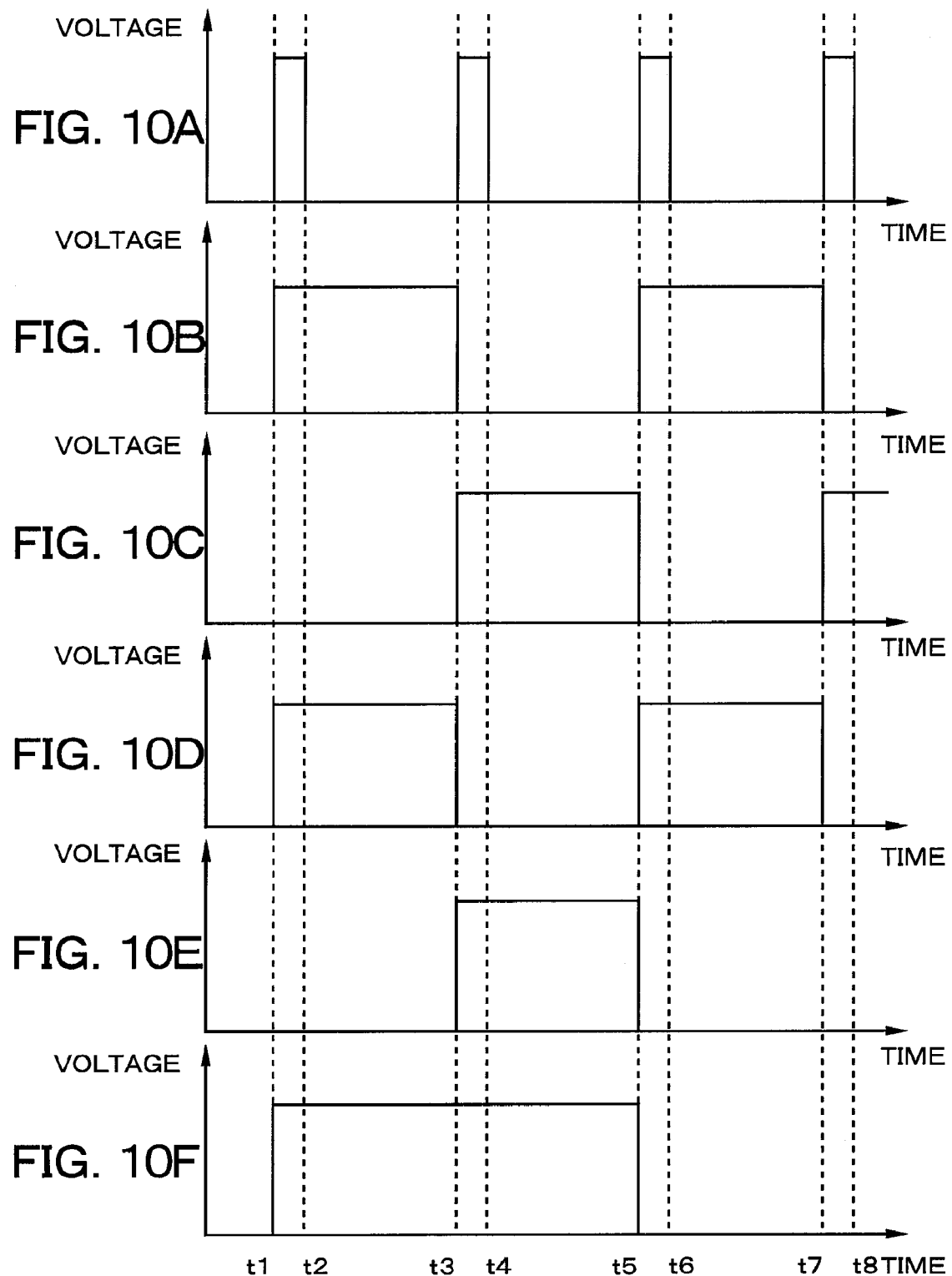
FIGS. 10A to 10F are timing charts showing the operation of the transparent/scattering switching element drive circuit in the display device according to the present embodiment, wherein the horizontal axes represent time, the vertical axis in FIG. 10A represents the voltage of the start signal VGST of the gate-line drive circuit, the vertical axis in FIG. 10B represents the voltage of a first output Q of the 1-bit counter circuit, the vertical axis in FIG. 10C represents the voltage of a second output QB of the 1-bit counter circuit, the vertical axis in FIG. 10D represents the voltage of the output terminal VOUT1, the vertical axis in FIG. 10E represents the voltage of the output terminal VOUT2, and the vertical axis in FIG. 10F represents the voltage of the control signal VPDLC.

Described next is the method for operating the display device according to the present embodiment configured in the manner described above, i.e., the method for driving the display device according to the present embodiment. FIGS. 10A to 10F are timing charts showing the operation of the transparent/scattering switching element drive circuit in the display device according to the present embodiment, wherein the horizontal axes represent time, the vertical axis in FIG. 10A represents the voltage of the start signal VGST of the gate-line drive circuit, the vertical axis in FIG. 10B represents the voltage of a first output Q of the 1-bit counter circuit, the vertical axis in FIG. 10C represents the voltage of a second output QB of the 1-bit counter circuit, the vertical axis in FIG. 10D represents the voltage of the output terminal VOUT1, the vertical axis in FIG. 10E represents the voltage of the output terminal VOUT2, and the vertical axis in FIG. 10F represents the voltage of the control signal VPDLC.

Described first is the operation during narrow viewing angle display. During narrow viewing angle display, the white LED 51, which is a light source, emits light and the transparent/scattering switching element 122 is driven so as to produce a transparent state. The white LED 51 is lighted and the light emitted from the white LED 51 enters the light-guide plate from the light-incident surface 3a of the light-guide plate 3. As described above, the light that has entered the light-guide plate is also diffused in the Y-axis direction inside the light-guide plate because a diffusion pattern is provided to the light-incident surface 3a.

The optical path of the light that has entered the light-guide plate 3 is described next with focus on the light that propagates through X-Z plane. The angle formed in the Z-axis direction by the +X direction and the direction in which the light travels after having entered the light-guide plate 3 is less than 41.8 degrees on the basis of Snell's law due to the difference in the indices of refraction of air and the resin material that forms the light-guide plate 3, as shown in FIG. 5. In view of this fact, following is a discussion of the light beam L1 sloped 41.8 degrees in the +Z direction with respect to the +X direction.

The light beam arrives at the light-excident surface 3b of the light-guide plate 3, and the angle with respect to the Z-axis direction is 48.2 degrees. Since this angle is greater than the critical angle 41.8, the light beam undergoes total reflection and does not escape the light-guide plate 3. In a similar manner, when light has entered an area other than the sloped surface 3d, the light is totally reflected at the same angle in the light-diffusion surface 3c as well. Therefore, the light undergoes repeated total reflection between the light-excident surface 3b and light-diffusion surface 3c while being propagated in the direction away from the white LED 51. During this propagation, when the light beam L1 enters the sloped surface 3d, which is sloped 6 degrees with respect to the X-axis direction, the angle is 42.2 degrees from the normal line of the sloped surface 3d, and since the value is greater than the critical angle of 41.8 degrees, the light undergoes total reflection and does not escape the sloped surface 3d to the exterior of the light-guide plate 3. However, the angle of the light beam L1 with respect to the Z-axis direction after total reflection is 36.2 degrees, and since the angle is less that the critical angle, the light that has arrived at the light-excident surface 3b is emitted from the light-guide plate 3 to the exterior, and the angle of the escaped light is 62.4 degrees with respect to the Z-axis direction.

As described above, light that has entered the light-guide plate 3 always has an angle of 41.8 degrees or less with respect to the X-axis direction after entry. For this reason, when the incident light has arrived at the light-excident surface 3b or light-diffusion surface 3c of the light-guide plate 3, the arriving light has an angle of 48.2 degrees or more with respect to Z-axis direction and undergoes total reflection. In the process in which this light is totally reflected in the light-excident surface 3b and light-diffusion surface 3c and propagated inside the light-guide plate 3, the angle of the direction of travel of light with respect to the Z-axis direction approaches the critical angle each time the light is totally reflected by the sloped surface 3d, which has a slope of 6 degrees. At the point where this angle becomes less than the critical angle, the light escapes the flat surface of the light-excident surface 3b or the light-diffusion surface 3c. As a result, the light emitted from the light-guide plate 3 has strong directivity in the direction sloped about 60 degrees from the Z-axis direction in the XZ plane.

The light L1 emitted from the light-guide plate 3 at a slope of 62.4 degrees with respect to the Z-axis direction enters the optical film 4. Since the vertices of the one-dimensional prism bodies 4b are 70 degrees, the angle at which the light enters the one-dimensional prism bodies 4b is 7.4 degrees, and the angle between the normal to the incident surface of a conical body and the direction of travel of the light beam that has entered the interior of the one-dimensional prism bodies 4b is 4.9 degrees. Thereafter, the light L1 arrives at the opposite surface of the one-dimensional prism bodies 4b. The angle with respect to this surface is 65.1 degrees from the normal line of the surface. Therefore, the light undergoes total reflection and travels in a direction 11.1 degrees from the Z axis. The angle of the light L1 that subsequently escapes the optical film 4 is 16.8 degrees from the Z axis due to Snell's law. In other words, the light emitted from the optical film 4 has strong directivity in substantially the Z-axis direction in the XZ plane.

The directivity in the Y-axis direction is described next. As described above, the light emitted from the white LED 51 enters the light-guide plate 3 and is thereafter diffused at least in the XY plane. The component of light diffused in the Y-axis direction is collected by the hologram pattern formed on the light-excident surface as described above, and the directivity is increased. In other words, the irradiation range of light emitted from the optical film 4 is limited to a narrow angle range.

The light emitted from the optical film 4 then enters the transparent/scattering switching element 122. As described above, since voltage is applied to the transparent/scattering switching element 122 and the switching element is set to a transparent state, highly directive light passes through the transparent/scattering switching element 122 without being scattered. Specifically, the light is emitted from the transparent/scattering switching element 122 while retaining high directivity. This light having a highly directive distribution enters the transmissive LCD panel 7, an image is added, and the light is emitted while retaining its high directivity. In this manner, an image is displayed at a narrow viewing angle.

The operation of the transparent/scattering switching element drive circuit 7d when the narrow viewing angle is in effect is described next. As described above, the power sources VDD and VSS and the start signal VGST of the gate-line drive circuit are connected to the 1-bit counter circuit 7f that constitutes the transparent/scattering switching element drive circuit 7d. The outputs VDD and VSS are repeated in an alternating fashion at the output Q and the inverted output QB of the 1-bit counter circuit 7f each time the start signal VGST is set to a high level, as shown in FIGS. 10A to 10C. Specifically, when VGST is set to a high level at time t1, the output Q is set to a high level. VGST drops to a low level at time t2. When the VGST is subsequently set to a high level at time t3, the output Q is set to a low level, and the output QB is set to a high level. VGST drops to a low level at time t4. The same is repeated at time t5 and thereafter. In this manner, each time VGST is set to a high level, the output Q is repeatedly set to a high level and a low level, and the output QB produces an inverted signal of the level. The voltage of the high level in the present embodiment is VDD, and the voltage of the low level is VSS.

The output Q of the 1-bit counter circuit 7f is directly connected to the output terminal VOUT1, as shown in FIG. 8. Therefore, the waveform of VOUT1 is the same as that of the output Q, as shown in FIG. 10D. The output QB is connected to the transmission gate circuit 7g, and the transmission gate circuit 7g directly outputs the output QB to VOUT2 when the control signal VPDLC is at a high level, as described above. Since the control signal VPDLC is at a high level until time t5, as shown in FIGS. 10E and 10F, the signal of QB during this interval is outputted unchanged to VOUT2.

During the interval in which the control signal VPDLC is at a high level, VOUT1 is repeatedly set to a high level and a low level in an alternating fashion, and VOUT2 is set to the inverted output each time VGST is set to a high level. As described above, since VOUT1 and VOUT2 are connected to the pair of electrodes 110 of the transparent/scattering switching element 122, the voltage of VDD-VSS is applied to the PDLC layer and the polarity is inverted each time VGST is set to a high level. Specifically, a voltage having a rectangular waveform is applied to the transparent/scattering switching element 122, and the transparent/scattering switching element 122 is set to a transparent state as a result.

The operation during wide viewing angle display is described next. During wide viewing angle display, the white LED 51 as a light source emits light, and the transparent/scattering switching element 122 is driven so as to be placed in a scattering state. Light emitted from the white LED 51 is propagated through the light-guide plate 3 and emitted from the optical film 4 in a narrow range of viewing angles in the same manner as during narrow viewing angle display. This light is subsequently inputted to the transparent/scattering switching element 122. Since voltage is not applied and the transparent/scattering switching element 122 is set to a scattering state, highly directive light is uniformly scattered by the transparent/scattering switching element 122 and dispersed in a wide range of viewing angles. In other words, the light is scattered by the transparent/scattering switching element 122, and the directivity is reduced to produce wide-angle light. The light having a highly directive distribution enters the transmissive LCD panel 7, an image is added, and the light is emitted unchanged as wide-angle light. In this manner, an image is displayed at a wide viewing angle.

The operation of the transparent/scattering switching element drive circuit 7d when the wide viewing angle is in effect is described next. The control signal VPDLC is set to a low level during wide viewing angle display. As a result, voltage is not output to the output terminal VOUT2, as shown in FIGS. 10E and 10F. Voltage is therefore not applied to the transparent/scattering switching element 122, and the transparent/scattering switching element 122 is thereby left in a scattering state.

The effects of the present embodiment are described next. In accordance with the display device according to the present embodiment, the signal and power source of the gate-line drive circuit of the transparent/scattering switching element can be used in order to drive the transparent/scattering switching element. Therefore, another signal and power source of the transparent/scattering switching element is not required and the size and cost of the display device can be reduced. A rectangular waveform suitable for driving the transparent/scattering switching element can be generated by using a counter circuit, and transparent/scattering switching element burn-in can be prevented. The polarity of the voltage for driving the transparent/scattering switching element can be synchronized with the start signal of the gate-line drive circuit and inverted. Specifically, since the timing of the start of the gate-line drive circuit and the timing of the polarity inversion of the PDLC layer of the transparent/scattering switching element can be perfectly synchronized, flickering produced when the timing is offset can be reduced. Also, the power source of the gate-line drive circuit is used as the power source of the transparent/scattering switching element drive circuit, whereby a strong electric field can be applied to the PDLC layer. When the electric field is too weak, the PDLC layer is not sufficiently driven at low temperatures and a transparent state is not produced. Therefore, unwanted viewing cannot be prevented. However, sufficient voltage can be applied and the characteristics at low temperatures can be maintained by using the power source for the gate-line drive circuit. The power source and start signal of the gate-line drive circuit can easily be used by disposing the transparent/scattering switching element drive circuit between the terminal portion and the gate-line drive circuit, and the connection with the transparent/scattering switching element can be made as short as possible. As a result, the size of the display device can be further reduced.

In the present embodiment, the transparent/scattering switching element drive circuit was described as being composed of CMOS transistors, but no limit is imposed thereby, and the configuration may consist solely of N channel MOS transistors, or may consist solely of P channel MOS transistors. Since the number of process steps for manufacturing the transistors can thereby be reduced, costs can also be reduced. When consisting only of p-channel MOS transistors, the voltage levels corresponding to ON and OFF are the reverse of the above description, and operation of the device must occur in consideration of this point.

In the above-described transparent/scattering switching element drive circuit, thin-film transistors are formed on the transmissive LCD panel, but no limitation is imposed thereby, and the transistors maybe housed in ICs mounted on the transmissive LCD panel.

The power source of the transparent/scattering switching element drive circuit was described in which the power source of the gate-line drive circuit was used, but no limitation is imposed thereby, and another power source may be used. An example of such a power source is the power source of a gate-line drive circuit.

The gate electrodes of the thin-film transistors provided in the pixels must be controlled at a voltage that is larger than that of the drain electrode and source electrode to which the image signals are input and output. The output voltage of the gate-line drive circuit for controlling the gate electrode must therefore be higher than that of the data-line drive circuit for outputting the image signals. This means that the power source voltage required for the data-line drive circuit is lower than the power source voltage required for the gate-line drive circuit. Specifically, by utilizing the power source for the data-line drive circuit instead of the power source for the gate-line drive circuit, operation can be conducted at a lower voltage, and power consumption can thus be reduced. This is a significant advantage for portable terminal devices. With these types of portable terminal devices, the primary mode in which devices are used involves display at a narrow viewing angle while the transparent/scattering switching element is in the transparent state. Thus, a transparent/scattering switching element of the type that is in a transparent state when voltage is not applied is used as the transparent/scattering switching element, but when the power source of the data-line drive circuit is utilized to reduce the voltage, it becomes impossible to obtain sufficient scattering under low-temperature conditions. However, because there are few situations in which wide-angle display is required at low temperatures as described above, this is not a serious problem, so reduction in voltage is possible. By utilizing the low-voltage power source in this manner for transparent/scattering switching elements that are in a transparent condition when voltage is not applied, it is possible to enjoy the benefits of reduced power while meeting the performance demands of the environment of use.

In general, a power source has a positive terminal and a negative terminal. The positive terminal can be used to power the gate-line driving circuit, the negative terminal can be used to power the data-line drive circuit, and other combinations of positive and negative terminals can be used in a power source. A voltage that is appropriate for driving the transparent/scattering switching element can thereby be selected. In addition, by changing the combination of power sources in accordance with temperature conditions and other external environmental factors, driving can be optimized to the conditions of use, thereby optimizing the display quality and power. In cases in which, for example, a transparent/scattering switching element that assumes the scattering state in the absence of applied voltage is used, it is necessary to drive the element at a high voltage in order to obtain sufficient transparency at low temperatures. However, high-voltage driving becomes possible through utilizing the positive/negative power source of the gate-line drive circuit, thereby making it possible to ensure transparency. Thus, the drive voltage can be reduced under ordinary conditions of use, and power can be reduced by driving the data-line drive circuit using the positive/negative power source.

The light source was described in which a white LED was used, but no limitation is imposed thereby. Other LEDs may be also used, and a cold-cathode tube or another non-LED light source may be used.

The transparent/scattering switching element is not limited to one that is provided with a PDLC layer, and any element can be used as long as the element can switch between transparent and scattering states. For example, the element may be one that uses a polymer network liquid crystal (PNLC), or one that uses dynamic scattering (DS). In the present embodiment, a PDLC layer is used in which a scattering state is produced when voltage is not applied, and a transparent state is produced when voltage is applied. The transparent/scattering switching element does not therefore consume power when in a scattering state, and a corresponding amount of power can be assigned to the light source. Therefore, the luminous energy of the light source can be increased during the scattering state without increasing the load on the battery. A PDLC layer may be used in which a transparent state is produced when voltage is not applied and a scattering state is produced when voltage is applied. Such a PDLC layer can be fabricated by exposing a polymer matrix to light and photocuring the matrix while voltage is applied. Therefore, in the frequently used narrow viewing angle display in a portable information terminal, voltage does not need to be applied to the PDLC layer, and power consumption can be reduced. Cholesteric liquid crystals, ferroelectric liquid crystals, or other liquid crystals may be used as the liquid crystal molecules in the PDLC layer. These liquid crystals have memory properties in which the crystals remain in the oriented state that was produced when voltage was applied, even when the applied voltage is switched off. Power consumption can by reduced by using such a PDLC layer.

As shown in FIGS. 4 and 7, the transparent/scattering switching element 122 is electrically connected to a transmissive LCD panel 7. The wiring used for this connection may be wiring that is not integrated with the wiring that connects the control circuit 201 and the transmissive LCD panel 7. A flexible cable in which the wiring is formed by patterning copper on a thin film of heat-resistant plastic such as polyimide is suitable for this type of wiring and is optimal from the standpoint of reducing size and weight. It is particularly desirable for the flexible cable that connects the control circuit 201 and the transmissive LCD panel 7, and the flexible cable that connects the transmissive LCD panel 7 and the transparent/scattering switching element 122 to be molded as an integrated body. The number of flexible cables can thereby be reduced and the number of crimping repetitions can also be reduced, allowing reduction in cost and increase in yield. In comparison to cases in which integrated molding is not carried out, the size of the layout pattern on the transmissive LCD panel can be reduced, allowing reduction in size. This is because it is necessary to provide a margin in consideration of misalignment during crimping of the two flexible cables when integrated molding is not carried out.

The thin-film transistors are polysilicon thin-film transistors produced using polycrystalline silicon as the semiconductor. The polysilicon thin-film transistors are produced, for example, by forming a silicon oxide layer on a glass substrate that constitutes the display panel, forming an amorphous silicon layer, and then converting this amorphous silicon layer into polycrystalline material, thereby forming a polysilicon thin film. A means for polycrystalline conversion involves using a thermal annealing method or laser annealing method. However, non-alkali glass or the like having a low melting point can be used when the laser annealing method employs a laser such as an excimer laser, because it is possible to heat only the silicon layer to convert the layer into polycrystalline material, while keeping the temperature increase of the glass substrate at a minimum. Costs can thereby be reduced, and this method is thus frequently used for low-temperature polysilicon. By eliminating this annealing step, an amorphous silicon thin-film transistor can be realized. Next, a silicon oxide layer is formed on the silicon layer as a gate insulating layer, and the layer is appropriately patterned. In this process, a suitable ion is doped into a region other than the part of the silicon thin film to be used as a semiconductor layer, producing a p- or n-type region or a conductive region. An optical patterning technique that employs photosensitive resist is suitable as the patterning technique. For example, after spin-coating a photosensitive resist, partial irradiation with light is carried out using a development device such as a stepper, and a developing step is carried out so that the photosensitive resist film remains only in the sections where the pattern is to be left. Subsequently, the silicon layer in the regions on which the photosensitive resist film does not remain is removed by means of dry etching or the like, and the photosensitive resist film is finally removed. Next, a tungsten silicide layer and amorphous silicon layer that will become the gate electrode are formed, and a gate electrode or the like is formed. At this time, a storage capacity line or scan line for connecting a gate electrode may be similarly formed. Next, a silicon oxide layer and silicon nitride layer are formed. After patterning appropriately, the aluminum layer and titanium layer are formed as films, and a source electrode and drain electrode are formed. A thin-film transistor that is suitable for the present embodiment can thus be formed. In addition, in order to realize pixel structures, a silicon nitride layer is formed as a film and is patterned appropriately, whereupon ITO or another transparent electrode is formed as a film and patterned, thereby forming a pixel electrode. Pixel structures that have thin-film transistors can thereby be formed. Using the thin-film transistors makes it possible to simultaneously form a gate line drive circuit or data line drive circuit along with a transparent/scattering switching element drive circuit, which is a characteristic feature of the present invention.

A toggle flip-flop circuit has been described as an example of a one-bit counter circuit, but the present invention is not restricted thereto. The present invention may also have a configuration that employs other flip-flop circuits.

In addition, in the present embodiment, a description was presented wherein the control signal VPDLC is set at the low level during wide viewing angle display, and thus the transmission gate circuit 7g is opened and a condition ensues in which voltage is not output to the output terminal VOUT2. However, the device may also be configured in a manner such that the output terminals VOUT1 and VOUT2 are shorted during wide viewing angle display. It is thereby possible to rapidly eliminate any electric charge remaining on the transparent/scattering switching element electrodes when switching to the wide viewing angle display mode, thereby allowing response time to be reduced.

Furthermore, the display panel of the present invention used in combination with a planar light source is not limited to a liquid crystal panel, and the invention can be used with any display panel that uses a light source device. Also, the LCD panel is not limited to a transmissive type, and the invention can be used with any panel that has a transmissive area in each pixel. It is possible to use a very-low-reflection liquid crystal panel, a very-low-transmission liquid crystal panel, or a semi-transmissive liquid crystal panel having a reflective area in a portion of the pixels. A liquid crystal panel having low viewing angle dependency is preferred. Grayscale inversion can thereby be reduced during display with a wide viewing angle. Examples of such a liquid crystal panel mode include the IPS (In-Plane Switching) method, the FFS (Fringe Field Switching) method, and the AFFS (Advanced Fringe Field Switching) method. Examples with a vertical orientation mode include the MVA (Multi-Domain Vertical Alignment) method in which multiple domains are created and viewing angle dependency is reduced, the PVA (Patterned Vertical Alignment) method, and the ASV (Advanced Super V) method. Advantageous application can also be made to LCD panels with a film-compensated TN mode.

The present invention is not restricted to the above-mentioned embodiment. For, example, the present invention can be applied to the display device in which the transparent/scattering switching element is provided on the display panel.

A mobile phone was described as the terminal device in the present embodiment, but the present invention in not limited to a mobile phone. The display device according to the present embodiment is not limited to a mobile phone, and advantageous application may also be made to PDAs (Personal Digital Assistant), game machines, digital cameras, digital video cameras, video players, and other portable terminal devices. The display device according to the present embodiment is not limited to portable terminal devices, and application can also be made to notebook computers, cash dispensers, automatic vending machines, and other terminal devices.

Figure 11:
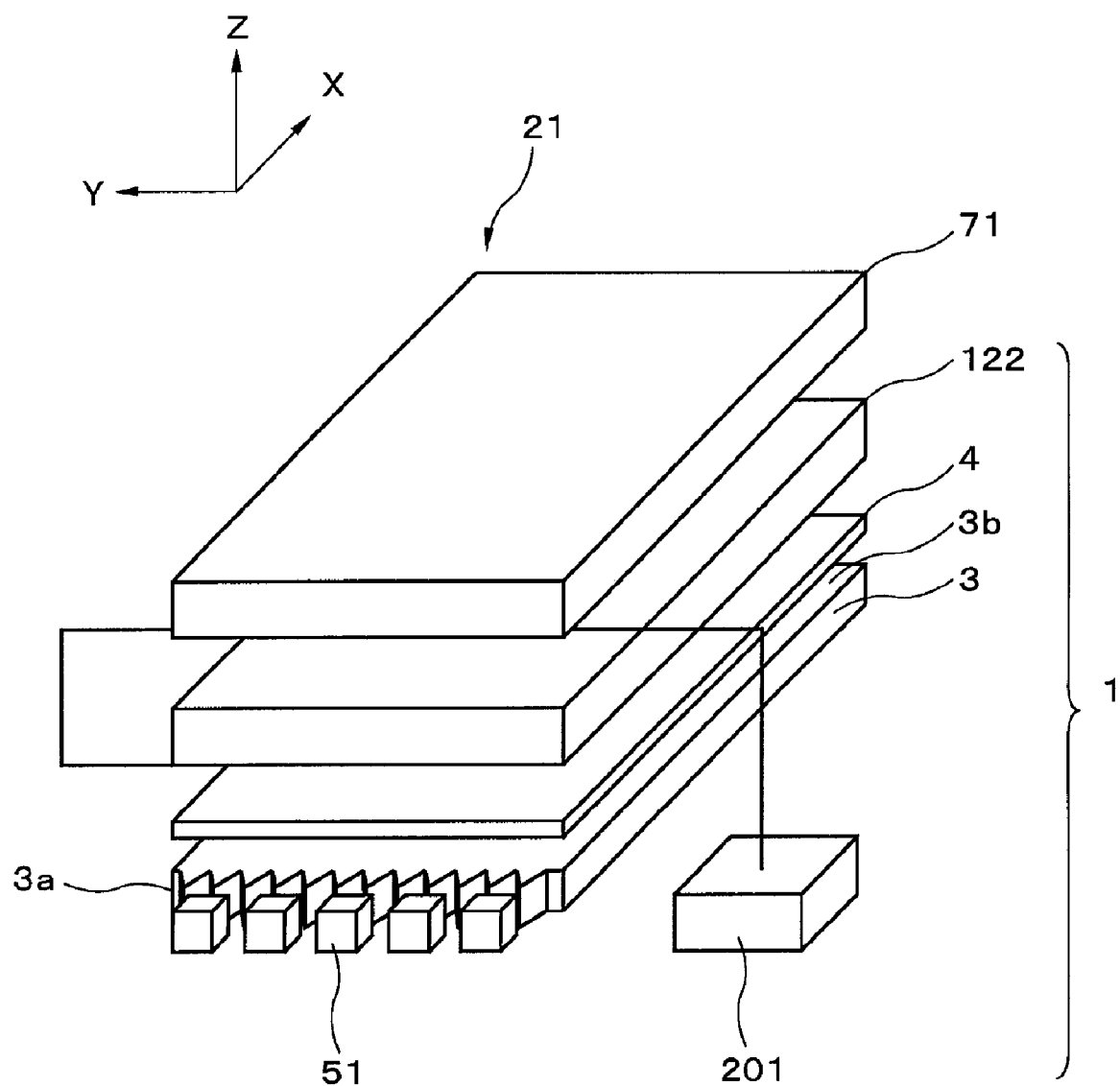
FIG. 11 is a perspective view showing the display device according to a second embodiment of the present invention.
Figure 12:
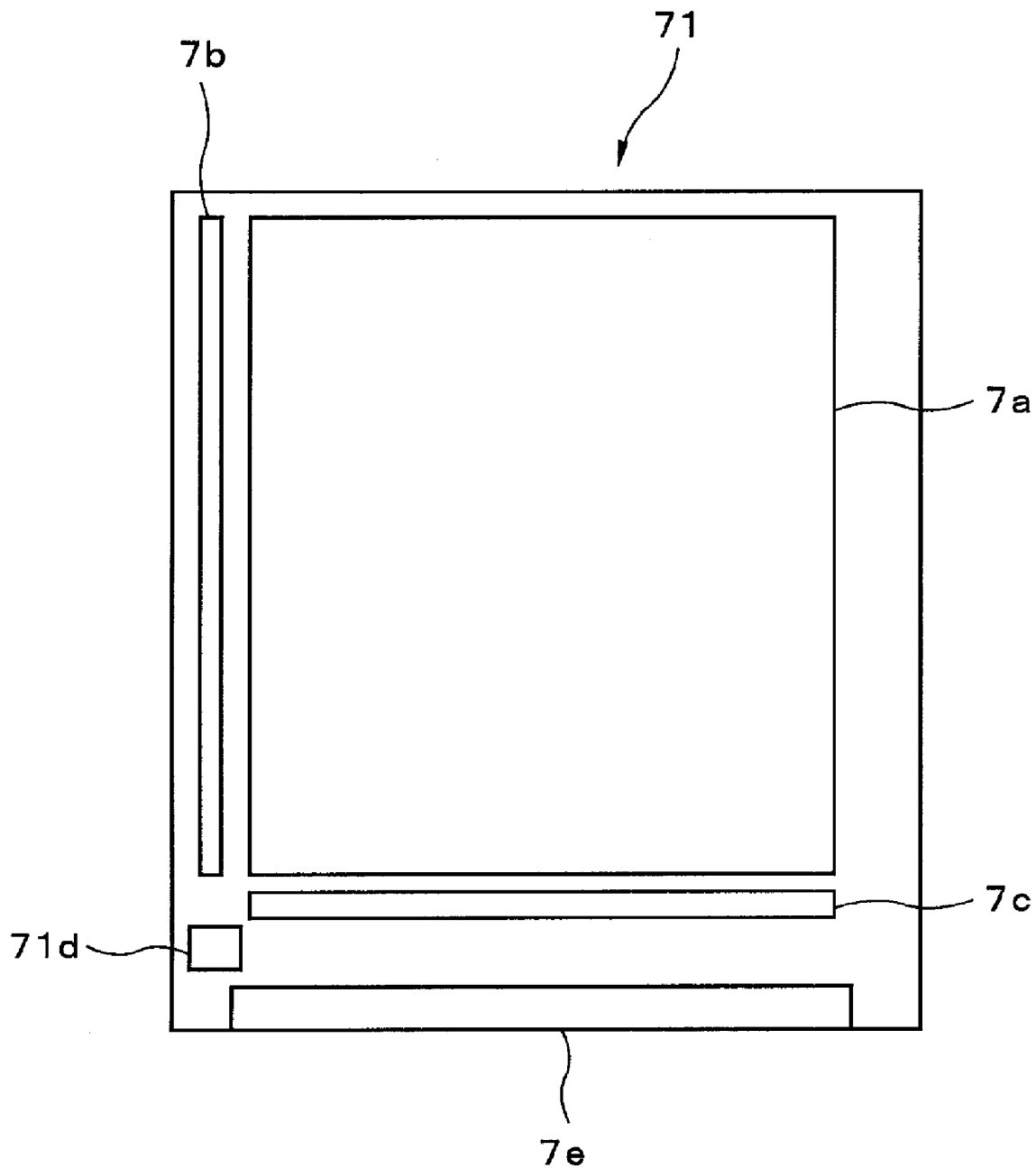
FIG. 12 is a top view showing the configuration of a transmissive LCD panel, which is a constituent element of the display device.
Figure 13:
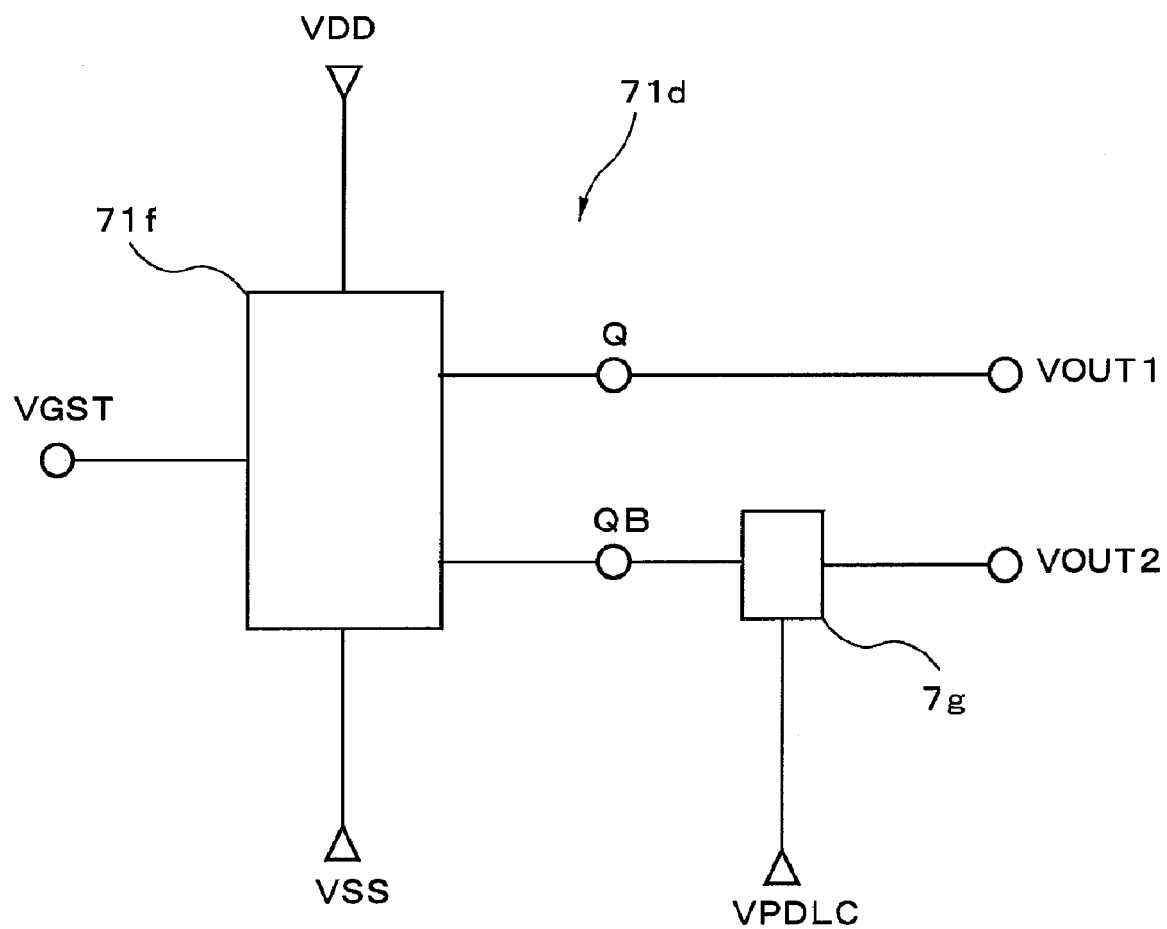
FIG. 13 is a circuit diagram of the transparent/scattering switching element drive circuit used for driving the transparent/scattering switching element.

A second embodiment of the present invention is described next. FIG. 11 is a perspective view showing the display device according to the present embodiment of the present invention. FIG. 12 is a top view showing the configuration of a transmissive LCD panel, which is a constituent element of the display device. FIG. 13 is a circuit diagram of the transparent/scattering switching element drive circuit used for driving the transparent/scattering switching element.

The display device 21 according to the second embodiment is composed of a light source device 1 and a transmissive LCD panel 71, as shown in FIG. 11. In the transmissive LCD panel 71, a transparent/scattering switching element drive circuit 71d is used in place of the transparent/scattering switching element drive circuit 7d, as shown in FIGS. 12 and 13, in comparison with the transmissive LCD panel described in the first embodiment described above. A 1-bit counter circuit 7f was used in the transparent/scattering switching element drive circuit 7d. In contrast, the transparent/scattering switching element drive circuit 71d of the present embodiment features the use of a two-bit counter circuit 71f. The other aspects of the configuration in the present embodiment are the same as those in the first embodiment described above. The same reference numerals are accordingly used for the same constituent elements of FIGS. 4, 7, and 8, and a detailed description is omitted.

Figure 14:
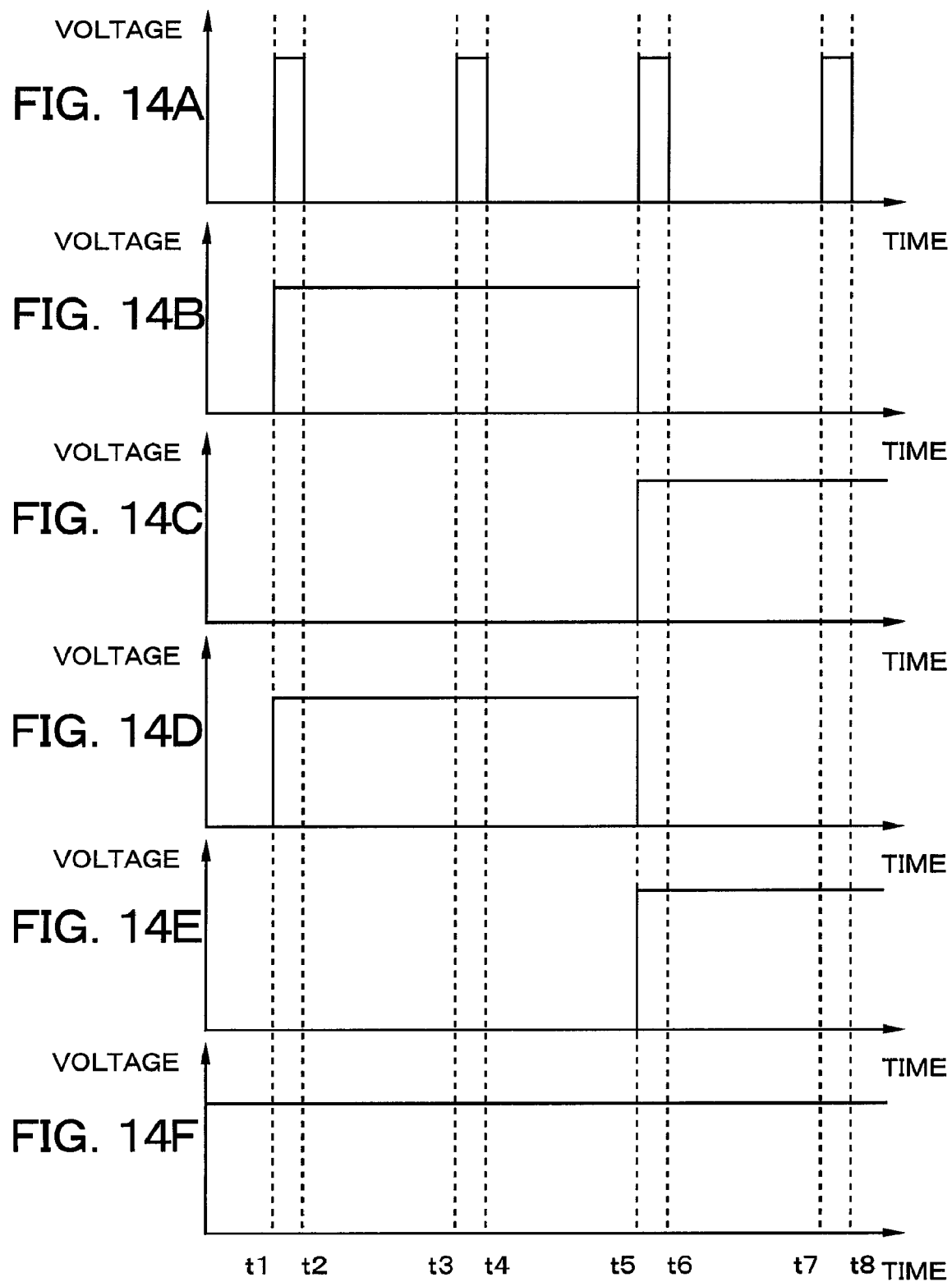
FIG. 14A to 14F are timing charts showing the operation of the transparent/scattering switching element drive circuit in the display device according to the present embodiment, wherein the horizontal axes represent time, the vertical axis in FIG. 14A represents the voltage of the start signal VGST of the gate-line drive circuit, the vertical axis in FIG. 14B represents the voltage of a first output Q of the 2-bit counter circuit, the vertical axis in FIG. 14C represents the voltage of a second output QB of the 2-bit counter circuit, the vertical axis in FIG. 14D represents the voltage of the output terminal VOUT1, the vertical axis in FIG. 14E represents the voltage of the output terminal VOUT2, and the vertical axis in FIG. 14F represents the voltage of the control signal VPDLC.

Described next is the method for operating the display device according to the present embodiment configured in the manner described above, i.e., the method for driving the display device according to the present embodiment. FIG. 14A to 14F are timing charts showing the operation of the transparent/scattering switching element drive circuit in the display device according to the present embodiment, wherein the horizontal axes represent time, the vertical axis in FIG. 14A represents the voltage of the start signal VGST of the gate-line drive circuit, the vertical axis in FIG. 14B represents the voltage of a first output Q of the 2-bit counter circuit, the vertical axis in FIG. 14C represents the voltage of a second output QB of the 2-bit counter circuit, the vertical axis in FIG. 14D represents the voltage of the output terminal VOUT1, the vertical axis in FIG. 14E represents the voltage of the output terminal VOUT2, and the vertical axis in FIG. 14F represents the voltage of the control signal VPDLC.

As described above, since the transparent/scattering switching element drive circuit 71d has a 2-bit counter circuit 71f, the start signal VGST of the gate-line drive circuit is set to a two-cycle high level, and it is only when the signal is subsequently brought to a high level that the output is inverted. Specifically, VGST is set to a high level once during the time interval t1 to t2, a low level during time interval t2 to t3, a high level during time interval t3 to t4, a low level during time interval t4 to t5, and a high level at time t5, whereupon the output Q and inverted output QB of the 2-bit counter circuit 71f are inverted, as shown in FIGS. 14A to 14F.

In the present embodiment, the drive frequency of the transparent/scattering switching element can be reduced by increasing the number of bits in the counter circuit. As a result, the power consumption of the transparent/scattering switching element can be reduced. The device is particularly well suited to use in situations where there is a strong demand for power reduction, as with portable terminal devices and the like. In addition, a plurality of counter circuits with different bit numbers may be produced, and the counter circuits may be switched in accordance with power source information, such as when the terminal device is driven by a battery. Counter circuits with higher bit numbers can thereby be used in cases in which power must be conserved, thereby decreasing the drive frequency of the transparent/scattering switching element and effectively making use of the battery reserves. In cases in which power conservation is not necessary due to connection to an external power source or high battery reserves, the device is switched to counter circuits with low bit numbers, thereby allowing high image quality to be produced.

As applied to the first embodiment of the present invention described above, it is preferable for f1 and f2 to be positive integral multiples of each other, where f1 is the frame frequency of the display panel, and f2 is the drive frequency of the transparent/scattering switching element. Specifically, it is necessary for f1 to be a positive integral multiple of f2, or for f2 to be a positive integral multiple of f1. If this condition is not satisfied, very small displacement of the two frequencies will occur, and this very small displacement will generate a low-frequency beat which will be observed as a flicker, degrading image quality. A constitutive feature of the present invention is the use of part of the drive signal in the display panel for driving the transparent/scattering switching element. In cases in which this constitutive feature is not present, a means such as, e.g., a PLL (phase-locked loop or phase synchronization) circuit, whereby the phases of the two are fixed so that very small differences in frequencies do not arise between the two is required, which complicates the circuit structure. In the present invention, part of the drive signal of the display panel is used, making it possible to produce high-quality images in which flicker is suppressed by using a simple structure. Thus, it is possible to reduce size and cost because implementation of this drive signal is realized in the display panel. The first embodiment described above can be conceived of as a case in which there is a match between f1 and f2. The operation and effects other than those described above in the second embodiment are the same as those in the first embodiment described above.

Figure 15:
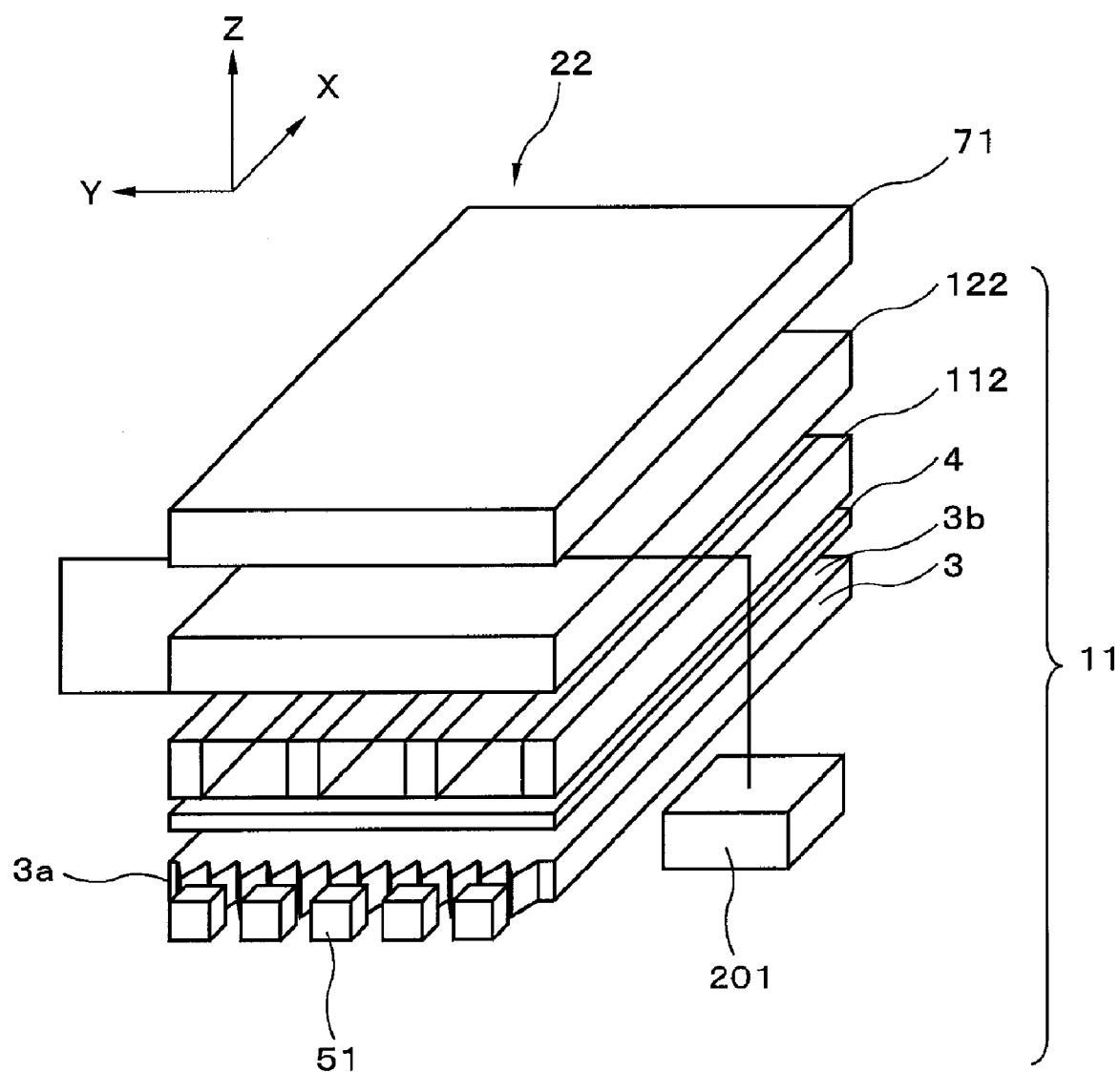
FIG. 15 is a perspective view showing the display device according to the third embodiment of the present invention.
Figure 16:
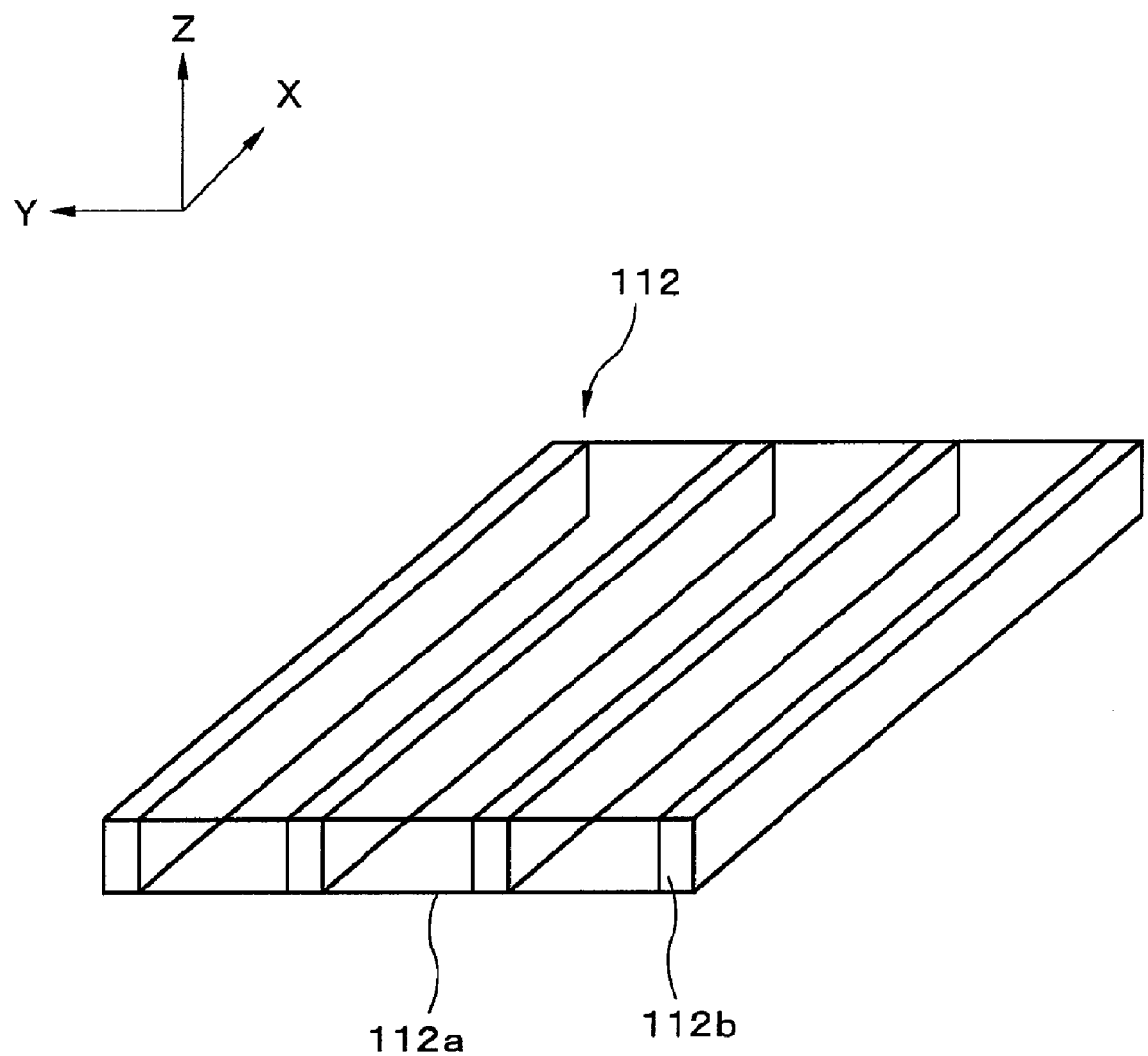
FIG. 16 is a perspective view showing a louver, which is constituent element of the display device.

A third embodiment of the present invention is described next. FIG. 15 is a perspective view showing the display device according to the present embodiment. FIG. 16 is a perspective view showing a louver, which is constituent element of the display device and which is an element that restricts the direction of light beams.

The display device 22 according to the present third embodiment features the use of a louver 112, which is a constitutive element in the form of a light direction restricting element, as shown in FIG. 15, in comparison with the display device 2 according to the first embodiment described above. The louver 112 is disposed between the optical film 4 and the transparent/scattering switching element 122.

The louver 122 has light-transmitting transparent areas 112a and light-absorbing absorption areas 112b, and these areas are disposed in an alternating fashion in the direction parallel to the louver surface, as shown in FIG. 16. The direction in which the transparent and absorbing areas are alternately disposed is the Y-axis direction shown in FIG. 15. The other features of the configuration in the present embodiment are the same as those in the first embodiment described above. The same reference numerals are accordingly used for the same constituent elements of FIG. 4, and a detailed description is omitted.

In the present embodiment, among the light beams emitted from the optical film 4, light beams inclined to the Y-axis direction with respect to the +Z direction at an angle that is equal to or greater than a fixed value arrive at the absorption area 112b and are absorbed and removed. The louver 112 can thereby increase the directivity of light emitted from the optical film 4 in the Y-axis direction. As a result, light can be prevented from leaking in the diagonal direction in a narrow viewing angle display, and the effect of preventing unwanted viewing can be increased. The operation and effects other than those described above in the third embodiment are the same as those in the first embodiment described above.

In the present embodiment, an example was described in which the Y-axis direction was used as the orientation direction of the transparent and absorption areas of the louver, but the present invention is not limited to this configuration, and the orientation may be rotated and arranged in the XY plane. The moire effect produced between the louver and display panel can be made to be less noticeable, and the display quality can be improved.

Figure 17:
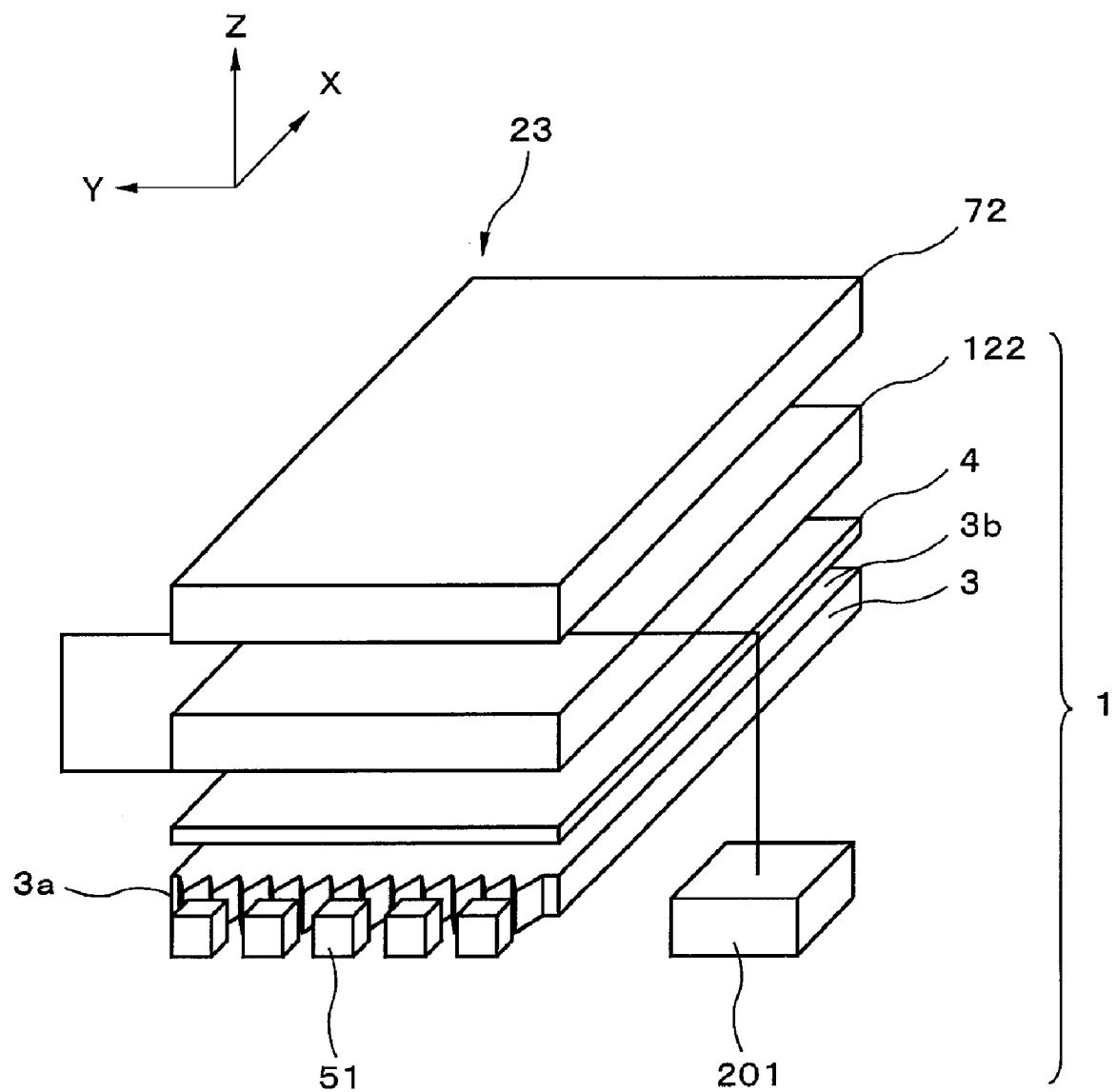
FIG. 17 is a perspective view showing the display device according to the fourth embodiment of the present invention.
Figure 18:
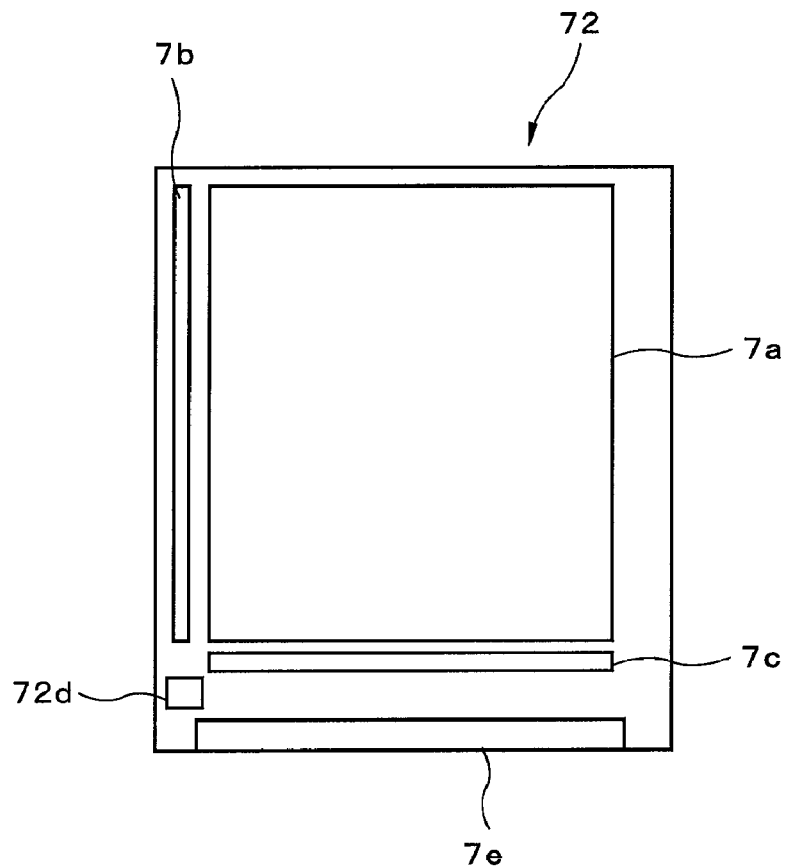
FIG. 18 is a top view showing the configuration of a transmissive LCD panel, which is a constituent element of the display device.
Figure 19:
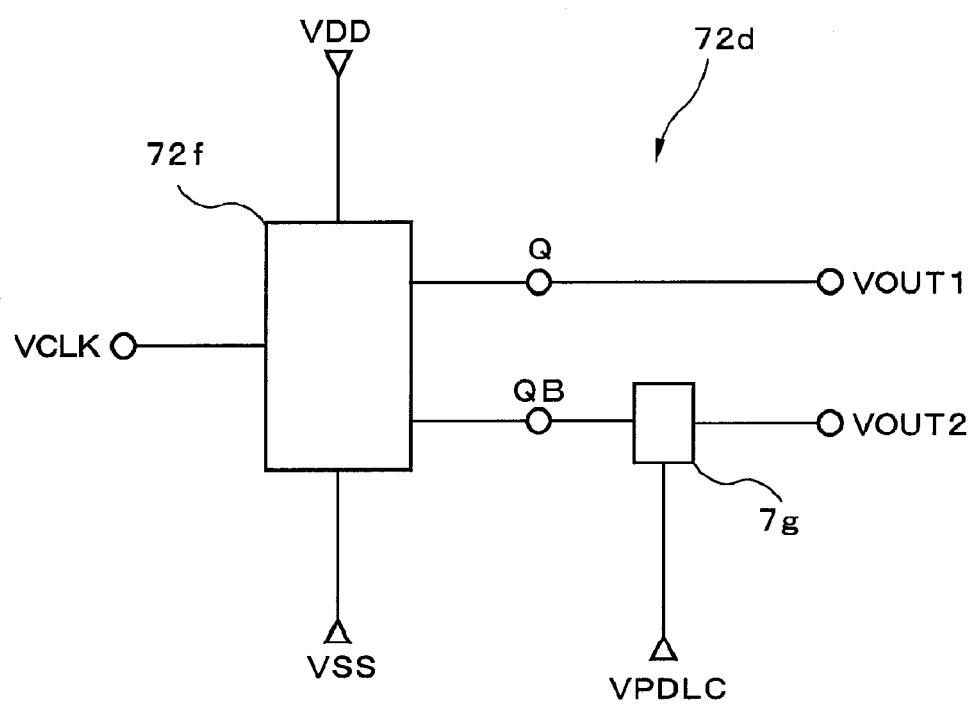
FIG. 19 is a circuit diagram of the transparent/scattering switching element drive circuit used for driving the transparent/scattering switching element.

A fourth embodiment of the present invention will be described below. FIG. 17 is a perspective view showing a display drive according to the present embodiment. FIG. 18 is a top view showing the configuration of the transmissive LCD panel, which is a constitutive element of the display device. FIG. 19 is a circuit diagram of a transparent/scattering switching element drive circuit used for driving the transparent/scattering switching element.

As shown in FIG. 17, the display device 23 according to the fourth embodiment is composed of a light source device 1 and a transmissive LCD panel 72. In contrast to the transmissive LCD panel described in the first embodiment presented above, the transmissive LCD panel 72 employs a transparent/scattering switching element drive circuit 72d instead of the transparent/scattering switching element drive circuit 7d, as shown in FIGS. 18 and 19. Another constitutive feature is that the transparent/scattering switching element drive circuit 7d has a one-bit counter circuit 7f, whereas the transparent/scattering element drive circuit 72d has a frequency circuit 72f.

The frequency circuit 72f is a circuit that divides the frequency of the start signal VGST of the gate line drive circuit, and may, e.g., be composed of a counter circuit for counting the clock signal VCLK of the gate line drive circuit. Specifically, the clock signal VCLK of the gate line drive circuit is inputted and the clock signal is counted, so that it is possible to determine the timing of polarity inversion when driving the transparent/scattering switching element. The other aspects of the configuration in the present embodiment are the same as those in the first embodiment described above. The same reference numerals are accordingly used for the same constituent elements of FIGS. 4, 7, and 8, and a detailed description is omitted.

Described below is the function of the display device of the present embodiment which is configured in the manner described above, specifically, the driving method for the display device according to the present embodiment. As stated above, the transparent/scattering switching element drive circuit 72d of the present embodiment is compose of a frequency circuit 72f, and the frequency circuit 72f has a counter circuit for counting the clock signal VCLK of the gate line drive circuit. It is therefore possible to count the number of high levels of the clock signal VCLK of the gate line drive circuit after the start signal VGST of the gate line drive circuit has acquired a high level. For example, in the timing interval in which the start signal VGST is at a high level, the counter circuit can count the high levels in the clock signal VCLK M times in a case in which the display panel is driven so that the high level of the clock signal VCLK is present 2M times. For this reason, when the start signal VGST is at a high level, the count of the counter circuit is started, and the output of the counter circuit changes at the point when the Mth count of the clock signal VCLK occurs. For example, if the initial level is low, then the circuit is at a high level upon completion of counting. Thus, the transparent/scattering switching element drive circuit 72d performs an OR operation on the start signal VGST and the counter circuit output, and the polarity of the transparent/scattering switching element is switched when either one has a high level. The polarity inversion operation of the transparent/scattering switching element can thereby be implemented even in the timing interval in which the start signal VGST is at a high level.

In the present embodiment, the drive frequency of the transparent/scattering switching element can be set to be higher than the frame frequency of the display panel. When the frequency is generally low, the user can discern flicker, and display quality is compromised. However, with the present embodiment, improvement in image quality is possible because the frequency of the transparent/scattering switching element is increased. The device is thus particularly well suited for terminal devices with comparatively low requirements in regard to decreasing power consumption, such as cash dispensers. In addition, when the frame frequency of the display panel has been reduced in order to reduce power, the reduction can be achieved without reducing the drive frequency count of the transparent/scattering switching element, and display quality thus can be preserved. Moreover, in the present embodiment, as with the second embodiment, the frequency of the transparent/scattering switching element and the frequency of the display panel can be maintained at a constant positive integral ratio, allowing low frequencies to be generated with a simple circuit structure, the image quality of the display device to be improved, and size and cost to be reduced.

The counting operation of the counter circuit in the present embodiment was described as counting M times, which is half of the timing interval in which the start signal VGST of the gate line drive circuit is at a high level. However, the present invention is not restricted thereto, and, for example, four polarity inversions can be performed in the timing interval in which the start signal VGST is at a high level by setting the counter to M/2 counts. As a result, additional improvement in image quality is possible because the transparent/scattering switching element can be driven at a high frequency relative to the display panel frequency.

In addition, the count number of the counter circuit is preferably set to a number determined by dividing, by an even number, the number of times the clock signal VCLK is at a high level in the timing interval during which the start signal VGST of the gate line drive circuit is at a high level. The number of polarity inversions can thereby be set to an even number, making it possible to drive the circuit in a state in which positive and negative voltage is synchronously applied to the transparent/scattering switching element. In cases in which the positive and negative voltage periods do not correspond, a condition will result in which the DC offset has been applied when averaged over time. For this reason, burn-in of the transparent/scattering switching element will occur, making it unable to obtain sufficient transparent or scattering states. Because the positive and negative voltage periods are made to correspond, a favorable transparent/scattering switching element condition can be preserved, and degradation of display quality can be suppressed. In addition, a function can also be included whereby the counter circuit is reset using the start signal VGST. Each of the frame processes is thereby brought into uniformity, and phenomena such as development of fine differences between frames and the generation of nonuniformity can be suppressed. The operation and effects in the fourth embodiment, other than those described above, are the same as those in the first embodiment described above.

Figure 20:
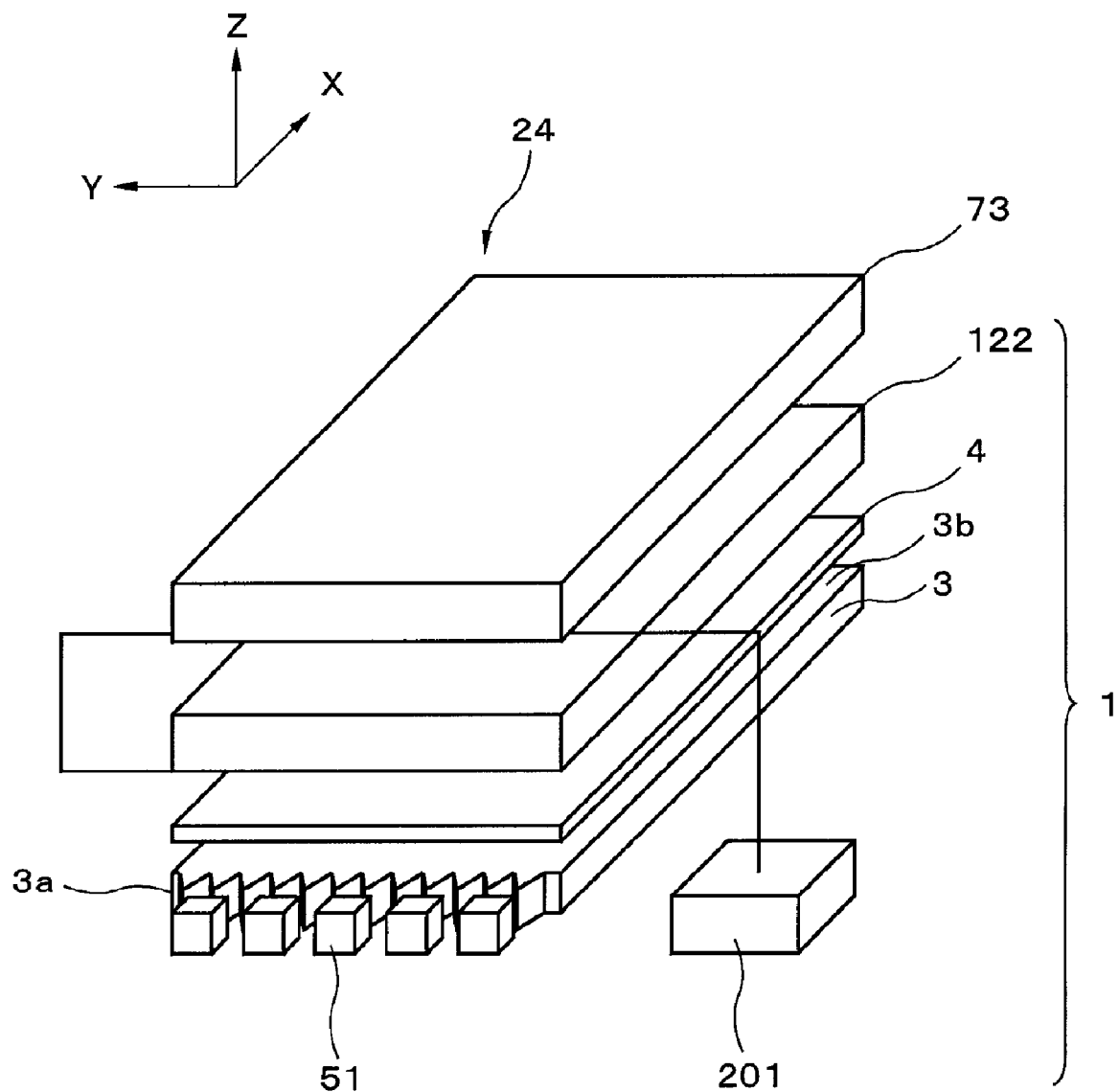
FIG. 20 is a perspective view showing the display device according to the fifth embodiment of the present invention.
Figure 21:
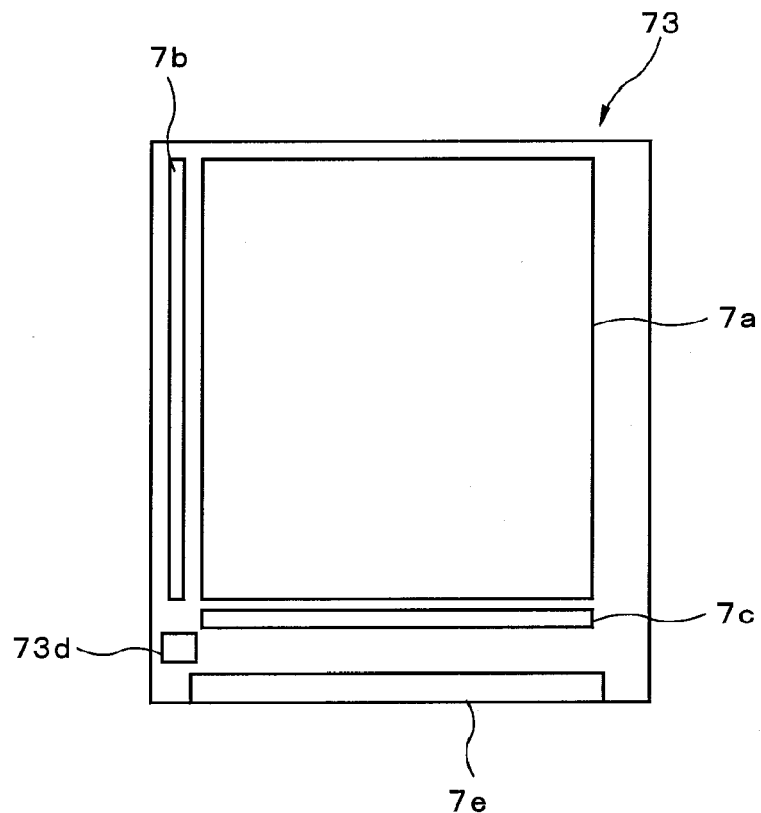
FIG. 21 is a top view showing the configuration of a transmissive LCD panel, which is a constituent element of the display device.
Figure 22:
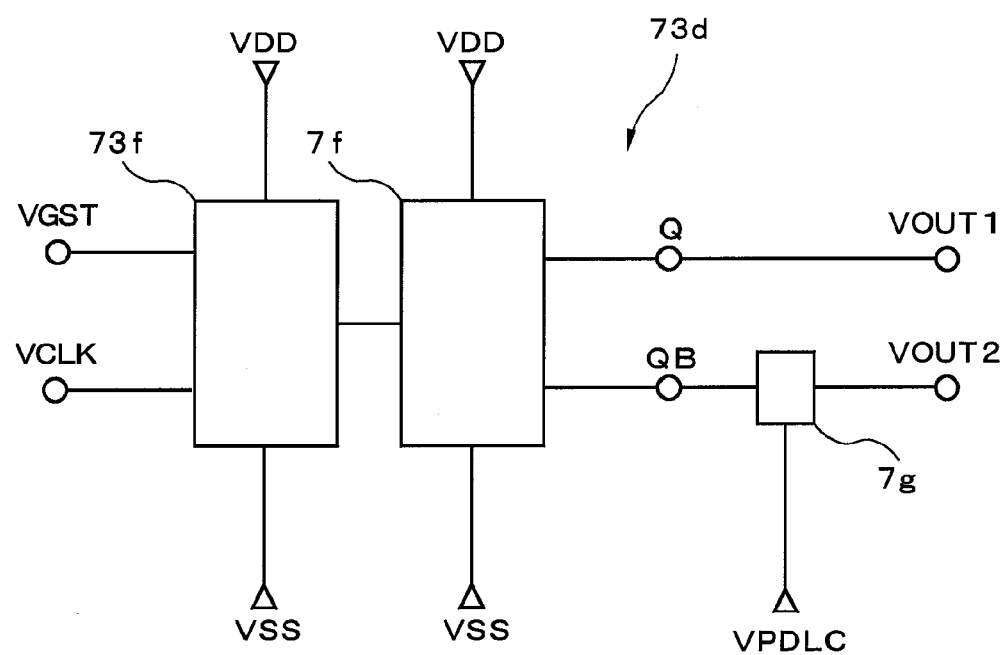
FIG. 22 is a circuit diagram of the transparent/scattering switching element drive circuit used for driving the transparent/scattering switching element.

A fifth embodiment of the present invention is described below. FIG. 20 is a perspective view showing the display device according to the present embodiment. FIG. 21 is a top view showing the configuration of a transmissive LCD panel, which is a constituent element of the display device, and FIG. 22 is a circuit diagram of the transparent/scattering switching element drive circuit used for driving the transparent/scattering switching element.

As shown in FIG. 20, the display device 24 according to the fifth embodiment is composed of a light source device 1 and transmissive LCD panel 73. In contrast to the transmissive LCD panel of the first embodiment described above, the transmissive LCD panel 73, as shown in FIGS. 21 and 22, uses a transparent/scattering switching element drive circuit 73d instead of the transparent/scattering switching element drive circuit 7d. In addition, whereas the transparent/scattering switching element drive circuit 7d used a 1-bit counter circuit 7f, a characteristic feature of the transparent/scattering switching element drive circuit 73d of the present embodiment is that a delay circuit 73f is included in addition to the 1-bit counter circuit 7f.

The delay circuit 73f is a circuit that delays the timing of polarity inversion of the transparent/scattering switching element. For example, a configuration may be used involving a shift register similar to a gate line drive circuit. Using the start signal VGST of the gate line drive circuit as input, the high level of the start signal VGST is transmitted depending on the clock signal VCLK of the gate line drive circuit, and a high level is output a determinate time period after the start signal VGST has acquired a high level. Specifically, as shown in FIG. 22, the start signal VGST passes through the delay circuit 73f and connects with the 1-bit counter circuit 7f. Then, the clock signal VCLK of the gate line drive circuit connects to the delay circuit 73f as a clock signal. The delay circuit 73f has, as a constituent element, a shift register whose number of stages is smaller than that of the gate line drive circuit. The other aspects of the configuration in the present embodiment are the same as those in the first embodiment described above. The same reference numerals are accordingly used for the same constituent elements of FIGS. 4, 7, and 8, and a detailed description is omitted.

The operation of the display device according to the present embodiment configured in the manner described above will now be discussed, specifically in regard to the driving method for the display device according to the present embodiment. As described above, the transparent/scattering switching element drive circuit 73d of the present embodiment has a delay circuit 73f. This delay circuit is a shift register having a number of stages that is smaller than that of the gate line drive circuit, and, for example, is made to be ¼ the number of stages of the shift register of the gate line drive circuit. The start signal VGST of the gate line drive circuit is inputted as an input signal to the shift register of the delay circuit 73f, and the clock signal VCLK of the gate line drive circuit is inputted as the clock signal. Thus, when the start signal VGST is at a high level, the high level is synchronized to the clock signal VCLK, and the shift register in the delay circuit 73f is transmitted. Then, after a period of ¼ the frame period, a high-level signal is generated and outputted from the delay circuit 73f. This high-level signal is used for polarity inversion of the transparent/scattering switching element, but subsequent operations are the same as in the first embodiment described above.

Adding the delay circuit in accordance with the present embodiment allows the timing of polarity inversion of the transparent/scattering switching element to be set while shifted relative to the timing of display panel driving. For example, when the transparent/scattering switching element requires time for the polarity inversion operation, additional improvement in image quality is possible by setting this time component with a shift commensurate with this time. In addition, a plurality of delay times can be selected for the delay circuit, allowing the delay time to be varied in accordance with external conditions such as temperature conditions, thereby achieving a driving operation that is suited to the conditions of use, and allowing a high-quality image to be produced. An example of this type of delay circuit can be readily realized by laying out the wiring so that the output signal mid-way through the shift register is taken off, and by providing a switch for selecting the output signal line used in accordance with the conditions.

In addition, in the present embodiment, as with the second embodiment described above, the same frequency can be maintained for the display panel and the transparent/scattering switching element, allowing low frequencies to be generated using a simple circuit configuration, and allowing improvements in image quality and reductions in size and cost of the display device to be obtained. The operation and effects of the fifth embodiment, other than those described above, are the same as those in the first embodiment described above.

Figure 23:
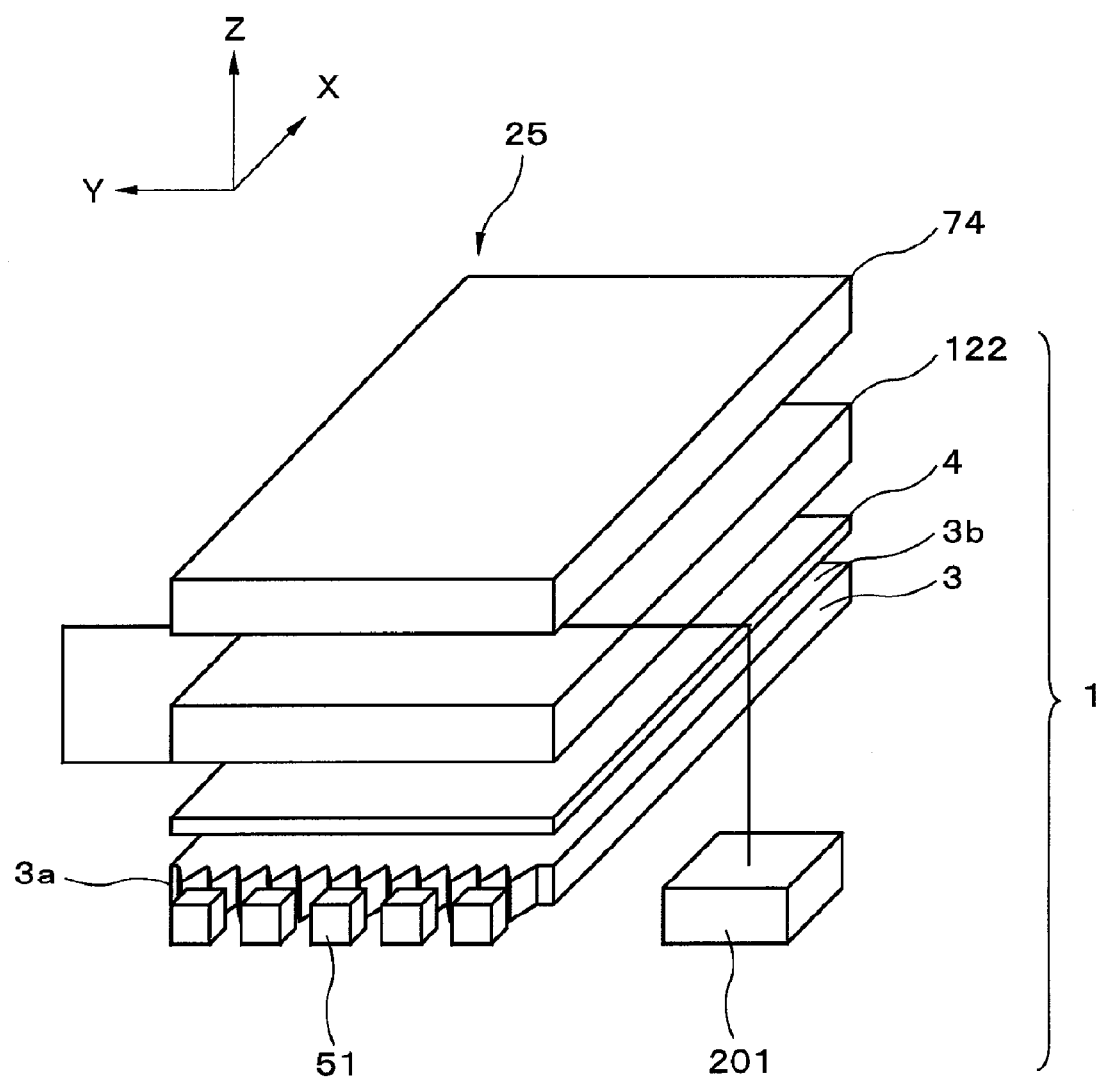
FIG. 23 is a perspective view showing the display device according to the sixth embodiment of the present invention.
Figure 24:
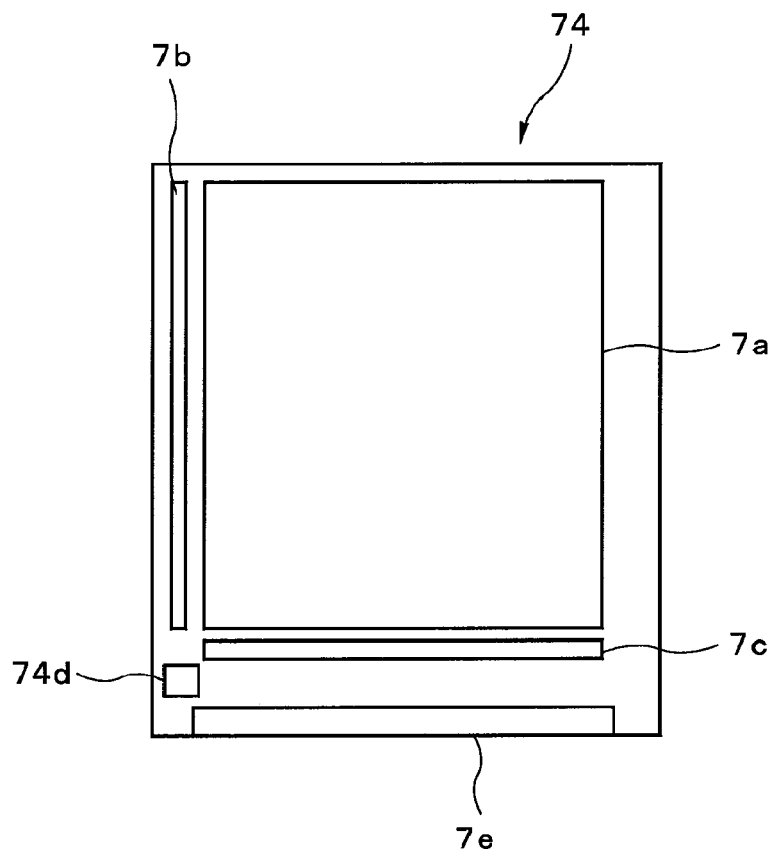
FIG. 24 is a top view showing the configuration of a transmissive LCD panel, which is a constituent element of the display device.
Figure 25:
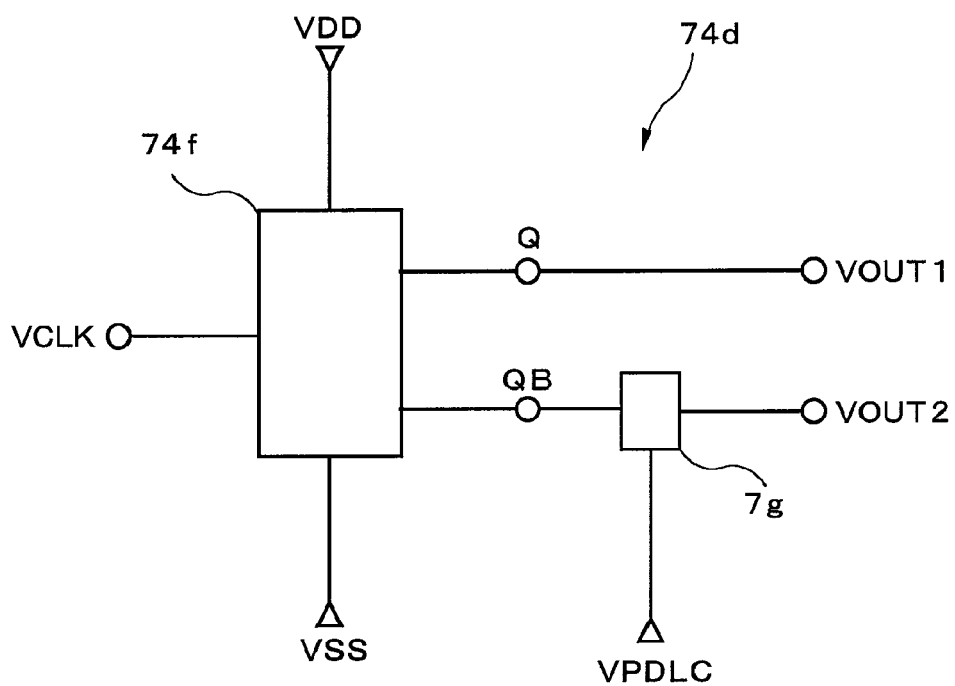
FIG. 25 is a circuit diagram of the transparent/scattering switching element drive circuit used for driving the transparent/scattering switching element.

A sixth embodiment of the present invention is described below. FIG. 23 is a perspective view showing the display device according to the present embodiment. FIG. 24 is a top view showing the configuration of the transmissive LCD panel, which is a constituent element of the display device. FIG. 25 is a circuit diagram showing the transparent/scattering switching element drive circuit used for driving the transparent/scattering switching element.

As shown in FIG. 23, the display device 25 according to the sixth embodiment is composed of a light source device 1 and a transmissive LCD panel 74. In contrast to the transmissive LCD panel described in the first embodiment presented above, the transmissive LCD panel 74, as shown in FIGS. 24 and 25, employs the transparent/scattering switching element drive circuit 74d instead of the transparent/scattering switching element drive circuit 7d. Another characteristic feature is that the transparent/scattering switching element drive circuit 74d of the present embodiment has a counter circuit 74f that counts the clock signal VCLK of the gate line drive circuit, whereas the transparent/scattering switching element drive circuit 7d has a 1-bit counter circuit 7f.

The counter circuit 74f differs from the 1-bit counter circuit 7f in the previously described first embodiment of the present invention, and is a circuit for counting a prescribed number of clock signals VCLK of the gate line drive circuit. Specifically, a clock signal VCLK is inputted to the counter circuit 74f. The counter number of the counter circuit 74f is determined by the circuit structure of the counter circuit 74f. In the configuration of the present embodiment, when a case is assumed in which the display panel is driven so that a number M of high-level clock signals VCLK exist during the period of the timing at which the start signal VGST of the gate line drive circuit has a high level, it is possible to count the number of times that a remainder occurs when the number M is subtracted. In one example, a circuit is formed in advance so that the count number of the counter circuit 74f is 150 when the number M is set to 360. The output of the counter circuit 74f switches between a high-level output and a low-level output each time the number of high-level clock signals VCLK of the gate line drive circuit reaches 150. The counter circuit 74f is also configured so as to be capable of outputting the inverse signal of the aforementioned output. These two outputs are used to drive the transparent/scattering switching element, as shown in FIG. 22. Aspects of the structure of the present embodiment other than those described above are the same as in the aforementioned first embodiment. Therefore, the same reference symbols are used for components that are the same as those shown in FIGS. 4, 7, and 8, and detailed descriptions thereof are not given.

The operation of the display device of the present embodiment configured as described above, i.e., the drive method of the display device according to the present embodiment, will next be described. As described above, the transparent/scattering switching element drive circuit 74d of the present embodiment has a counter circuit 74f that is capable of counting a number by which the number M is not divisible, and the clock signal VCLK of the gate line drive circuit is connected as an input signal. Therefore, as the clock signal VCLK repeatedly switches between high-level and low-level, the number thereof is counted, and the polarity of the transparent/scattering switching element reverses when a prescribed number is reached. In the present embodiment, since this number is set to a value by which the number M is not divisible, the polarity reversal of the transparent/scattering switching element is executed so as to correspond to a different position on the screen for each frame. In the example of the present embodiment, polarity reversal is implemented for approximately one third of the display screens, but because a remainder occurs, the position of the polarity reversal in the subsequent frame is offset on the screen. The location of the polarity reversal also changes according to the frame.

In the present embodiment, the timing of the polarity reversal of the transparent/scattering switching element can be set using the counter circuit so as to differ from the frame draw timing of the display panel, and although a completely random condition is not obtained, a quasi-random condition can be created. Specifically, a configuration was adopted in the second embodiment of the present invention wherein the frame frequency f1 of the display panel and the drive frequency f2 of the transparent/scattering switching element are natural number multiples of each other, i.e., f1 is a natural number multiple of f2, or f2 is a natural number multiple of f1. However, a characteristic feature of the present embodiment is that f1 and f2 are positive non-integer multiples of each other. The frequencies of both f1 and f2 can thereby be intentionally varied, and it is possible to reduce the effects of the frequencies being slightly offset from each other. As a result, image quality can be increased.

A case was described in the present embodiment in which the count number of the counter circuit 74f was less than the number M. It is thereby possible to set the reversal frequency of the transparent/scattering switching element to a higher value than the frame frequency of the display panel. The circuit can also be formed so that the count number is larger than the number M, in which case the reversal frequency of the transparent/scattering switching element can be set lower than the frame frequency of the display panel.

Furthermore, the frequency of polarity reversal of the transparent/scattering switching element and the frequency of frame reversal of the display panel were in a non-integer relationship, as described above, but these two values are preferably set to values that are not too close to each other. The reason for this is that a low-frequency beat occurs when the frequencies are near each other, and display quality is compromised. Other operations and effects of the sixth embodiment are the same as those of the aforementioned first embodiment.

Figure 26:
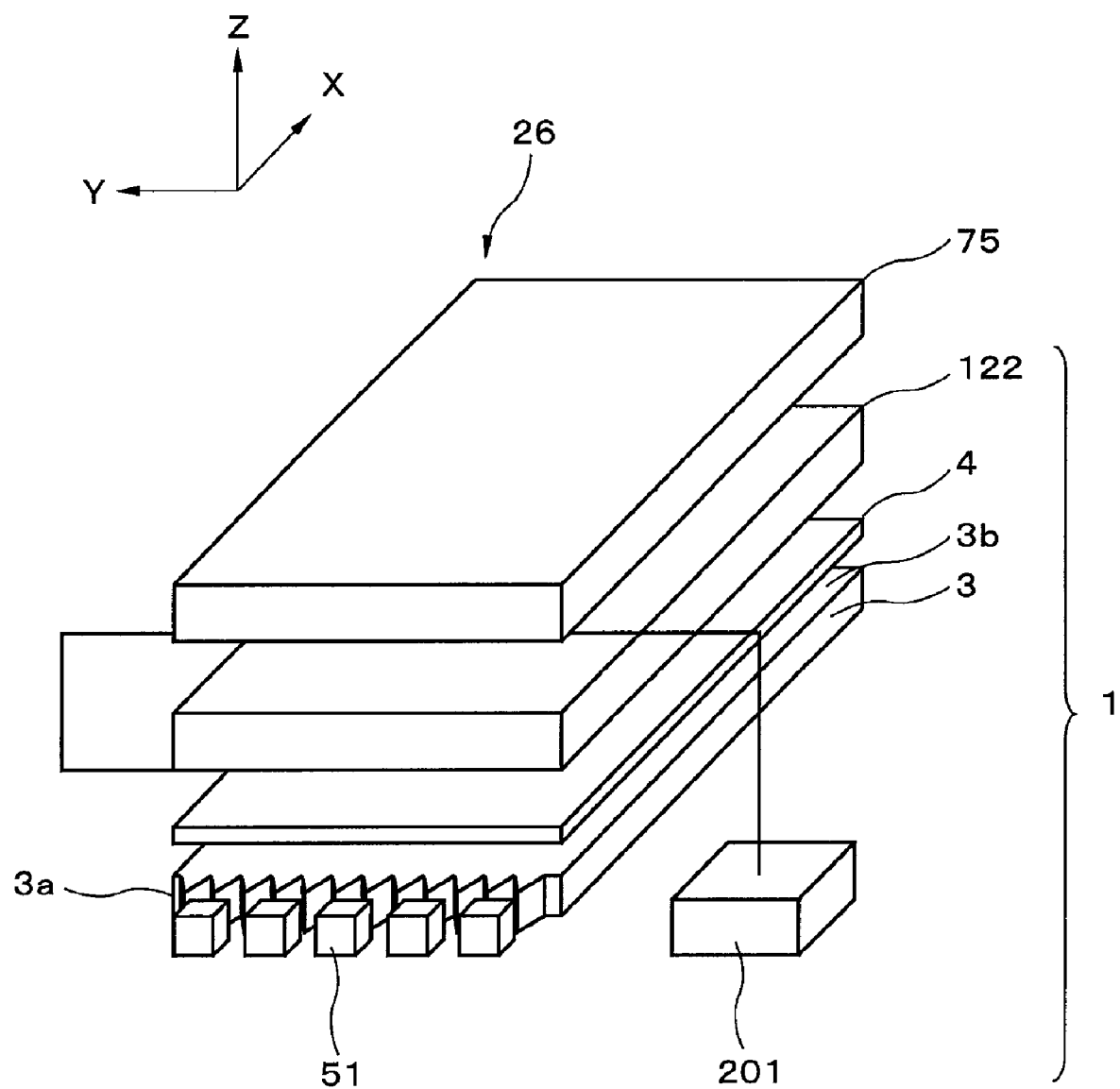
FIG. 26 is a perspective view showing the display device according to the seventh embodiment of the present invention.
Figure 27:
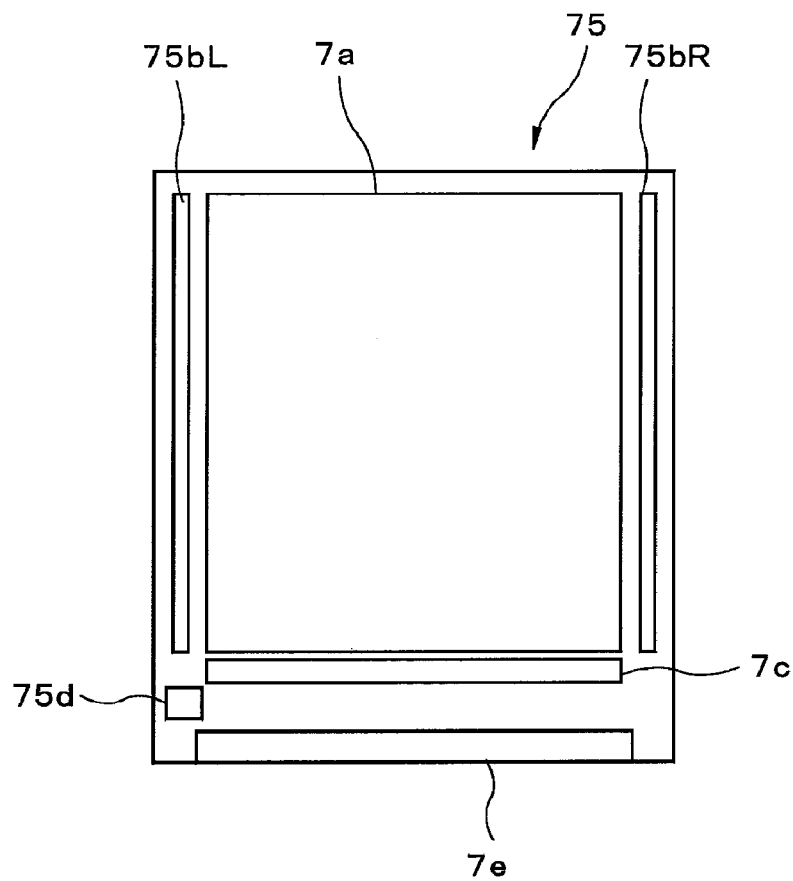
FIG. 27 is a top view showing the configuration of a transmissive LCD panel, which is a constituent element of the display device.
Figure 28:
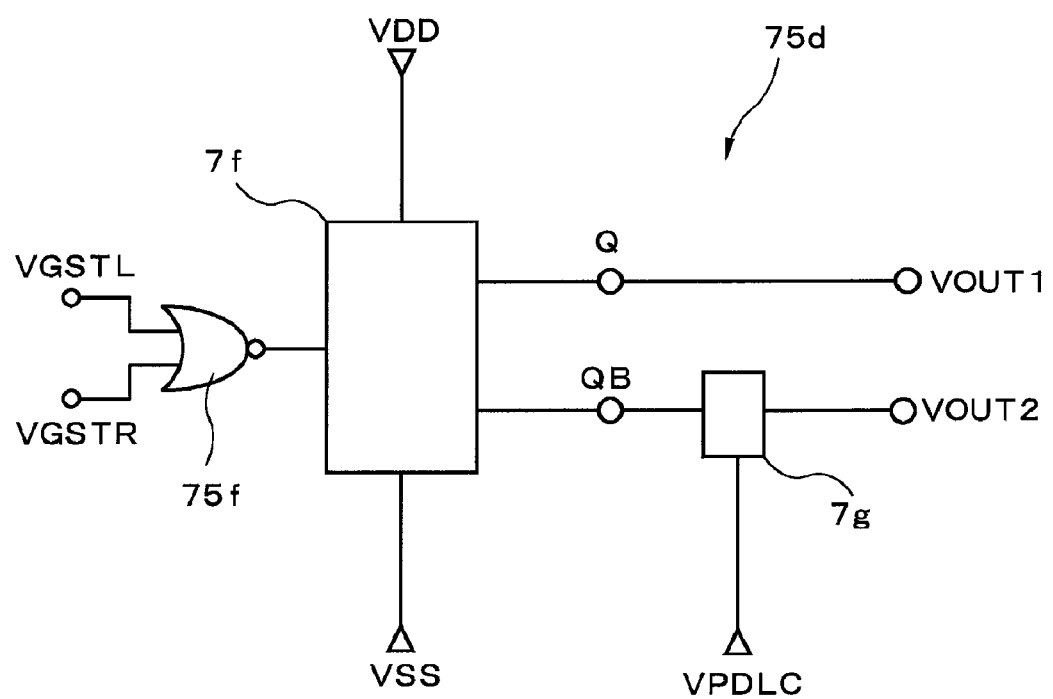
FIG. 28 is a circuit diagram of the transparent/scattering switching element drive circuit used for driving the transparent/scattering switching element.

A seventh embodiment of the present invention will next be described. FIG. 26 is a perspective view showing the display device according to the present embodiment; FIG. 27 is a top view showing the configuration of the transmissive LCD panel, which is a constituent element of the display device; and FIG. 28 is a circuit diagram of the transparent/scattering switching element drive circuit used for driving the transparent/scattering switching element.

As shown in FIG. 26, the display device 26 of the seventh embodiment is composed of a light source device 1 and a transmissive LCD panel 75. As shown in FIGS. 27 and 28, the transmissive LCD panel 75 differs from the transmissive LCD panel of the aforementioned first embodiment in that gate line drive circuits are provided to both sides of the display region. Specifically, a gate line drive circuit 75bL is disposed to the left of the pixel region 7a, and a gate line drive circuit 75bR is disposed to the right of the pixel region 7a. Among the gate lines in the pixel region 7a, odd-numbered gate lines are connected to the gate line drive circuit 75bL on the left from above, and even-numbered gate lines are connected to the gate line drive circuit 75bR on the right. Specifically, the transmissive LCD panel 75 in the present embodiment has the type of configuration of a so-called interlaced drive in which the gate lines are driven one at a time. This type of configuration is employed in such conditions as when the display panel has extremely high resolution, and the pitch of the output lines of the gate line drive circuit is incompatible with a conventional one-sided arrangement. Specifically, it is possible to obtain increased definition that exceeds the conventional limits of the gate line drive circuit. When the polarity of the voltage applied to the liquid crystal layer is reversed, the polarity of the pixel electrode and the opposing electrode must be reversed for each row in the usual line reversal. Problems therefore occur in that power loss is caused by coupling between various types of electrodes during reversal, and the number of lines is limited by the amount of time needed for the reversal. However, in the driving described above, all odd-numbered rows draw at the same polarity, and then the even-numbered rows all draw at the same polarity after the polarity reversal. Therefore, the picture quality is the same as that produced by line reversal, due to the significant reduction in the reversal ratio. As a result, the operating power can be reduced, and the number of lines can be increased.

Although the same clock signal VCLK is used in the gate line drive circuits 75bL and 75bR, two different systems of start signals are prepared for each gate line drive circuit. The start signal used for the left gate line drive circuit 75bL is VGSTL, and the start signal used for the right gate line drive circuit 75bR is VGSTR. These two start signals drive the odd-numbered gate lines and the even-numbered gate lines in alternating fashion, and are therefore controlled so that high levels are timed to occur in alternating fashion.

Furthermore, the transparent/scattering switching element drive circuit 75d of the present embodiment differs from the transparent/scattering switching element drive circuit 7d of the first embodiment of the present invention in that an OR circuit 75f is added in a stage prior to the input of the 1-bit counter circuit 7f. The start signal VGSTL of the left gate line drive circuit 75bL and the start signal VGSTR of the right gate line drive circuit 75bR are inputted to the OR circuit 75f. Specifically, the OR circuit serves the purpose of outputting a high level when one of the two start signals VGSTL and VGSTR has a high level. The transparent/scattering switching element drive circuit 75d in the present embodiment is thereby capable of reversing the polarity of the transparent/scattering switching element when a signal selected from the start signals VGSTL and VGSTR has a high level.

Figure 1:
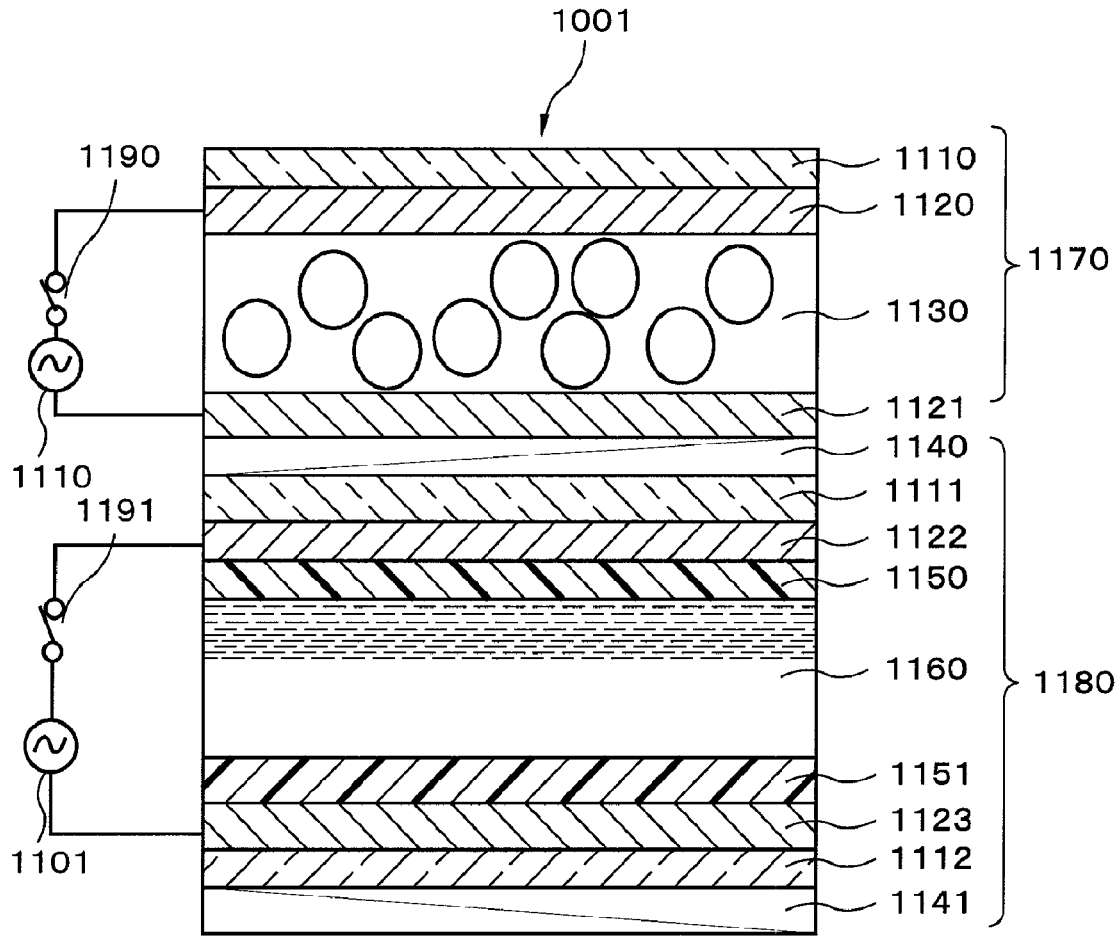
FIG. 1 is a cross-sectional diagram schematically showing a first conventional viewing-angle-controllable LCD device described in Japanese Laid-open Patent Application No. 5-72529.
Figure 2:
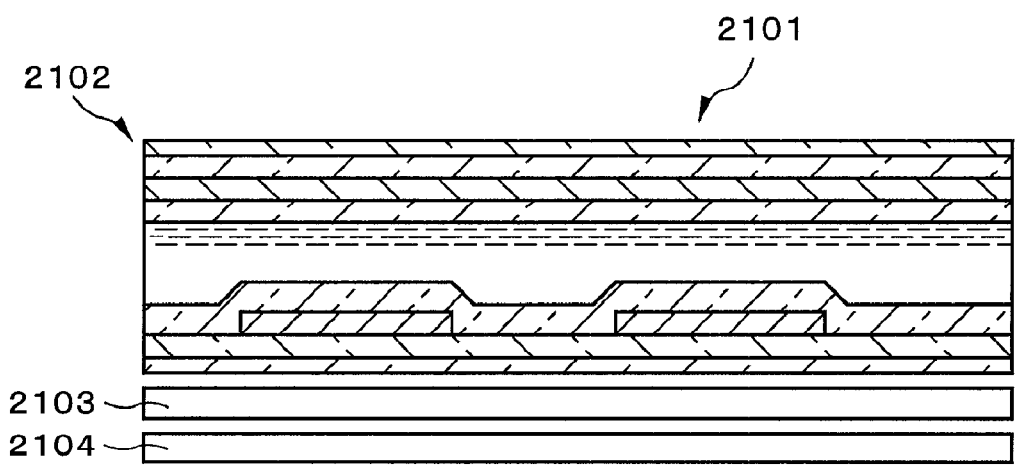
FIG. 2 is a cross-sectional diagram schematically showing a second conventional viewing-angle-controllable LCD device described in Japanese Laid-open Patent Application No. 9-244018.
Figure 3:
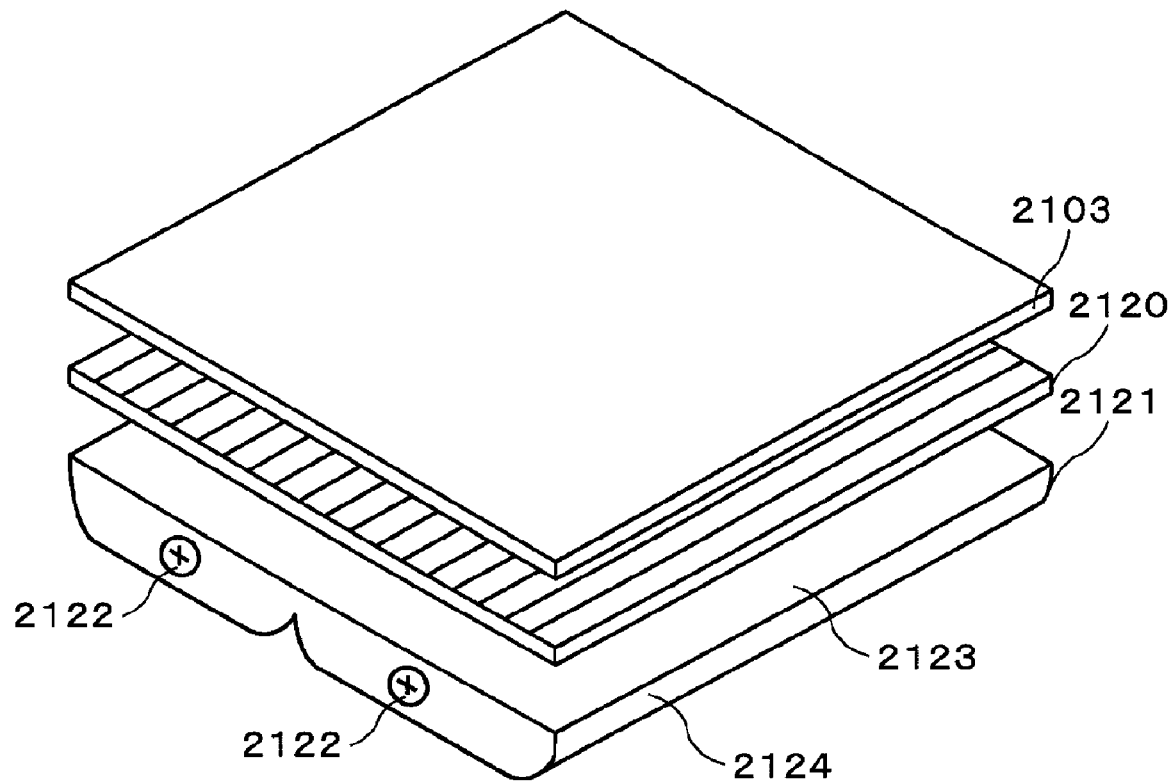
FIG. 3 is a perspective view schematically showing the illumination device used in the conventional viewing-angle-controllable LCD device described in Japanese Laid-open Patent Application No. 9-244018.

The transparent/scattering switching element drive circuit 75d in the present embodiment is preferably disposed between the gate line drive circuit and the terminal portion, the same as in the aforementioned first embodiment, but because there are two (left and right) systems of gate line drive circuits in the present embodiment in particular, the transparent/scattering switching element drive circuit 75d may be provided between the gate line drive circuit and the terminal portion on either the left or the right side. The transparent/scattering switching element drive circuit 75d may be provided in the same manner on the left and right and operated to increase the drive capability or predict a failure of one side. Aspects of the structure of the present embodiment other than those described above are the same as in the aforementioned first embodiment. Therefore, the same reference symbols are used for components that are the same as those shown in FIGS. 3, 7, and 8, and detailed descriptions thereof are not given.

The operation of the display device of the present embodiment configured as described above, i.e., the drive method of the display device of the present embodiment, will next be described. As described above, the transparent/scattering switching element drive circuit 75d of the present embodiment is configured so as to reverse the polarity of the transparent/scattering switching element when at least one signal selected from the two left and right start signals VGSTL, VGSTR of the gate line drive circuits has a high level. Therefore, when the start signal VGSTL of the left gate line drive circuit 75bL has a high level, scanning of the gate lines of odd-numbered rows is initiated, and the polarity of the transparent/scattering switching element is reversed. Then, when the start signal VGSTR of the right gate line drive circuit 75bR has a high level, scanning of the gate lines of even-numbered rows is initiated, and the polarity of the transparent/scattering switching element is reversed. The polarity of the transparent/scattering switching element can thus be reversed in synchrony with the starting of the left and right gate line drive circuits.

In the present embodiment, the frequency of the polarity reversal of the transparent/scattering switching element can be increased, and picture quality can be improved by diverting the operation timing of the two left and right gate line drive circuit systems. The number of transistors is also small compared to a method for increasing the frequency of polarity reversal using a counter circuit or a shift register circuit. Therefore, effects are enabled such as reduced operating power, enhanced reliability, and cost reduction based on enhanced product yield.

Furthermore, in the description of the transparent/scattering switching element drive circuit according to the present embodiment, start signals of left and right gate line drive circuits were inputted, but it is also possible for the timing of one of the start signals to be offset in relation to a gate line drive circuit according to the arrangement of each circuit. For example, when the transparent/scattering switching element drive circuit is provided between the gate line drive circuit and the terminal portion, the gate line drive circuit on the right side is in a more distant position than the gate line drive circuit on the left side. As a result, the start signal from the left gate line drive circuit has minimal delay and can operate at the prescribed timing, but the start signal from the right gate line drive circuit is delayed, and the timing thereof is therefore offset. As a result of this delay, the timing of the polarity reversal of the transparent/scattering switching element deviates, and the positive polarity time and negative polarity time become unbalanced. As a result, a DC offset is applied that is undesirable when temporally averaged, burn-in of the transparent/scattering switching element occurs, and it becomes impossible to achieve an adequate transparent state and scattering state. Matching the time periods of positive and negative voltage is important for maintaining the satisfactory state of the transparent/scattering switching element, and reducing the lag of the start signal from the gate line drive circuit positioned at a greater distance is one means of maintaining this satisfactory state. As one example, there is an increase in resistance and lag when wiring on a glass substrate is used, and it is therefore preferable to form a connection on a flexible cable or other external wiring through the terminal portion. Other means may include a method of inserting a delay circuit to delay the start signal from the gate line drive circuit that is positioned at the short distance. When it is possible to maintain the space for the circuit arrangement, the left and right lag may be equalized by placing the transparent/scattering switching element drive circuit at a substantially equal distance from both the left and right gate line drive circuits. Because this method makes it possible to minimize burn-in of the transparent/scattering switching element, the display quality can be prevented from deteriorating. Other operations and effects of the seventh embodiment are the same as those of the aforementioned first embodiment.

Figure 29:
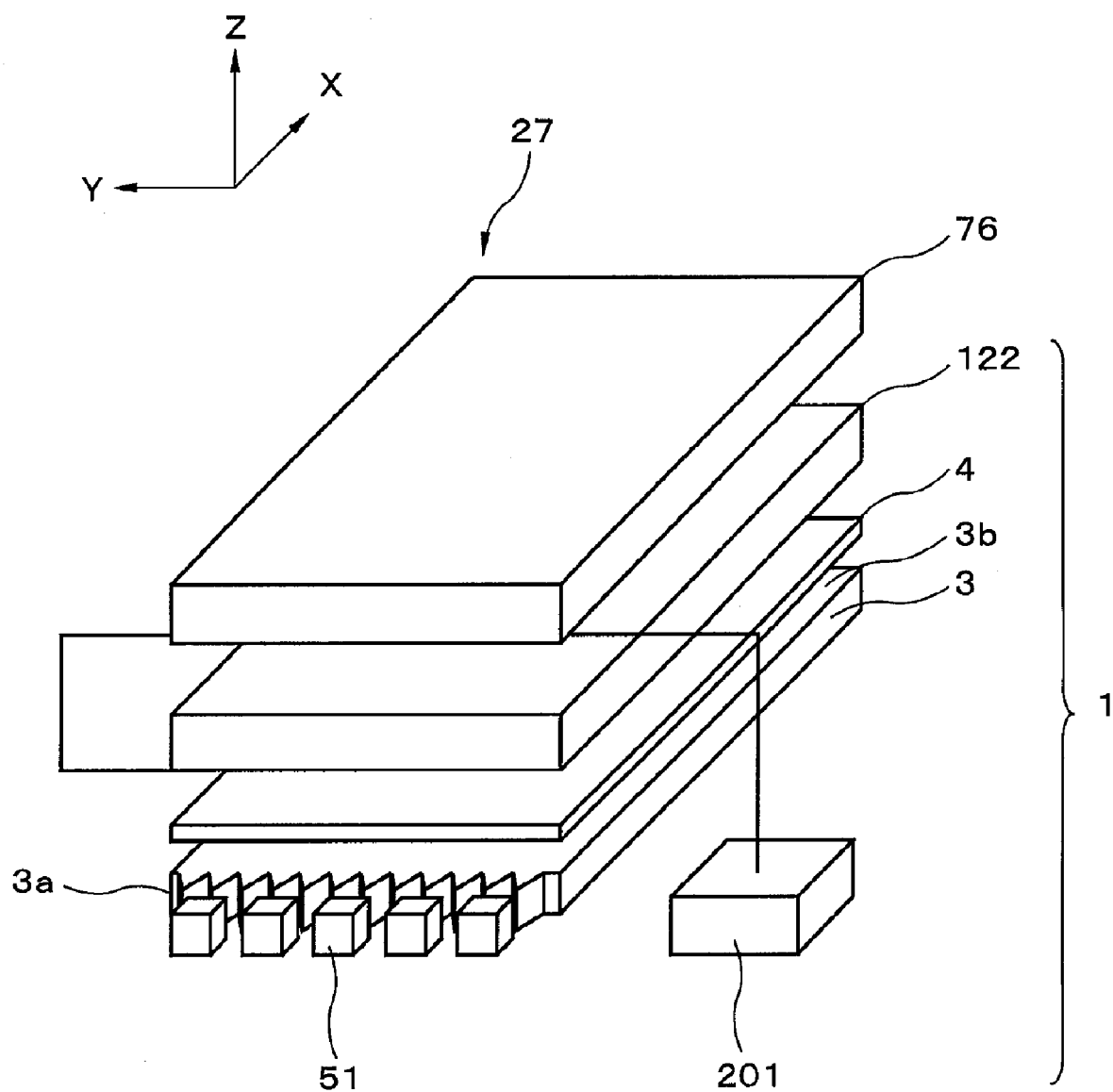
FIG. 29 is a perspective view showing the display device according to the eighth embodiment of the present invention.
Figure 30:
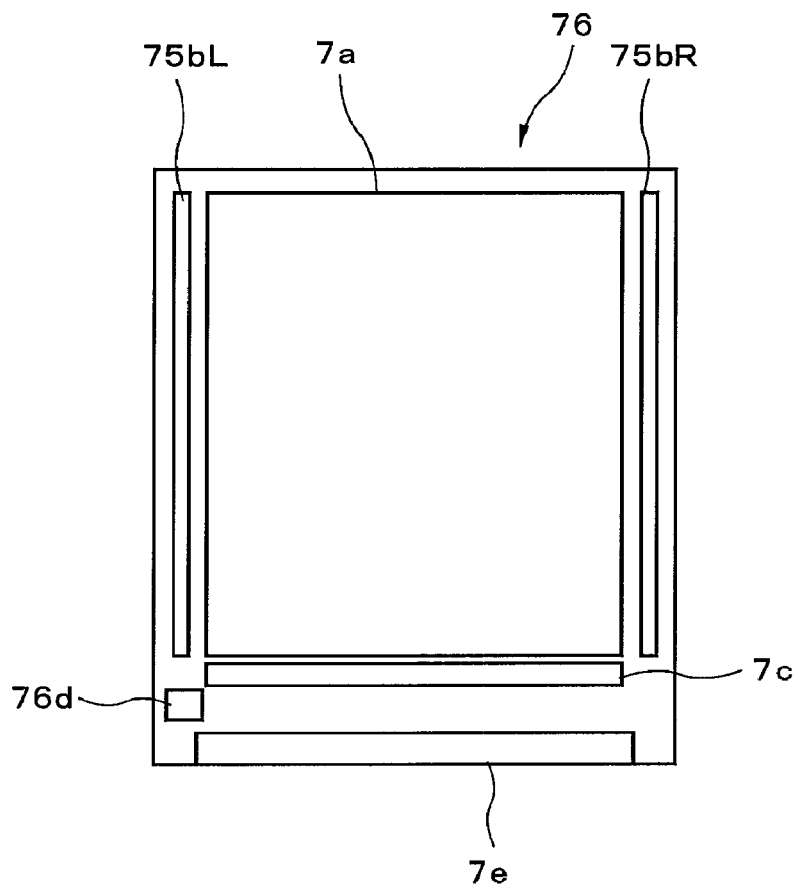
FIG. 30 is a top view showing the configuration of a transmissive LCD panel, which is a constituent element of the display device.
Figure 31:
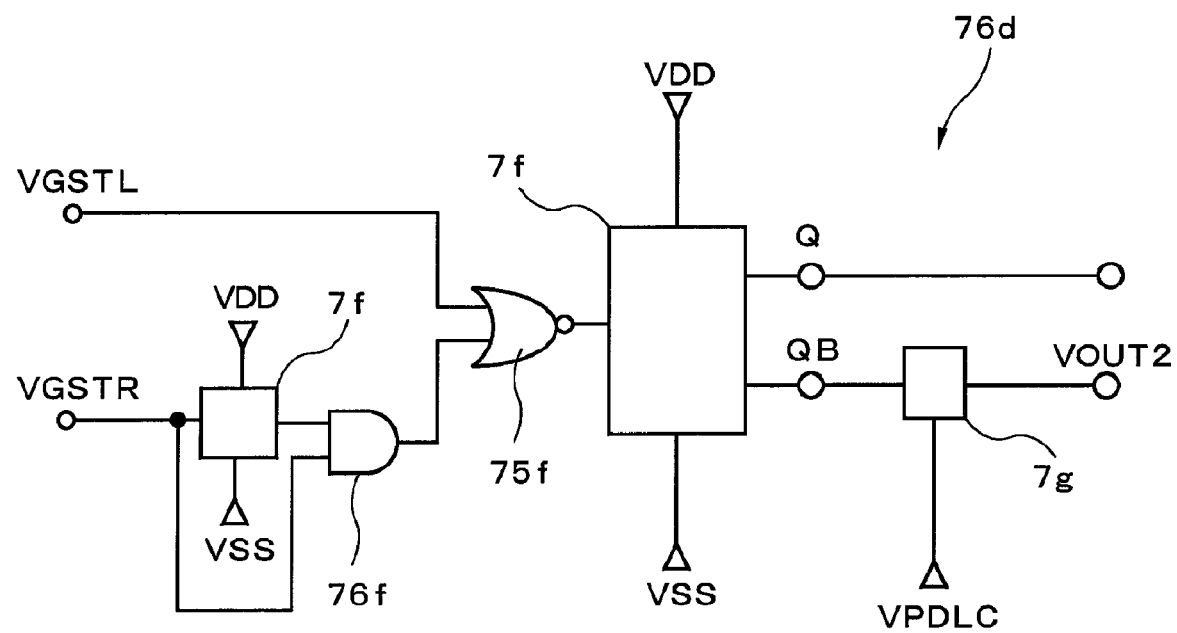
FIG. 31 is a circuit diagram of the transparent/scattering switching element drive circuit used for driving the transparent/scattering switching element.

An eighth embodiment of the present invention will next be described. FIG. 29 is a perspective view showing the display device according to the present embodiment; FIG. 30 is a top view showing the configuration of the transmissive LCD panel, which is a constituent element of the display device; and FIG. 31 is a circuit diagram of the transparent/scattering switching element drive circuit used for driving the transparent/scattering switching element.

As shown in FIG. 29, the display device 27 of the eighth embodiment is composed of a light source device 1 and a transmissive LCD panel 76. As shown in FIGS. 30 and 31, gate line drive circuits are provided on both sides of the display region in the transmissive LCD panel 76, but the transmissive LCD panel 76 differs from the transmissive LCD panel of the aforementioned seventh embodiment in that a transparent/scattering switching element drive circuit 76d is used.

The transparent/scattering switching element drive circuit 76d and the previously described transparent/scattering switching element drive circuit 75d have the same overall structure, but the transparent/scattering switching element drive circuit 76d differs in that an additional AND circuit 76f and 1-bit counter circuit 7f are provided to the portion in which the start signal VGSTR of the right gate line drive circuit was connected as the input of the OR circuit 75f. The start signal VGSTR is inputted to the 1-bit counter circuit 7f, and the output Q of the 1-bit counter circuit 7f and the start signal VGSTR are inputted to the AND circuit 76f. As a result, the AND circuit 76f can double the cycle in which the start signal VGSTR is at the high level. The transparent/scattering switching element drive circuit 76d can thereby drive the transparent/scattering switching element in frequency-modulated fashion. The present embodiment has two 1-bit counter circuits 7f, but one of the 1-bit counter circuits 7f is connected to the transparent/scattering switching element, the same as in the aforementioned seventh embodiment, and the other is connected to the input stage of the AND circuit 76f. Aspects of the structure of the present embodiment other than those described above are the same as in the aforementioned seventh embodiment. Therefore, the same reference symbols are used for components that are the same as those shown in FIGS. 26, 27, and 28, and detailed descriptions thereof are not given.

The operation of the display device of the present embodiment configured as described above, i.e., the drive method of the display device according to the present embodiment, will next be described. FIGS. 32A through 32F are timing charts showing the operation in the narrow-angle state of the transparent/scattering switching element drive circuit in the display device according to the present embodiment, wherein time is indicated on the horizontal axis in all of FIGS. 32A through 32F. Also the vertical axis of (A) indicates the voltage of the start signal VGST of the left gate line drive circuit; the vertical axis of (B) indicates the voltage of the start signal VGST of the right gate line drive circuit; the vertical axis of (C) indicates the input voltage of the 1-bit counter circuit; the vertical axis of (D) indicates the first output Q of the 1-bit counter circuits; the vertical axis of (E) indicates the second output QB of the 1-bit counter circuits; and the vertical axis of (F) indicates the voltage applied to the transparent/scattering switching element.

Figure 32:
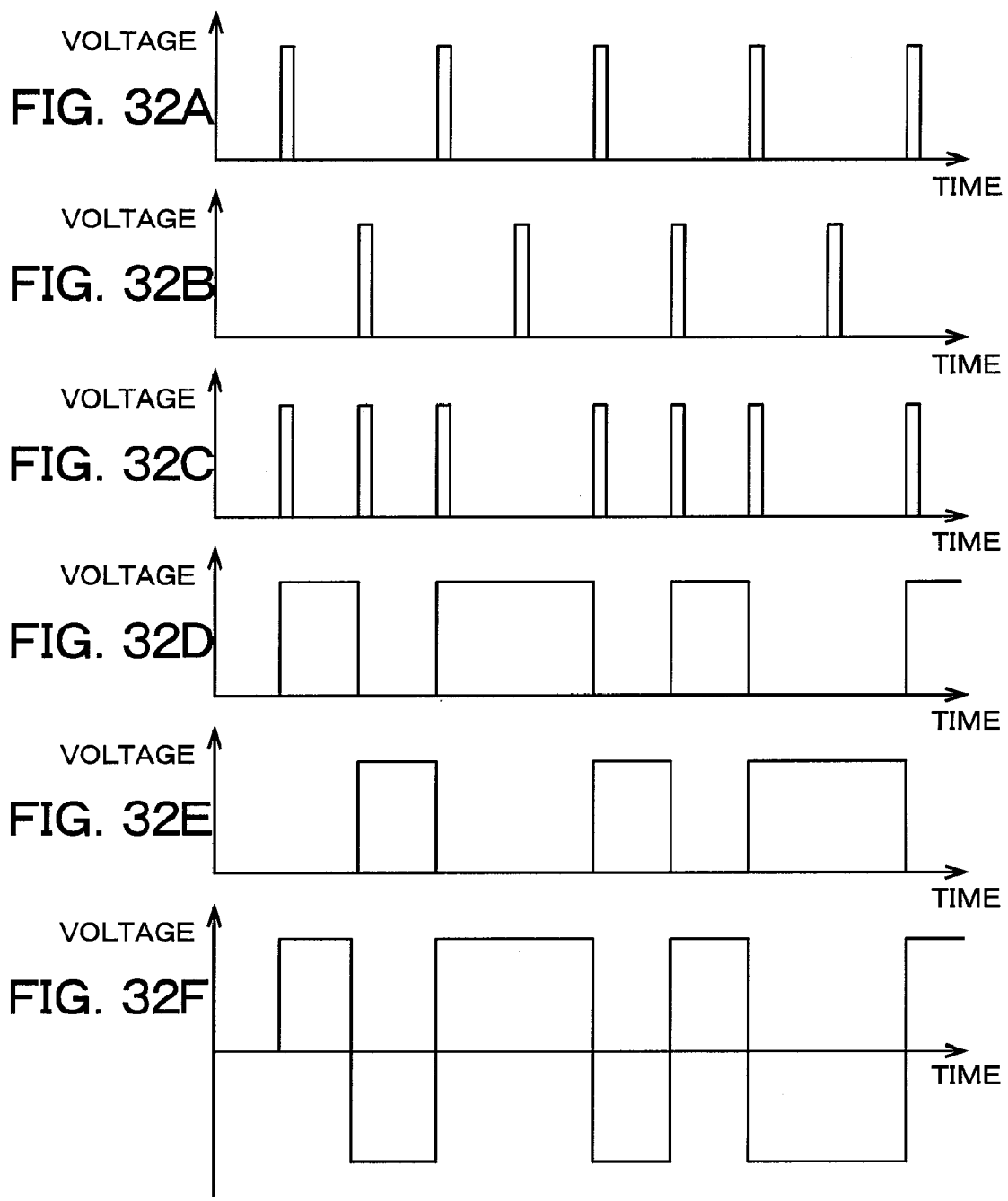
FIGS. 32A to 32F are timing charts showing operation, in narrow angle viewing mode, of the transparent/scattering switching element drive circuit in the display device according to the present embodiment, wherein the horizontal axes represent time, the vertical axis in FIG. 32A represents the voltage of the start signal VGST of the left gate-line drive circuit, the vertical axis in FIG. 32B represents the voltage of the start signal VGST of the right gate-line drive circuit, the vertical axis in FIG. 32C represents the voltage of the input of the 1-bit counter circuit, the vertical axis in FIG. 32D represents the voltage of a first output Q of the 1-bit counter circuit, the vertical axis in FIG. 32E represents the voltage of a second output QB of the 1-bit counter circuit, and the vertical axis in FIG. 32F represents the voltage applied to the transparent/scattering switching element.

As shown in FIGS. 32A through 32F, the start signal VGSTL of the left gate line drive circuit becomes high-level in order for the gate lines of odd-numbered rows to be sequentially scanned first, whereupon the output of the OR circuit 75f reaches a high level, the output of the 1-bit counter circuit 7f that is connected to the transparent/scattering switching element is reversed, and the polarity of the drive voltage of the transparent/scattering switching element is also reversed. The start signal VGSTR of the right gate line drive circuit then reaches a high level in order for the gate lines of even-numbered rows to be sequentially scanned, and this signal is inputted to the 1-bit counter circuit 7f that is connected to the input stage of the AND circuit 76f, as previously mentioned. The output of the 1-bit counter circuit 7f then reversed to high-level, the AND of the start signal VGSTR is acquired by the subsequent AND circuit 76f, and both signals become high-level and are inputted to the OR circuit 75f. As a result, the polarity of the drive voltage of the transparent/scattering switching element is reversed. The same operation occurs as previously described when the start signal VGSTL of the left gate line drive circuit subsequently becomes high-level. When the start signal VGSTR of the right gate line drive circuit subsequently becomes high-level, the output of the 1-bit counter circuit 7f connected to the input stage of the OR circuit 75f reverses to low-level. At this time, since the output of the OR circuit 75f is still low-level, the polarity of the drive voltage of the transparent/scattering switching element is not reversed. Specifically, when the start signal VGSTR of the right gate line drive circuit has a high level, there is no polarity reversal in the case of an even-numbered row. As a result, the transparent/scattering switching element is driven by frequency modulation in which two cycles are mixed, as shown in FIG. 32F. Another characteristic feature of the drive method in the present embodiment is that positive and negative polarities are alternately applied, and a DC offset therefore does not occur in the time average. The operation performed during wide-angle display, i.e., when the transparent/scattering switching element is not driven, is the same as in the aforementioned first embodiment of the present invention, and will not be described.

In the present embodiment, the operation timing of the two left and right systems of gate line drive circuits is diverted, and different pre-processing is performed for the start signals of each, whereby the cycle of polarity reversal of the transparent/scattering switching element can be frequency-modulated. As previously described, high definition is made possible by increasing the frequency, but power consumption increases. Power consumption can be reduced by lowering the frequency, but the picture quality then tends to decrease. In the present embodiment, driving is performed by periodically combining a low-power state with a high-picture-quality state, whereby low power operation and improved picture quality can be obtained simultaneously. Despite frequency modulation in the present embodiment, DC offset can be prevented from occurring. Therefore, burn-in of the transparent/scattering switching element can be reduced, and image quality can be prevented from deteriorating. It is important that the time ratio between positive and negative-polarity driving be equal in order to prevent DC offset.

In the aforementioned second embodiment of the present invention, the frequency was reduced using a 2-bit counter circuit, but the frequency can also be reduced in the same manner by providing a pre-processing circuit to a stage prior to the 1-bit counter circuit, as described in the present embodiment. Other operations and effects of the eighth embodiment are the same as those of the aforementioned seventh embodiment.

Figure 33:
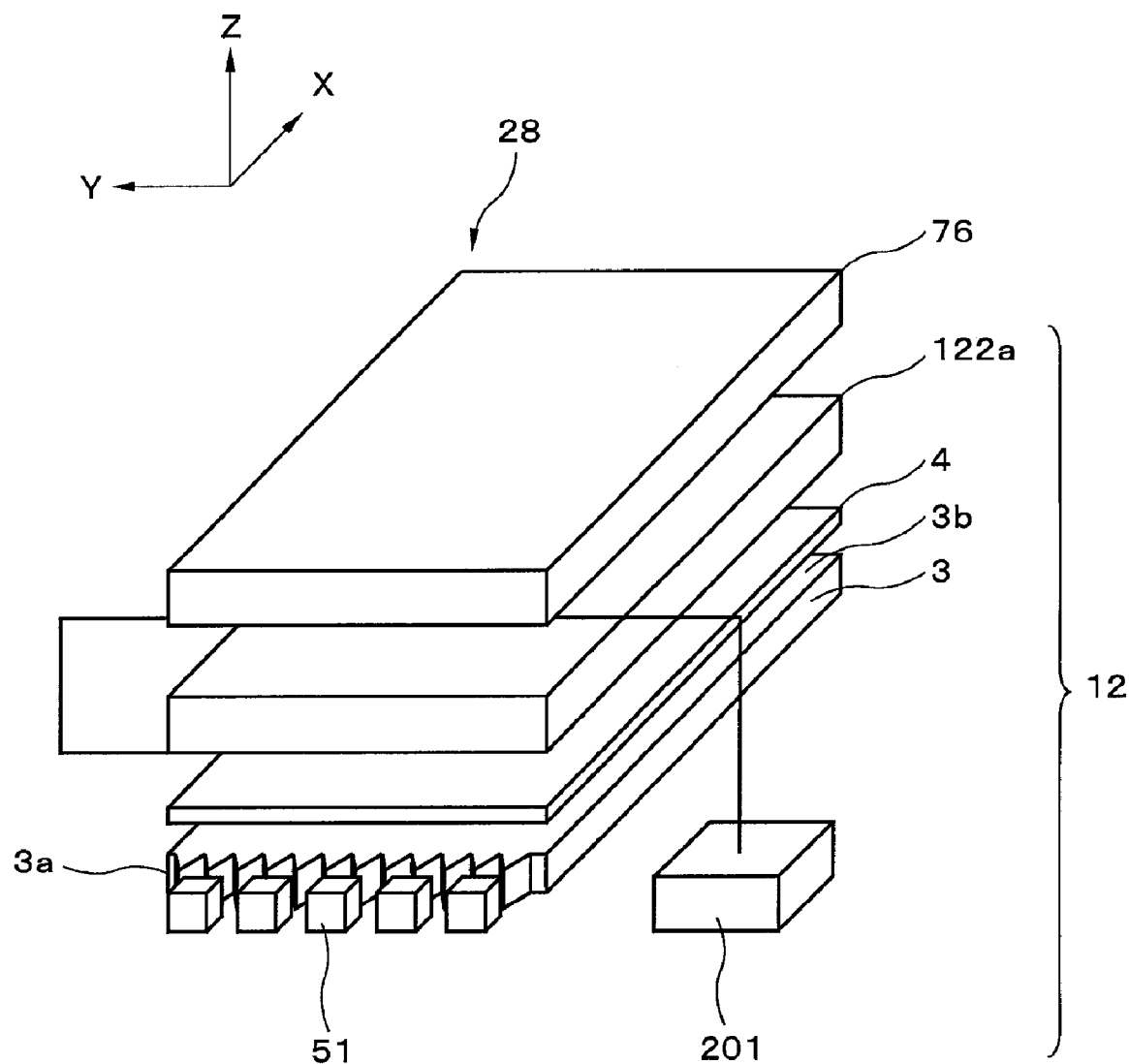
FIG. 33 is a perspective view showing the display device according to the ninth embodiment of the present invention.

A ninth embodiment of the present invention will next be described. FIG. 33 is a perspective view showing the display device according to the present embodiment.

As shown in FIG. 33, the display device 28 of the ninth embodiment is composed of a light source device 12 and a transmissive LCD panel 73. Specifically, the structure of the transmissive LCD panel is the same as in the aforementioned fifth embodiment of the present invention, but the structure of the light source device is different. A transparent/scattering switching element 122a is also used in the light source device 12. The transparent/scattering switching element 122a uses polymerized ferroelectric liquid crystal, thereby enabling rapid switching on the order of several microseconds or less. The delay time of the delay circuit 73f of the transparent/scattering switching element drive circuit 73d is set so as to be substantially equal to the gate line scanning time. Specifically, the delay circuit 73f can be formed using a shift register, but a shift register having the same number of stages as the gate line drive circuit is used in the present embodiment. A blanking period is also provided after the gate line scanning period, and these two periods together produce a frame rate of 60 Hz. The blanking period ensures sufficient time for the high-speed optical switching of the transparent/scattering switching element 122a to be completed. The term "optical switching" used herein refers to the slight change in optical state that occurs when the polarity of the transparent/scattering switching element is reversed. When the transparent/scattering switching element is bipolar, the same optical state is naturally expected to be maintained even when the electrical polarity is reversed, but a change that is sometimes problematic is actually observed before and after the polarity reversal, due to such causes as the state of the liquid crystal layer in the polymer, the effects of ions, and subtle fluctuations in the drive voltage. This change is generally not noticed by an observer when the frequency of polarity reversal is high, but the change becomes a problem when the frequency is reduced in order to reduce the operating power. Even when the frequency is high, a low-frequency beat that is related to frame drawing in the display panel is sometimes observed. The present embodiment achieves improved image quality by using the blanking period of the display panel to execute this transient change caused by polarity reversal. Aspects of the structure of the present embodiment other than those described above are the same as in the aforementioned fifth embodiment. Therefore, the same reference symbols are used for components that are the same as those shown in FIG. 20, and detailed descriptions thereof are not given.

The operation of the display device of the present embodiment configured as described above, i.e., the drive method of the display device according to the present embodiment, will next be described. As described above, the transparent/scattering switching element drive circuit 73d of the present embodiment has a delay circuit 73f, and the delay time of the delay circuit 73f is set so as to be substantially equal to the scanning time of the gate lines. Therefore, when the start signal VGST of the gate line drive circuit reaches a high level, scanning of the gate lines by the gate line drive circuit is initiated, and the shift register of the delay circuit 73f also initiates high-level propagation at the same time. At the stage in which gate line scanning is completed, high-level propagation of the shift register of the delay circuit 73f is also completed at the same time, and the operation for reversing the transparent/scattering switching element is executed. As previously described, the transparent/scattering switching element in the present embodiment is capable of extremely rapid operation, and the blanking period, i.e., the period from completion of the gate line scanning until scanning of the subsequent frame is initiated, is set so as to allow optical switching of the transparent/scattering switching element to be completed. As a result, when the electrical reversal operation is executed, optical switching of the transparent/scattering switching element can be completed by the time that gate line scanning of the subsequent frame is initiated. Since this configuration makes it possible to prevent the timing of drawing in the display panel from overlapping with the timing of polarity reversal of the transparent/scattering switching element, the effects of the transient change caused by polarity reversal of the transparent/scattering switching element can be reduced, and image quality can be improved.

Since the delay circuit 73f and the gate line drive circuit are identical circuits, it is apparent that these circuits may be used in common. Specifically, the final output of the gate line drive circuit may be used as the input of the 1-bit counter circuit 7f. This configuration can also make it possible to reverse the transparent/scattering switching element after gate line scanning is completed. The circuit dimensions are also significantly reduced, thereby enabling reduced cost, increased reliability, and reduced power consumption.

In the description of the present embodiment, optical switching of the transparent/scattering switching element was completed during the blanking period, but this configuration is not limiting. For example, even when switching is not fully completed, advantageous effects can be obtained by setting the main portion of switching so as to be within the blanking period. Polarity reversal occurs from positive to negative or negative to positive, i.e., when one of the electrodes constituting the transparent/scattering switching element is used as a reference, the other electrode has a positive polarity or a negative polarity, and there are two ways in which this state change takes place. However, when there is a time difference in the optical switching in the two state changes, advantageous effects can be obtained by at least applying the polarity reversal to the faster of the state changes. Other operations and effects of the ninth embodiment are the same as those of the aforementioned fifth embodiment.

Figure 34:
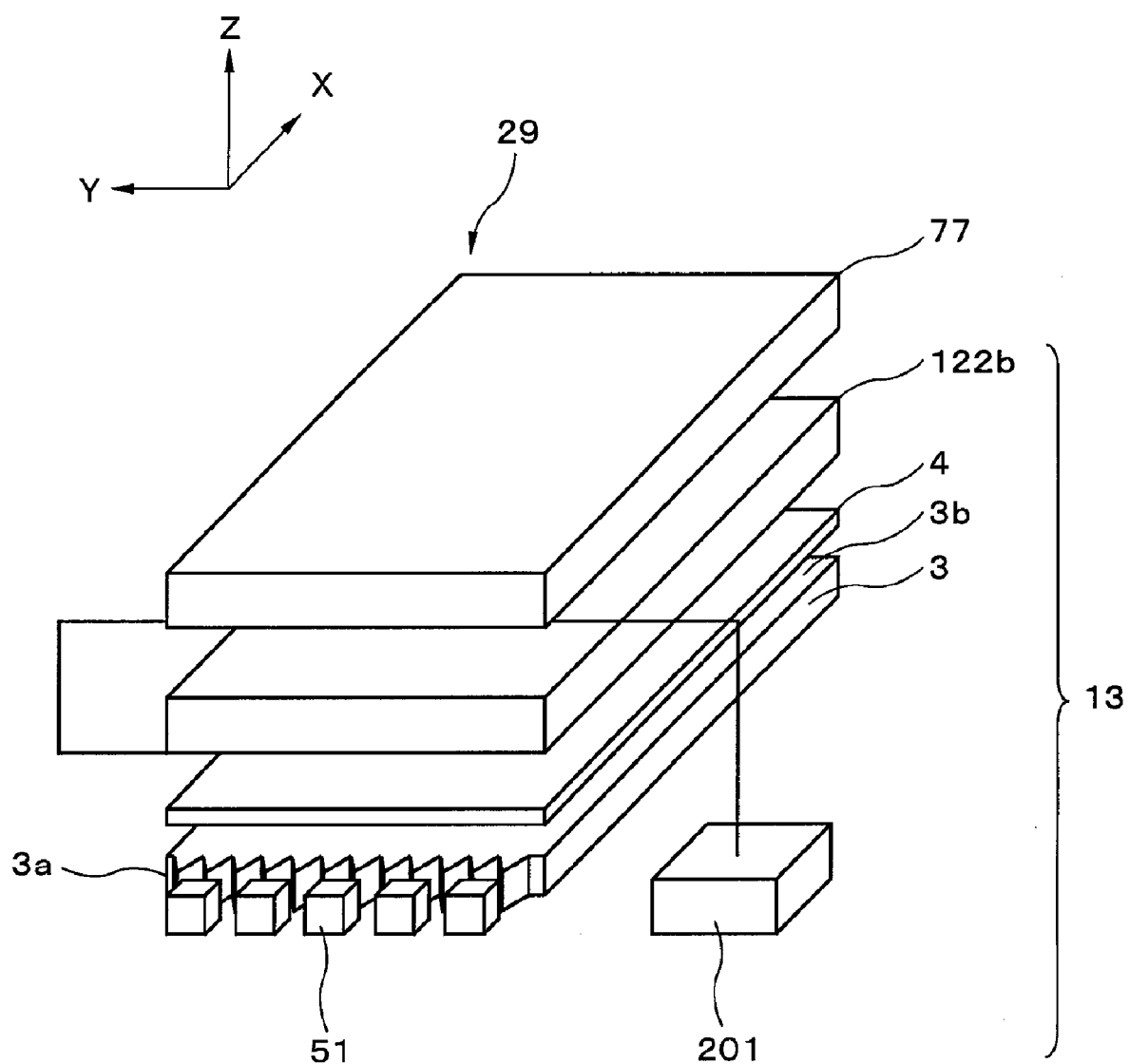
FIG. 34 is a perspective view showing the display device according to the tenth embodiment of the present invention.
Figure 35:
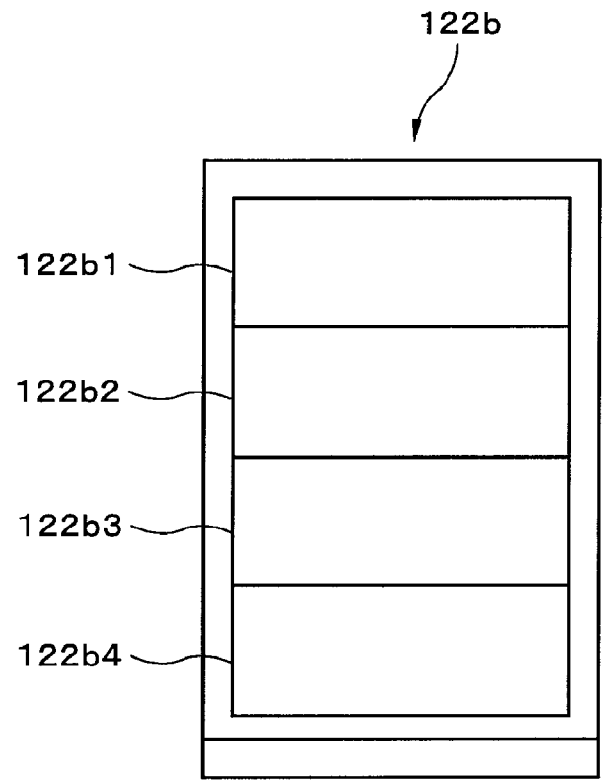
FIG. 35 is a top view showing the configuration of a transparent/scattering switching element, which is a constituent element of the display device.
Figure 36:
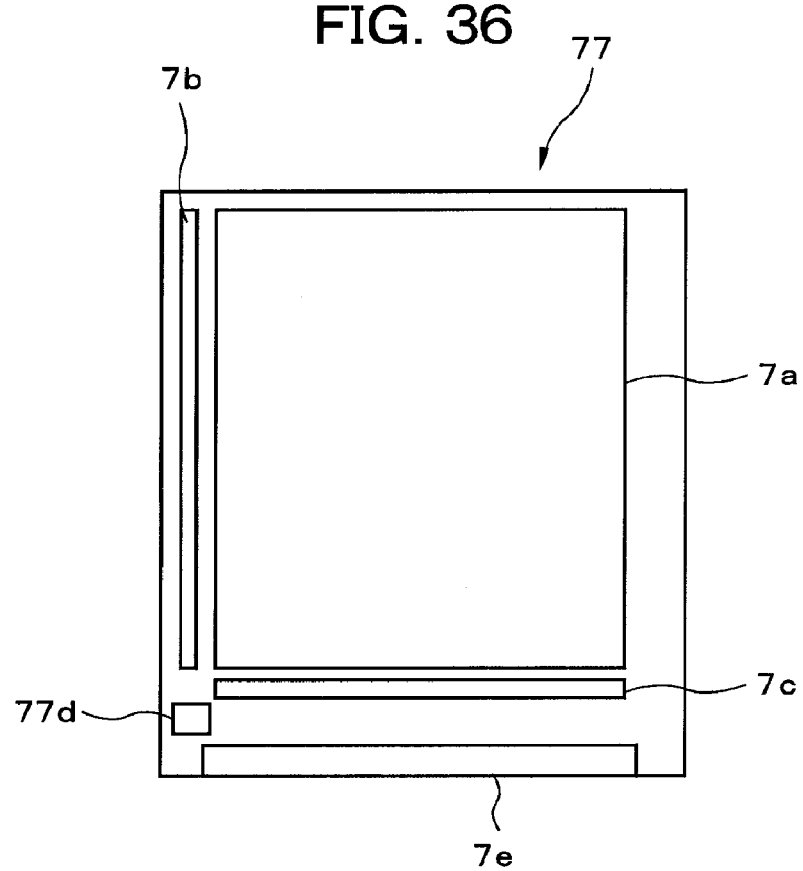
FIG. 36 is a top view showing the configuration of a transmissive LCD panel, which is a constituent element of the display device.
Figure 37:
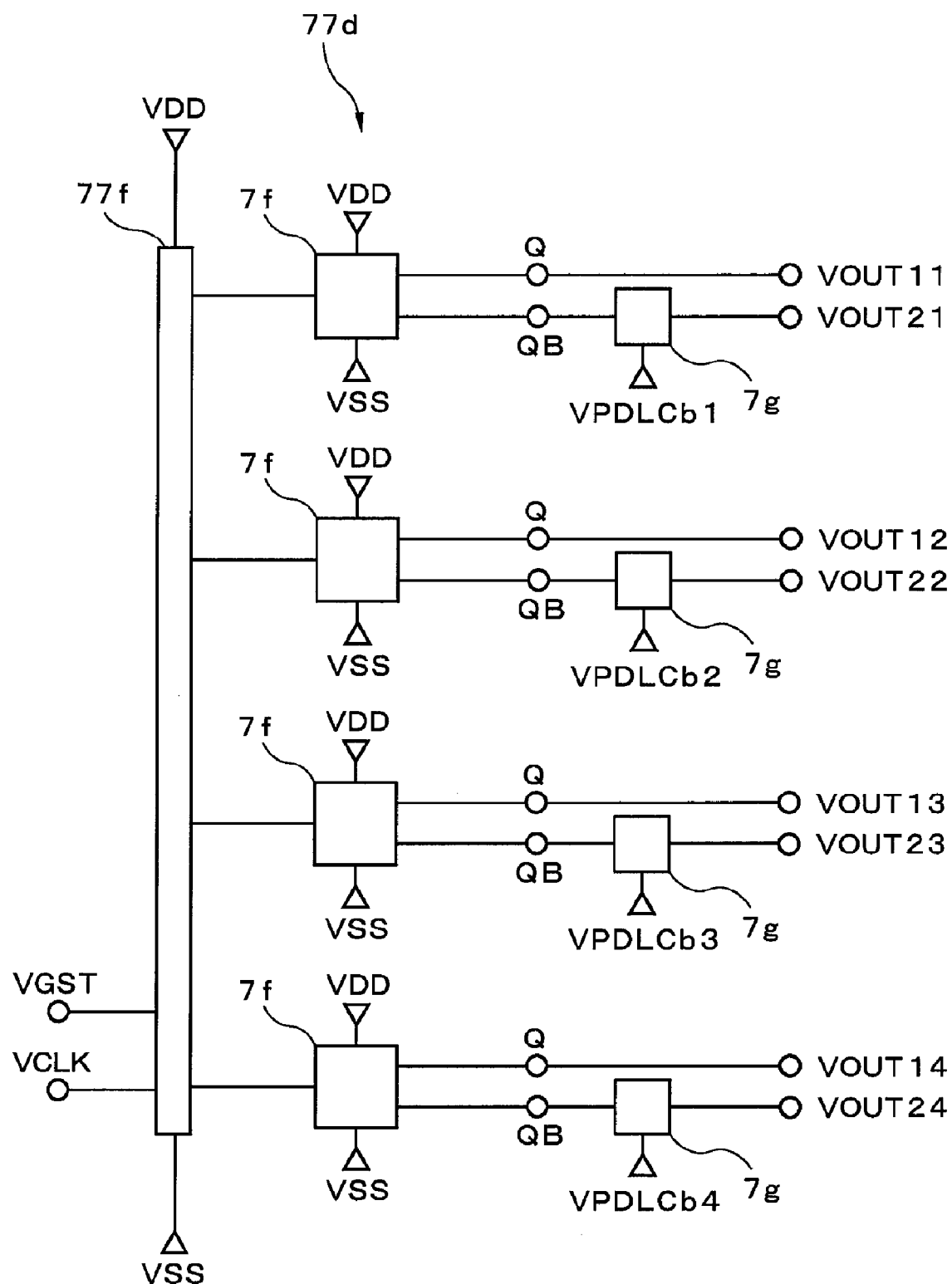
FIG. 37 is a circuit diagram of the transparent/scattering switching element drive circuit used for driving the transparent/scattering switching element.
Figure 38:
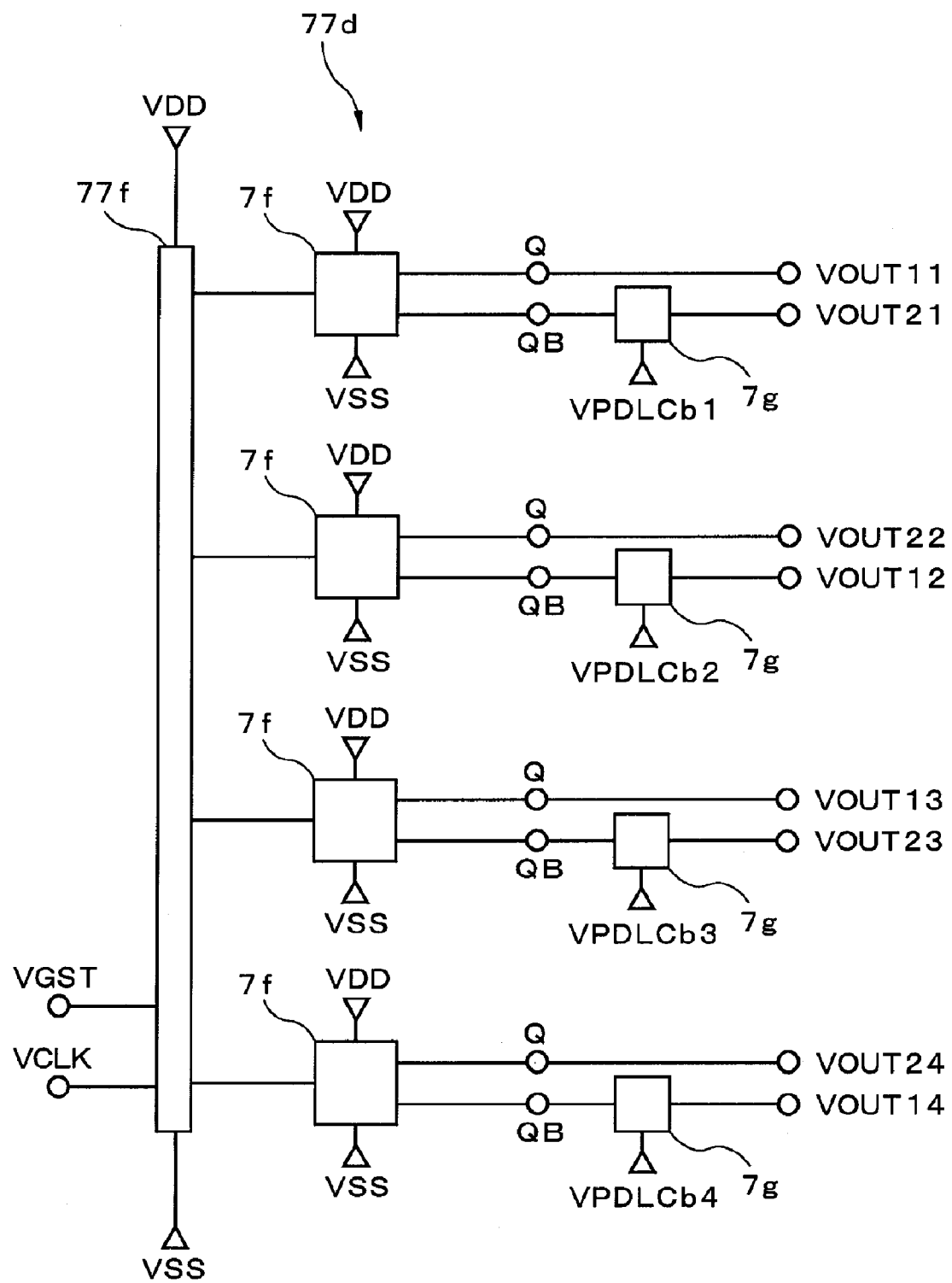
FIG. 38 is a circuit diagram of the transparent/scattering switching element drive circuit used for driving the transparent/scattering switching element, showing another variation thereof.

A tenth embodiment of the present invention will next be described. FIG. 34 is a perspective view showing the display device according to the present embodiment; FIG. 35 is a top view showing the configuration of the transparent/scattering switching element, which is a constituent element of the light source device; FIG. 36 is a top view showing the configuration of the transmissive LCD panel, which is a constituent element of the display device; FIG. 37 is a circuit diagram of the transparent/scattering switching element drive circuit used to drive the transparent/scattering switching element; and FIG. 38 is a circuit diagram of the transparent/scattering switching element drive circuit used to drive the transparent/scattering switching element. FIG. 38 shows a different variation of the transparent/scattering switching element drive circuit shown in FIG. 37.

As shown in FIG. 34, the display device 29 of the tenth embodiment is composed of a light source device 13 and a transmissive LCD panel 77. As shown in FIG. 34, the light source device 13 differs from the light source device 1 of the first embodiment in that a transparent/scattering switching element 122*b* is used instead of the transparent/scattering switching element 122. As shown in FIG. 35, the region of the transparent/scattering switching element 122*b* that is capable of switching between transparent and scattering states is divided into a plurality of blocks that can be independently controlled. This type of division into row block units can be achieved by dividing the transparent electrode that is a component of the transparent/scattering switching element. The direction of division in the present embodiment is set to the longitudinal direction, which is the direction in which the gate lines are arranged, and the division produces a plurality of row block units. A division into four sections is made for convenient description in the present embodiment, wherein a first row block 122*b*1, a second row block 122*b*2, a third row block 122*b*3, and a fourth row block 122*b*4 are arranged from the +X direction to the −X direction. The present embodiment is, of course, not limited by this number of divisions or method of division.

As shown in FIGS. 36 and 37, the transmissive LCD panel 77 differs from the transmissive LCD panel of the first embodiment in that a transparent/scattering switching element drive circuit 77*d* is used instead of the transparent/scattering switching element drive circuit 7*d*. Furthermore, the transparent/scattering switching element drive circuit 7*d* had a single 1-bit counter circuit 7*f*, whereas the transparent/scattering switching element drive circuit 77*d* of the present embodiment has four 1-bit counter circuits 7*f* and a shift register circuit 77*f* that has the same configuration as the shift register circuit that constitutes the gate line drive circuit 7*b*. Specifically, both shift registers have substantially the same number of stages. A start signal VGST and a clock signal VCLK are also inputted to the shift register circuit 77*f* in the same manner as to the shift register circuit that constitutes the gate line drive circuit 7*b*. When the shift register circuit 77*f* is divided into four stages, the output of each initial stage is connected to the corresponding 1-bit counter circuit 7*f*. Specifically, when the shift register circuit 77*f* has 360 stages, the outputs of the 1st stage, the 91st stage, the 181st stage, and the 271st stage are connected to the corresponding 1-bit counter circuit 7*f*. Each of the four 1-bit counter circuits 4*f* is wired so as to drive the corresponding row block of the transparent/scattering switching element 122*b*. The wiring to all four row blocks also has the same configuration. The terminals connected to the first row block 122*b*1 are VOUT11 and VOUT21. In the same manner, VOUT12 and VOUT22 are connected to the second row block 122*b*2, VOUT13 and VOUT23 are connected to the third row block 122*b*3, and VOUT14 and VOUT24 are connected to the fourth row block 122*b*4. This wiring is connected via a terminal portion 7*e*. Transmission gate circuits 7*g* for switching the driving of the transparent/scattering switching element on and off are provided so as to correspond to each row block of the transparent/scattering switching element, and are capable of separately controlling the on/off state of each row block. The control signals are referred to as VPDLCb1, VPDLCb2, VPDLCb3, and VPDLCb4. Aspects of the structure of the present embodiment other than those described above are the same as in the aforementioned first embodiment. Therefore, the same reference symbols are used for components that are the same as those shown in FIGS. 4, 7, and 8, and detailed descriptions thereof are not given.

The operation of the display device of the present embodiment configured as described above, i.e., the drive method of the display device according to the present embodiment, will next be described. The start signal VGST of the gate line drive circuit 7*b* is brought to a high level in order to initiate gate line scanning, whereupon the input of the shift register circuit 77*f* that constitutes the transparent/scattering switching element drive circuit 7*d* reaches a high level, and the shift register circuit 77*f* transmits the high-level data to the inside in the same manner as the gate line drive circuit 7*b*. When the first stage of the shift register circuit 77*f* first reaches a high level, the 1-bit counter circuit that is connected to the first row block 122*b*1 of the transparent/scattering switching element 122*b* is actuated, and the first row block 122*b*1 is reversed. In the same manner, when the 91st stage of the shift register circuit 77*f* reaches a high level, the second row block 122*b*2 is reversed, and so on thereafter, wherein the third row block 122*b*3 and the fourth row block 122*b*4 are sequentially reversed by the high level of the 181st stage and the high level of the 271st stage, respectively. Scanning can thereby occur in the plane of the transparent/scattering switching element. Furthermore, a transparent state and a scattering state can be simultaneously produced in the display plane by individually turning off the transmission gate circuit 7*g* connected to each row block.

Particularly because a transparent state and a scattering state can coexist in the same display screen in the present embodiment, a method of utilization is possible that produces a narrow-viewing-angle state only in a highly confidential portion of a display. A transparent/scattering switching element can also be driven in divided fashion, and it is therefore possible to increase the spatial frequency in relation to a case of in-plane uniform driving. Flicker control and other improvements of image quality are made possible as a result.

Four row blocks were described as being wired in the same manner in the present embodiment, but the row blocks may also be connected in place of the wiring to VOUT1 and VOUT2, as shown in FIG. 38, thereby enabling polarity shifting. Flickering and other degradation of display quality that accompanies reversal can also be suppressed in the same manner as by line reversal of the display panel. This can be achieved by forming the connections so that adjacent row blocks have opposite polarities. The image quality can therefore be even further improved. In FIG. 38, the wiring to the first and third row blocks is the same as in FIG. 37, but the wiring to the second and fourth row blocks is replaced.

The connections between the transparent/scattering switching element drive circuit and the four row blocks on the transparent/scattering switching element were described as being made via the terminal portion 7*e* in the present embodiment, but this configuration is preferred because the ability to reduce the area of the terminal portion facilitates size reduction. As another example, a method may be used that involves forming connections in the frame region beside the display region, i.e., on the side in the +Y direction, to emphasize correspondence to the four row blocks, but this method requires a new terminal portion beside the display region, and is not preferred relative to the previously described method in terms of size reduction. However, providing a terminal portion beside the display region is advantageous for cost reduction, because the wiring pattern on the transparent/scattering switching element can be simplified. The optimum method can be selected as needed according to the requirements of the display device.

Furthermore, providing a delay circuit to the input stage of the shift register circuit 77*f* makes it possible to intentionally offset the timing in relation to scanning of the display panel to optimize operation. The scanning direction of the row blocks of the transparent/scattering switching element may also be set to the opposite of the scanning direction of the display panel to enable improved image quality. A portion of the 1-bit counter circuit may also be replaced with a 2-bit counter circuit to enable different reversal periods to coexist in the same plane. For example, by increasing the reversal period of the upper or lower portion of the screen, or another portion that is unlikely to display important information, power consumption can be reduced without adversely affecting the overall image quality of the screen to a practically significant degree. Conversely, the reversal period of a region that is likely to display high-visibility information can be reduced to increase the image quality of the same portion. A case was also described in which the present embodiment was formed using a shift register circuit, but this configuration is not limiting, and equivalent effects can be obtained using another circuit. For example, a counter circuit may be used in the same manner as in the aforementioned fourth embodiment. Other operations and effects of the tenth embodiment are the same as those of the aforementioned first embodiment.

Figure 39:
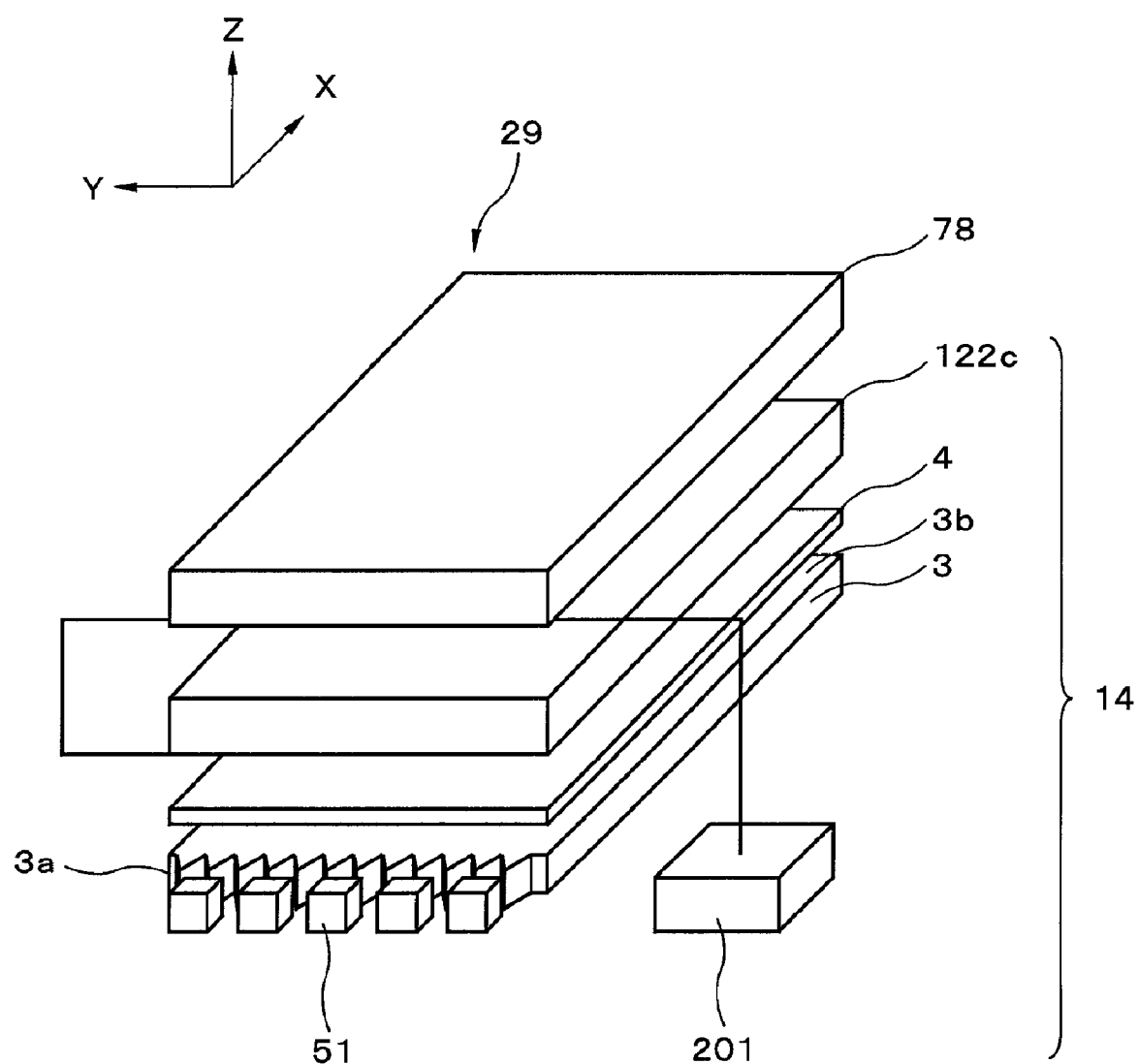
FIG. 39 is a perspective view showing the display device according to the eleventh embodiment of the present invention.
Figure 40:
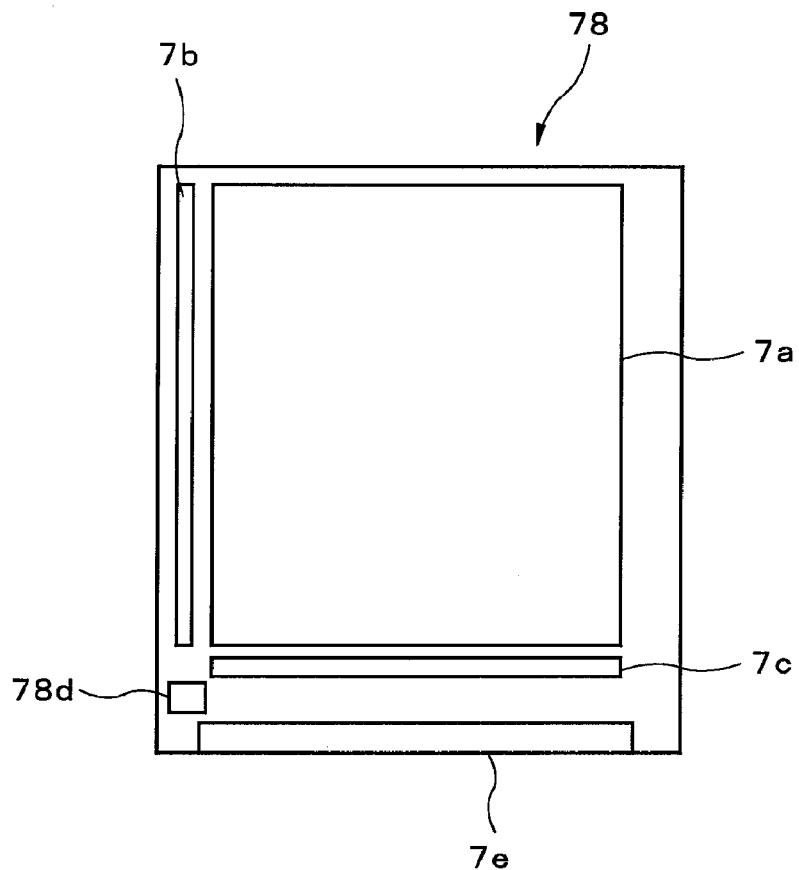
FIG. 40 is a top view showing the configuration of a transmissive LCD panel, which is a constituent element of the display device.

An eleventh embodiment of the present invention will next be described. FIG. 39 is a perspective view showing the display device according to the present embodiment; FIG. 40 is a top view showing the configuration of the transmissive LCD panel, which is a constituent element of the display device; and FIG. 41 is a circuit diagram of the transparent/scattering switching element drive circuit used to drive the transparent/scattering switching element.

As shown in FIG. 39, the display device 29 of the eleventh embodiment is composed of a light source device 14 and a transmissive LCD panel 78. As shown in FIG. 39, the light source device 14 differs from the light source device 1 of the first embodiment in that a transparent/scattering switching element 122c is used instead of the transparent/scattering switching element 122. The transparent/scattering switching element 122c has memory properties and can retain an immediately prior state without a voltage applied. For example, a transparent state occurs when a positive voltage is applied, and the transparent state can be retained even after the voltage is turned off. A scattering state occurs when a negative voltage is applied, and the scattering state can also be retained even after the voltage is turned off. A transparent/scattering switching element having this type of capability can easily be created by mixing an oriented polymer with liquid crystal that has memory properties, e.g., ferroelectric liquid crystal, adding a polarizing plate, and using the assembly in only a prescribed polarization direction.

Figure 41:
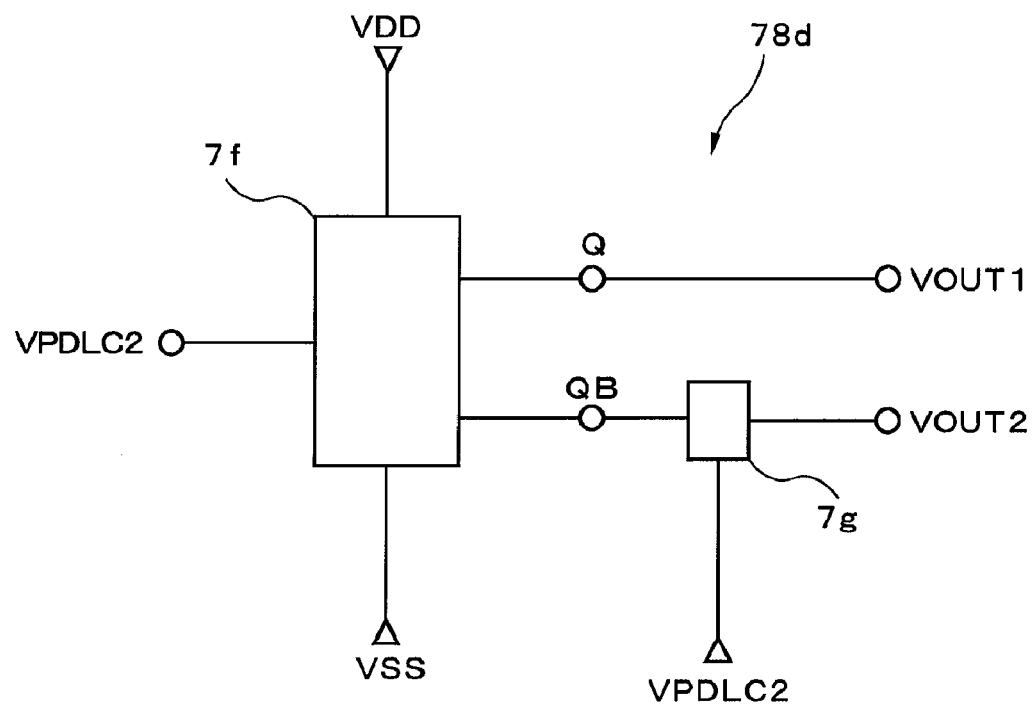
FIG. 41 is a circuit diagram of the transparent/scattering switching element drive circuit used for driving the transparent/scattering switching element.

As shown in FIGS. 40 and 41, the transmissive LCD panel 78 differs from the transmissive LCD panel of the first embodiment in that a transparent/scattering switching element drive circuit 78d is used instead of the transparent/scattering switching element drive circuit 7d. The basic structure of the transparent/scattering switching element drive circuit 78d is the same as that of the transparent/scattering switching element drive circuit 7d, except that the input of the 1-bit counter circuit 7f is a control signal VPDLC2, which is the same as the control signal VPDLC2 of the transmission gate circuit 7g. The control signal VPDLC2 has a high level and a low level, and acts as a switch in the transmission gate circuit 7g whereby the input signal is outputted without modification when the control signal VPDLC2 is at a high level, and input and output are cut off when the control signal VPDLC is at a low level. In the present embodiment, the control signal VPDLC2 is at a high level during switching between the transparent state and the scattering state, and is at a low level at all other times. Aspects of the structure of the present embodiment other than those described above are the same as in the aforementioned first embodiment. Therefore, the same reference symbols are used for components that are the same as those shown in FIGS. 4, 7, and 8, and detailed descriptions thereof are not given.

The operation of the display device of the present embodiment configured as described above, i.e., the drive method of the display device according to the present embodiment, will next be described. When the control signal VPDLC2 is at a high level, the input of the 1-bit counter circuit 7f is at a high level, and a prescribed voltage is outputted from the 1-bit counter circuit 7f. In this example, Q is at a high level, and QB is at a low level. Since the transmission gate circuit 7g is on while the control signal VPDLC2 is at a high level, a high level is outputted to VOUT1, and a low level is outputted to VOUT2. As a result, the transparent/scattering switching element 122c changes to the transparent state. When the control signal VPDLC2 is at a low level, driving of the transparent/scattering switching element 122c is turned off, but the transparent state is maintained by the aforementioned memory properties.

The control signal VPDLC2 then reaches a high level when the transparent/scattering switching element 122c is switched to the scattering state. When the control signal VPDLC2 is at a high level, the input of the 1-bit counter circuit 7f is at a high level, but since the 1-bit counter circuit 7f remembers the transparent state, reversal information is outputted. Specifically, Q reaches a low level, and QB reaches a high level. Since the transmission gate circuit 7g is on while the control signal VPDLC2 is at a high level, a low level is outputted to VOUT1, and a high level is outputted to VOUT2. As a result, the transparent/scattering switching element 122c changes to the scattering state. When the control signal VPDLC2 is at a low level, driving of the transparent/scattering switching element 122c is turned off, but the scattering state is maintained by the aforementioned memory properties. Utilizing the memory properties of the transparent/scattering switching element 122c in this manner makes it possible to divert only the power supply of the gate line drive circuit and drive the transparent/scattering switching element.

In the present embodiment, the power source used for the existing circuits on the display panel is diverted for use as, e.g., the power source for the gate-line drive circuit, and is thereby able to drive the transparent/scattering switching element. The transparent/scattering switching element having memory properties can also be suitably driven, and low power consumption can be achieved. Using a transparent/scattering switching element having memory properties allows a reduction in the scale required for electricity to flow through the circuit, and allows the circuit action to be retained only during switching. Therefore, combining the element with the drive circuit of the present configuration allows lower levels of power consumption to be achieved together with higher yields, resulting in lower costs and other benefits. In comparison with other transparent/scattering switching elements in which reverse driving is required, no reverse driving will be needed in the transparent or scattered state. It is accordingly possible to prevent any deterioration in the display quality accompanying the reversing action, and to allow a high image quality to be achieved.

The drive circuit of the transparent/scattering switching element of the present embodiment was described as being configured using a 1-bit counter circuit. However, the present invention is not restricted thereby, and may indeed be suitably used provided that a state in which no voltage is applied can be achieved after a positive polarity or negative polarity voltage has been applied. As a further example, an aspect can be considered wherein two control lines are prepared, and a 3-mode toggle switch having an "off" setting in the central position is used as a human interface. If, for example, the toggle switch is moved to the left side, positive polarity voltage will be applied to the transparent/scattering switching element; and, when the operator releases the switch, the open state in the central position will be automatically restored. If the switch is moved to the right, a negative polarity voltage will be applied; and, when the operator removes their hand, the switch will be automatically turned to "off." In such instances, the transparent/scattering switching element drive circuit can be configured using a simple switch having two control lines as inputs and allowing positive or negative voltage to be selected. The transparent/scattering switching element drive circuit can also be constructed on the smallest possible scale. The actions and effects of the eleventh embodiment are the same as those of the aforedescribed first embodiment, other than as described hereinabove.

Figure 42:
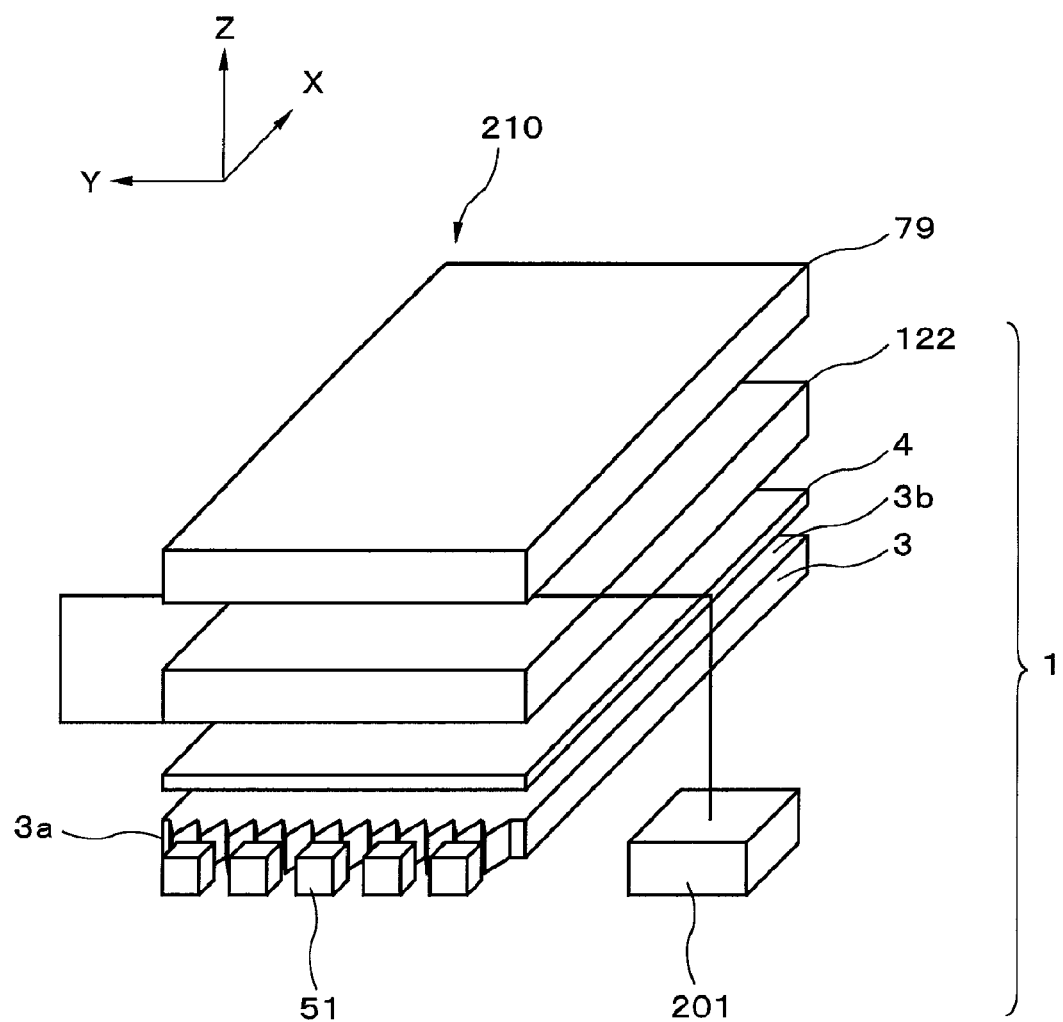
FIG. 42 is a perspective view showing the display device according to the twelfth embodiment of the present invention.
Figure 43:
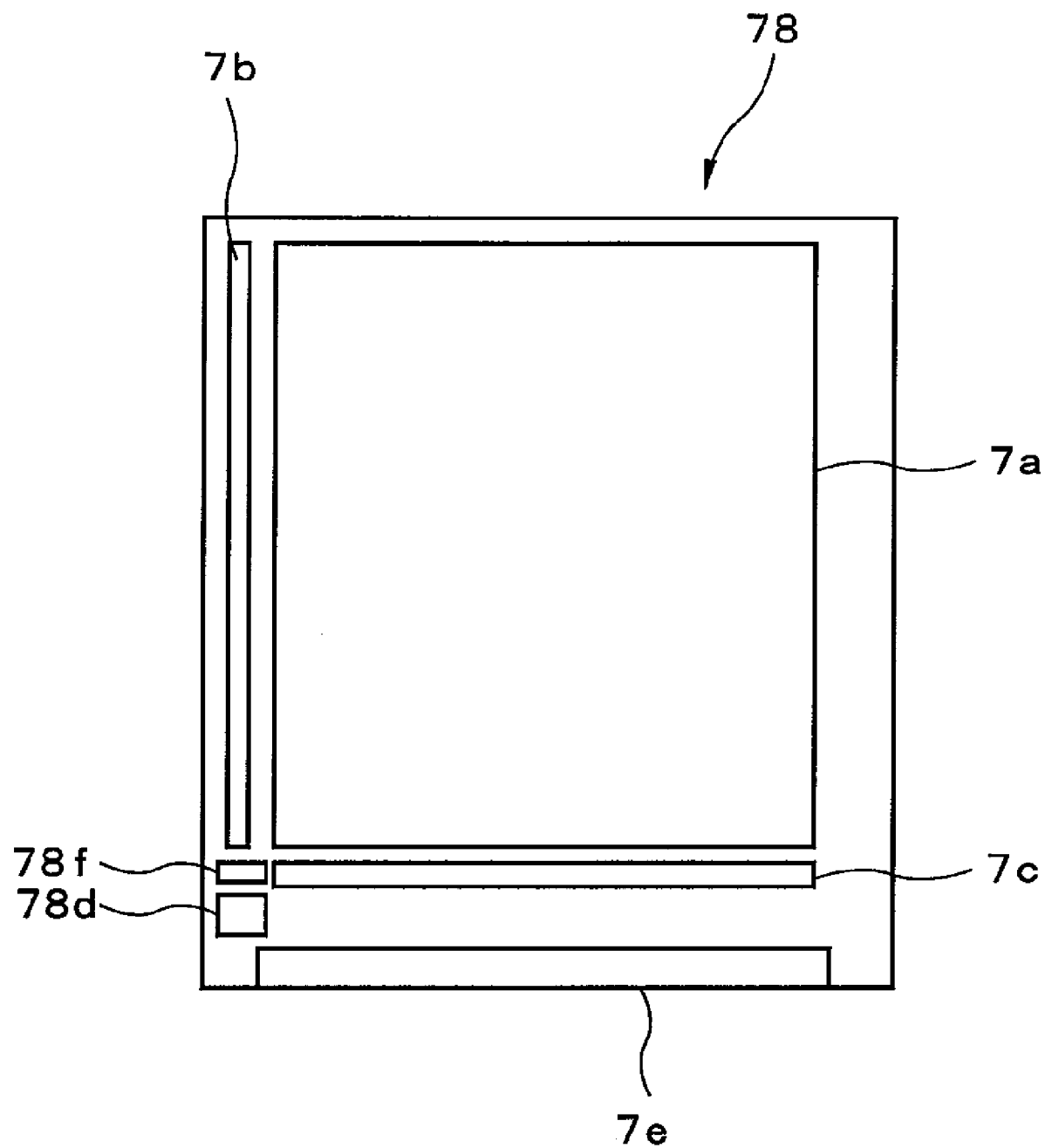
FIG. 43 is a top view showing the configuration of a transmissive LCD panel, which is a constituent element of the display device.

A twelfth embodiment of the present invention will next be described. FIG. 42 is a perspective view showing a display device according to the present embodiment; and FIG. 43 is a top view showing the configuration of a transmissive LCD panel, which is a constituent element of the display device.

As shown in FIG. 42, a display device 210 according to the twelfth embodiment is composed of a light source device 1 and a transmissive LCD panel 79. As shown in FIG. 43, a transparent/scattering switching element drive circuit 78d is used instead of the transparent/scattering switching element drive circuit 7d in the transmissive LCD panel 79, in contrast to the transmissive LCD panel mentioned in the aforedescribed first embodiment. A temperature detection circuit 78f for detecting ambient temperature is mounted on the transmissive LCD panel 79, and outputs from the temperature sensing circuit 78f are inputted to the transparent/scattering switching element drive circuit 78d. The temperature sensing circuit 78f is constructed using a well-known technique (e.g., Japanese Laid-Open Patent Application No. 2006-71564), and a thin-film transistor is used therein. The transparent/scattering switching element drive circuit 78d is configured so that the output voltage for driving the transparent/scattering switching element can be varied based on the outputs from the temperature sensing circuit 78f. The drive circuit 78d is configured so that, for example, the output voltage is increased in a low-temperature state, and reduced in concert with an increase in the temperature. In other words, a prominent characteristic of the present embodiment is that a temperature sensing circuit for detecting ambient temperature is employed, and the voltage range over which the transparent/scattering switching element drive circuit drives the transparent/scattering switching element is varied using the effect of the temperature sensing circuit. The other aspects of the configuration in the present embodiment are the same as those in the first embodiment described above. The same reference numerals are accordingly used for the same constituent elements of FIGS. 4, 7, and 8, and detailed descriptions thereof are omitted.

A description shall subsequently be provided in regard to the actions and effects of the display device according to the present embodiment, which is constituted as described in the foregoing; i.e., in regard to a method for driving the display device according to the present embodiment and the effects associated therewith. The temperature sensing circuit 78f monitors the ambient temperature conditions, and when a low-temperature state is detected, the associated information is inputted to the transparent/scattering switching element drive circuit 78d. The transparent/scattering switching element drive circuit 78d then increases the output voltage used for driving the transparent/scattering switching element, based on the input information obtained from the temperature sensing circuit 78f. The response rate of the transparent/scattering switching element usually decreases in low-temperature conditions, for which reason switching between the transparent and scattered states slows down. However, increasing the drive voltage enables a rapid response rate. As a result, switching between wide viewing angle display and narrow viewing angle display can be performed at high speed, irrespective of whether the temperature is low. On the other hand, if the temperature sensing circuit 78f senses an increase in the temperature, the associated information is inputted into the transparent/scattering switching element drive circuit 78d. The transparent/scattering switching element drive circuit 78d then reduces the output voltage used for driving the transparent/scattering switching element based on the input information obtained from the temperature sensing circuit 78f. If the temperature has increased, the transparent/scattering switching element can be changed to low voltage, since continued driving at a high voltage is undesirable if power consumption is to be reduced. Performing the operation as in the present embodiment enables power to be reduced. Such control is highly efficient when a terminal device is started up in low external temperature conditions. A low temperature state will be in effect when the device is stare transparent/scattering switching element will increase due, for example, to the heat generated by the light source after the terminal device has been in use for some time. The drive voltage can accordingly be reduced, which allows less power to be consumed and simultaneously enables switching to be performed more rapidly. As shown in FIG. 42, the display panel is positioned in proximity to the transparent/scattering switching element. Accordingly, the state of the transparent/scatterinted up, but the temperature of thg switching element can be detected with greater accuracy, and control precision can be improved by having the temperature sensing circuit provided to the display panel.

Only one temperature sensing unit has been used in the description of the present embodiment; however, the present invention is not restricted thereby, and a plurality of such means may be used. The sensing precision can be increased as a result. Moreover, placing a plurality of temperature sensing circuits in different positions relative to the light source allows variations in the temperature of the transparent/scattering switching element to be sensed, and, in consideration thereof, driving to change in turn. For example, it is preferable for [a temperature sensing circuit] to be placed not only on the terminal portion near the light source, but on the end of the display panel furthest from the terminal portion in the +X direction of the display panel in FIG. 39. The temperature of the region near the light source will rise quickly, but the region away from the light source will be slower to heat up. Therefore, delicate control can be performed; e.g., not reducing the drive voltage until the overall temperature has reached a set level. If the drive voltage is reduced while a low-temperature region is still present in a certain area, a problem will be presented in that the response rate will be low only in that region, for which reason noticeable abnormalities will occur during switching. The configuration described hereinabove allows this problem to be overcome.

In the present embodiment, a description was provided using an example wherein the drive voltage of the transparent/scattering switching element was adjusted based on information obtained from the temperature sensing circuit, but the present invention is not restricted thereby, and may be suitably employed to perform any kind of control using the temperature information. In a further example that can be considered, the polarity reversing period for the voltage used to drive the transparent/scattering switching element may be adjusted. In a low-temperature state, ions or other impurities contained in the transparent/scattering switching layer of the transparent/scattering switching element also have lowered mobility. Therefore, few problems will be encountered even if the polarity reversing period is increased. Moreover, longer battery life tends to be more desirable than display quality in a low-temperature state. Therefore, if the inversion frequency is lowered during low-temperature operation, battery life can be extended. When combined with the aforedescribed voltage control, this will allow power consumption to be reduced and the response rate to be maintained during switching. The actions and effects of the twelfth embodiment are the same as those of the aforedescribed first embodiment, other than as described hereinabove.

Figure 44:
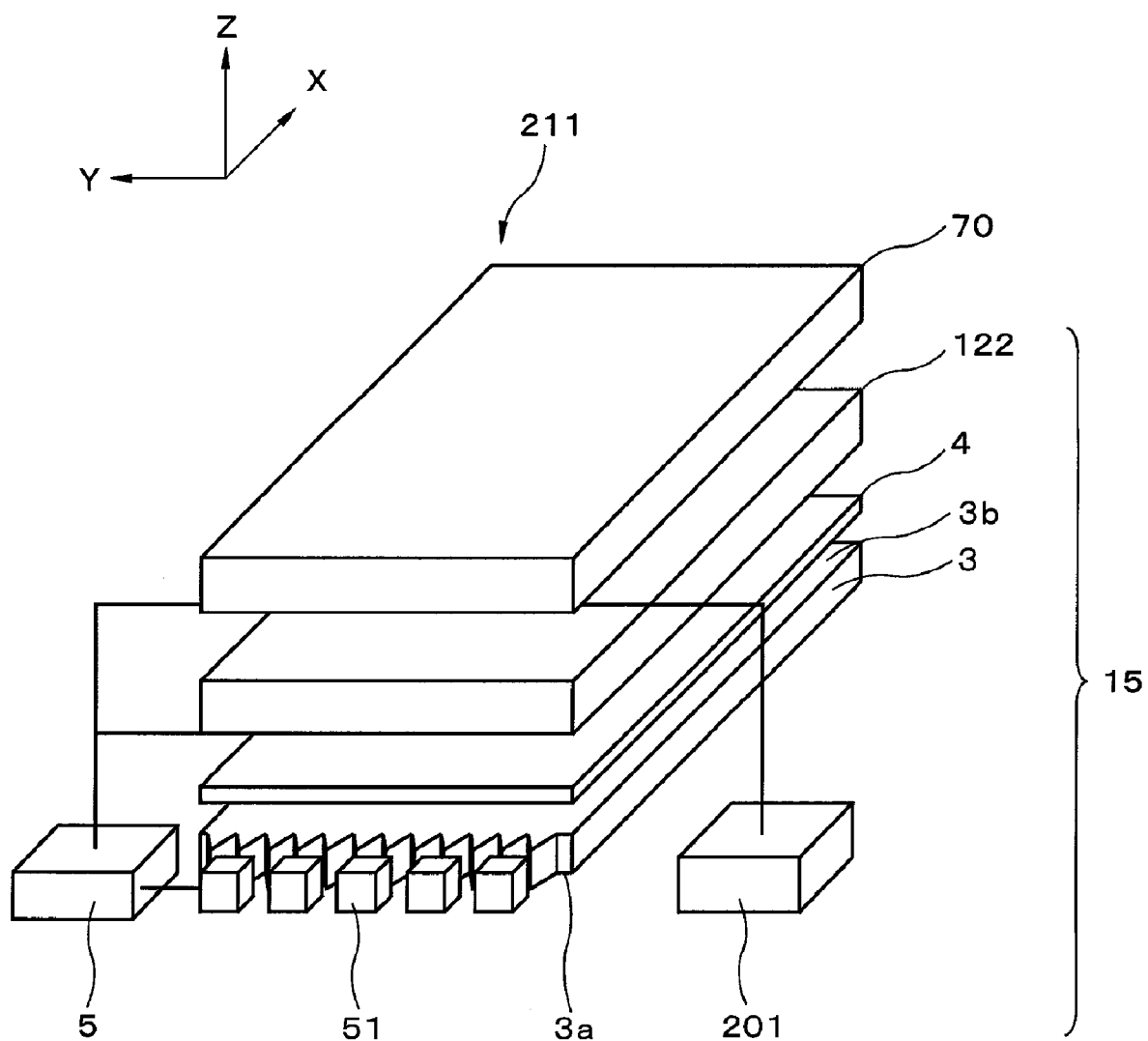
FIG. 44 is a perspective view showing the display device according to the twelfth embodiment of the present invention.
Figure 45:
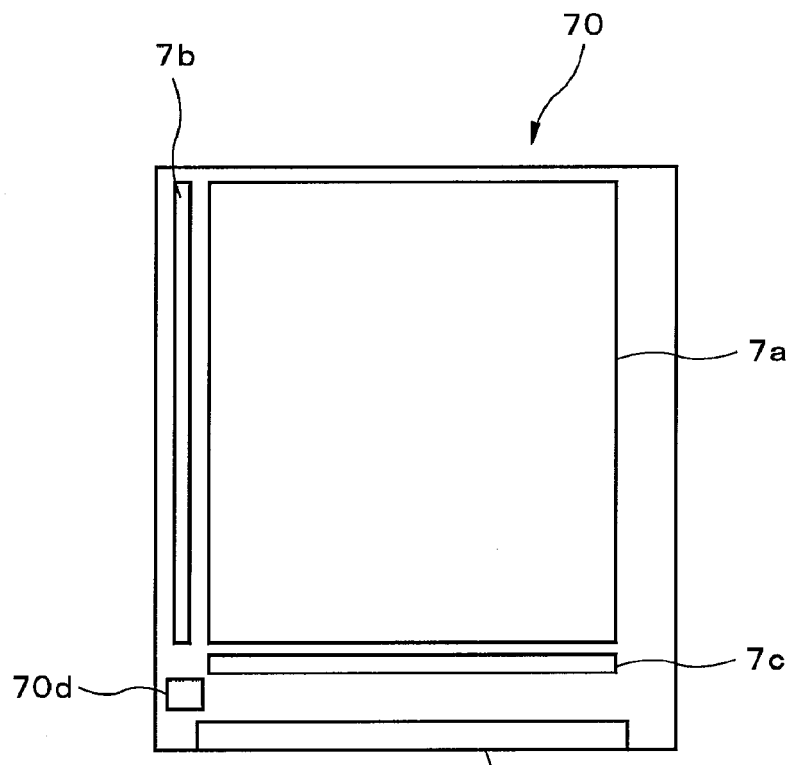
FIG. 45 is a top view showing the configuration of a transmissive LCD panel, which is a constituent element of the display device.

A thirteenth embodiment of the present invention shall subsequently be described. FIG. 44 is a perspective view showing a display device according to the present embodiment; FIG. 45 is a top view showing the configuration of a transmissive LCD panel, which is a constituent element of the display device; and FIG. 46 is a circuit diagram for a transparent/scattering switching element drive circuit used for driving a transparent/scattering switching element.

As shown in FIG. 44, a display device 211 according to the present thirteenth embodiment is composed of a light source 15 and a transmissive LCD panel 70. The light source 15 differs from the light source device 1 mentioned in the aforedescribed first embodiment in that the light source 15 is provided with a light source drive circuit 5, as shown in FIG. 44. The light source drive circuit 5 is connected to the transmissive LCD panel 70 via a control line. As shown in FIGS. 45 and 46, a transparent/scattering switching element drive circuit 70d is configured on the transmissive LCD panel 70, but the control line for controlling the light source drive circuit 5 is connected to the transparent/scattering switching element drive circuit 70d. If the output of the transparent/scattering switching element drive circuit 70d to the light source drive circuit 5 is at a high level, then the light source drive circuit 5 adjusts a white LED 51 for narrow viewing angle display. If the output is at a low level, then the light source drive circuit 5 adjusts the white LED 51 for wide viewing angle display. In other words, the transparent/scattering switching element drive circuit 70d of the present embodiment also functions to control the light source drive circuit 5.

Figure 46:
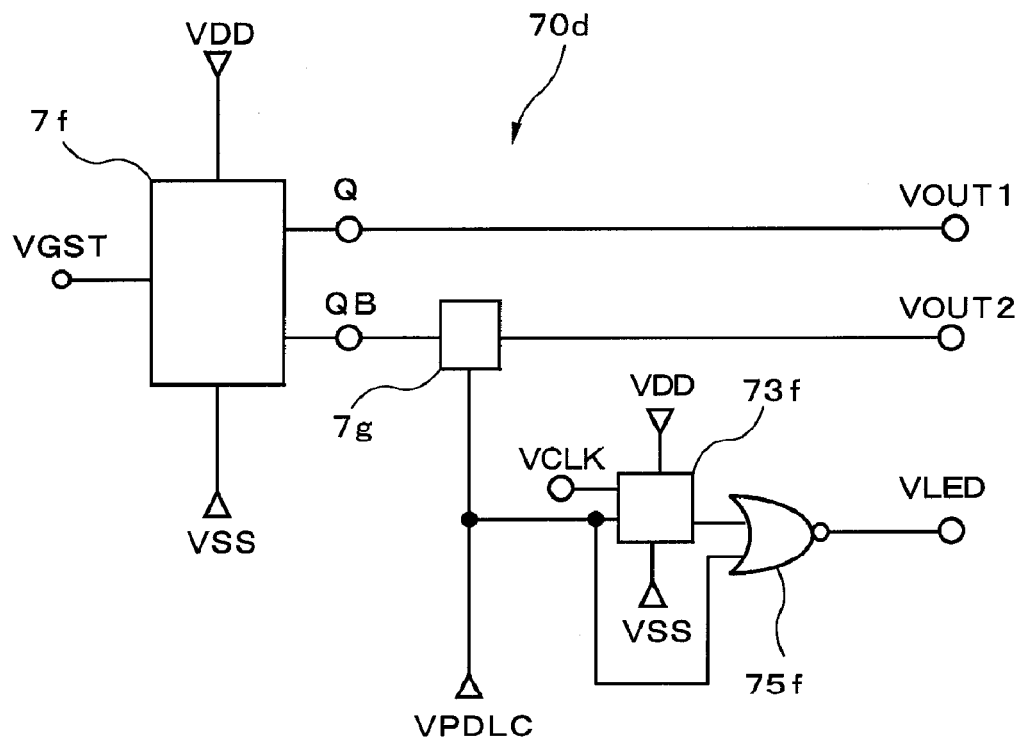
FIG. 46 is a circuit diagram of the transparent/scattering switching element drive circuit used for driving the transparent/scattering switching element.

As shown in FIG. 46, the transparent/scattering switching element drive circuit 70d has the same basic structure as that of the aforedescribed transparent/scattering switching element 7d, but differs in that the control signal VPDLC for switching the transparent/scattering switching element between the transparent and scattered states is connected not only to a transmission gate circuit 7g but also to a delay circuit 73f. The delay circuit 73f is composed of a shift register circuit having a prescribed number of stages, and has a power source in common with the gate line drive circuit. The clock signal VCLK of the gate line electrode circuit is connected to the clock of the delay circuit 73f. The output from the delay circuit 73f is inputted to an OR circuit 75f, as is the control signal VPDLC. The OR circuit 75f is configured to execute an OR operation on the output of the delay circuit 73f and the control signal VPDLC. The output of the OR circuit 75f is connected to a VLED terminal, and a control line for controlling the light source drive circuit 5 is connected to the VLED terminal. The number of stages of the delay circuit 73f is set for the time needed when the transparent/scattering switching element is switched from the transparent state to the scattered state. The other aspects of the configuration in the present embodiment are the same as those in the first embodiment described above. The same reference numerals are accordingly used for the same constituent elements of FIGS. 4, 7, and 8, and detailed descriptions thereof are omitted.

A description shall subsequently be provided in regard to the actions of the display device according to the present embodiment, which is constituted as described hereinabove; i.e., in regard to a method for driving the display device according to the present embodiment. A description shall first be provided in regard to the narrow viewing angle display state. When the control signal VPDLC is at a high level, the transparent/scattering switching element is driven and assumes a transparent state. The polarity reversing action is executed in the same manner as in the aforedescribed first embodiment. In the present embodiment, the signal for controlling the light source drive circuit 5 via the delay circuit 73f is also at a high level. Therefore, the light source drive circuit 5 will adjust the white LED 51 for narrow viewing angle display. On the other hand, when the control signal VPDLC is at a low level, the transparent/scattering switching element is released and brought to a scattered state. The signal for controlling the light source drive circuit 5 via the delay circuit 73f is also at a low level. Therefore, the light source drive circuit 5 will adjust the white LED 51 for wide viewing angle display.

The most prominent characteristic of the action in the present embodiment is the process of switching between the narrow viewing angle display state and the wide viewing angle display state. In the narrow viewing angle display state, light may ordinarily be directed in a narrow angle range. Therefore, little light needs to be emitted by the light source. In other words, "the light source drive circuit 5 will adjust the white LED 51 for narrow angle viewing display" specifically means that the amount of light is reduced. On the other hand, in the wide angle viewing display state, light needs to be directed in a wide angle range. Therefore, more light is required than for the narrow viewing angle display state. In other words, "the light source drive circuit 5 will adjust the white LED 51 for wide angle viewing display" specifically means that the amount of light is increased. A delay circuit 73f is employed in the present embodiment, and the delay time thereof is set to the time required for the transparent/scattering switching element to switch from the transparent state to the scattered state. Accordingly, when the control signal VPDLC changes from low level to high level and the viewing angle state changes from wide to narrow, the transparent/scattering switching element starts to shift from the scattered state to the transparent state. Therefore, the input from the delay circuit 73f to the OR circuit 75f is at a low level, and the input from the control signal VPDLC is at a high level. Accordingly, the output from the OR circuit 75f will be at a high level at the same time that the control signal VPDLC shifts from low level to high level, and the light source drive circuit 5 will reduce the amount of light emitted by the white LED 51. In other words, the amount of light will be low as the state shifts from scattered to transparent. On the other hand, when the control signal VPDLC changes from high level or low level, and the viewing angle state changes from narrow to wide, the transparent/scattering switching element starts to shift from the transparent state to the scattered state. Therefore, the input from the delay circuit 73f to the OR circuit 75f is at a high level, and the input from the control signal VPDLC is at a low level. Accordingly, the output from the OR circuit 75f will be at a high level, and will become low level at the same time that the input from the delay circuit 73f changes to low level. In other words, as the state shifts from transparent to scattered, the LED 51 will be dark for narrow viewing angle display, but will brighten as the amount of light increases after the state has shifted to scattered.

As has been described in the foregoing, the light source must emit a large amount of light in the wide viewing angle display state, wherein the transparent/scattering switching element is in the scattered state. However, the scattering performance of the transparent/scattering switching element declines when a large amount of light is emitted, whereupon the brightness of the display will suddenly increase when the state switches. This increase will be observed as glare, which will disturb the user. In the present embodiment, the transparent/scattering switching element drive circuit also controls the light source drive circuit, and performs a control so that the amount of light emitted by the light source will be at the wide viewing angle display level only when the transparent/scattering switching element is completely in a scattered state. Accordingly, the glare of the screen during switching will be prevented, and any sense of discomfort can be minimized.

The circuit structure in the present embodiment is not restricted to that described hereinabove. Any structure may be suitably employed as long as a control can be performed to allow the amount of light emitted by the light source to be at the wide viewing angle display level only when the transparent/scattering switching element is completely in a scattered state. The delay circuit need not be disposed on the light source control side. It is also possible for the delay circuit to be provided to the transparent/scattering switching element control side, and for the transparent/scattering switching element to be adjusted after the amount of light emitted by the light source has been reduced.

The period during which the transparent/scattering switching element is switched may be controlled so that the light source is totally extinguished. This will not only enable instances of glare to be completely prevented, but will also allow the brightness of the screen to be temporarily lowered during switching. Accordingly, it will be possible for the user to be explicitly shown that the narrow viewing angle display state has been switched to the wide viewing angle display state.

The light source drive circuit may be formed on the display panel in order to be able to accommodate the power consumed by the light source. The actions and effects of the present thirteenth embodiment are the same as those of the aforedescribed first embodiment, other than as described hereinabove.

The embodiments described above may be implemented independently, or may be implemented in a suitable combination thereof.

Examples of display devices in which the present invention can be advantageously used include the display devices of mobile phones, PDAs, game machines, digital cameras, video cameras, video players, and other portable terminal devices; and the display devices of notebook computers, cash dispensers, automatic vending machines, and other terminal devices.

What is claimed is:

1. A display device, comprising:
a light source;
a transparent/scattering switching element disposed above the light source capable of switching between states in which light that has entered from the light source is transmitted or scattered for emittance;
a display panel disposed above the transparent/scattering switching element for receiving light emitted from the transparent/scattering switching element and displaying images, said display panel having a plurality of pixels arranged in the form of a matrix so as to form a display area;
a gate-line drive circuit disposed on the display panel and composed of a shift register for outputting, upon receiving a power source voltage comprising a positive and a negative power source voltage for driving the pixels and a start signal for instructing a scanning timing of said display panel, a scanning pulse for scanning the pixels of said display area; and
a transparent/scattering switching element drive circuit disposed on the display panel for generating a drive voltage of said transparent/scattering switching element using as inputs said power source voltage including said positive and negative power source voltages, said start signal for instructing a scanning timing of said display panel, and a control signal, and for outputting at least one of two signals for driving said transparent/scattering switching element based on a combination of said start signal for instructing a scanning timing of said display panel and said control signal, wherein
said transparent/scattering switching element drive circuit has a circuit, comprising at least a bit counter and a transmission gate, for reversing, in response to the start signal for instructing the scanning timing of the display panel, a polarity of the drive voltage of said transparent/scattering switching element, whereby the polarity of the drive voltage of said transparent/scattering switching element is reversed in synchronization with a switching of said start signal for instructing a scanning timing of said display panel to a high level; and
a plurality of series of said gate-line drive circuits,
wherein the start signal for instructing a scanning timing of said display panel is a start signal for instructing a start of gate scanning of thin-film transistors in the pixels of the display area.

2. The display device according claim 1, wherein
the control signal is inputted to the transparent/scattering switching element drive circuit; and
the output of the transparent/scattering switching element drive circuit is switched on or off in accordance with the state of the control signal.

3. The display device according to claim 1, wherein
the display panel is an active matrix display panel.

4. The display device according to claim 1, wherein
the frequency of reversing the polarity of said transparent/scattering switching element is frequency modulated.

5. The display device according to claim 1, wherein
said circuit for reversing the polarity of the drive voltage of said transparent/scattering switching element, which is comprised in said transparent/scattering switching element drive circuit is at least one of a counter circuit, a shift register circuit, a frequency divider circuit, and a delay circuit.

6. The display device according to claim 1, wherein
said transparent/scattering switching element may be divided into a plurality of electrically independent regions.

7. The display device according to claim 1, wherein
temperature sensing unit is formed on said display panel; and
said transparent/scattering switching element driving circuit drives said transparent/scattering switching element using the results of the temperature sensing unit.

8. The display device according to claim 1, wherein
said transparent/scattering switching element driving circuit has a circuit for controlling said light source; and
the light source is controlled by this circuit.

9. The display device according to claim 1, wherein
said display panel has a terminal for connecting the power supply and signal with the outside; and
said transparent/scattering switching element drive circuit is formed between the terminal and said gate-line drive circuit.

10. The display device according to claim 1, wherein
wiring for connecting said display panel with the outside, and wiring for connecting said transparent/scattering switching element with said display panel are integrally formed.

11. The display device according to claim 1, wherein
said transparent/scattering switching element drive circuit is configured using a thin-film transistor formed on the display panel.

12. The display device according to claim 1, wherein
said transparent/scattering switching element drive circuit is formed on an IC chip mounted on the display panel.

13. The display device according to claim 1, having a light beam direction restricting element for restricting the direction of a light beam emitted from said light source and emitting the light beam toward said transparent/scattering switching element.

14. A terminal device having the display device of claim 1.

15. The terminal device of claim 14, which is a mobile phone, personal digital assistant, game machine, digital camera, video camera, video player, notebook computer, cash dispenser, or automatic vending machine.

* * * * *